(12) United States Patent
    Suzuki

(10) Patent No.: US 11,960,060 B2
(45) Date of Patent: Apr. 16, 2024

(54) IMAGING LENS AND CAMERA APPARATUS AND MOBILE OBJECT

(71) Applicant: Ricoh Company, Ltd., Tokyo (JP)

(72) Inventor: Akinori Suzuki, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 182 days.

(21) Appl. No.: 17/095,798

(22) Filed: Nov. 12, 2020

(65) Prior Publication Data

US 2021/0231917 A1    Jul. 29, 2021

(30) Foreign Application Priority Data

Jan. 29, 2020   (JP) ................................ 2020-012657

(51) Int. Cl.
  *G02B 13/00*    (2006.01)
  *G02B 9/64*     (2006.01)
  *G02B 13/06*    (2006.01)

(52) U.S. Cl.
  CPC .......... *G02B 13/0045* (2013.01); *G02B 9/64* (2013.01); *G02B 13/006* (2013.01); *G02B 13/06* (2013.01)

(58) Field of Classification Search
  CPC .... G02B 13/0045; G02B 9/64; G02B 13/006; G02B 13/06
  USPC ......................................... 359/755, 783, 725
  See application file for complete search history.

(56) References Cited

U.S. PATENT DOCUMENTS

| | | | | |
|---|---|---|---|---|
| 3,668,986 | A | * | 6/1972 | Lemaire .................. B63C 11/40 348/81 |
| 3,715,594 | A | * | 2/1973 | Drohan ................. G01S 3/7868 250/203.1 |
| 4,542,961 | A | * | 9/1985 | Sato .......................... G02B 9/14 359/708 |
| 9,442,277 | B1 | | 9/2016 | Shih |
| 2009/0002849 | A1 | | 1/2009 | Kim et al. |
| 2009/0109543 | A1 | | 4/2009 | Nagatoshi |
| 2010/0254025 | A1 | | 10/2010 | Yoshida et al. |

(Continued)

FOREIGN PATENT DOCUMENTS

| | | | | | |
|---|---|---|---|---|---|
| CN | 107797261 | A | * | 3/2018 | ......... G02B 13/0045 |
| CN | 112285906 | A | * | 1/2021 | ............... G02B 1/00 |

(Continued)

OTHER PUBLICATIONS

Geary "Introduction to Lens Design" p. 23 (Year: 2007).*

(Continued)

*Primary Examiner* — George G. King
(74) *Attorney, Agent, or Firm* — XSENSUS LLP

(57) ABSTRACT

An imaging lens includes a first group, a second group, an aperture stop, a third group, and a fourth group. The second group includes one positive lens. The third group includes two positive lenses and one negative lens. At least two of the third group are joined together to form a compound lens. The imaging lens has a fixed focal length and an angle of view of 120 degrees or more. Conditional expressions (1), (2), (3), and (4) below are satisfied:

$$-2.7 \leq f1/f \leq -0.7 \tag{1}$$

$$2.2 \leq f2/f \leq 6.6 \tag{2}$$

$$3.9 \leq f3/f \leq 14.3 \tag{3}$$

$$2.8 \leq f4/f \leq 11.0 \tag{4}$$

where
fi denotes focal length of i-th group with respect to a d-line,
i denotes one of 1 to 4, and (Continued)

f denotes focal length of an entirety of the imaging lens with respect to the d-line.

13 Claims, 62 Drawing Sheets

(56) References Cited

U.S. PATENT DOCUMENTS

| | | | |
|---|---|---|---|
| 2011/0164324 A1* | 7/2011 | Okumura | G02B 15/177 359/717 |
| 2012/0056978 A1 | 3/2012 | Abe et al. | |
| 2014/0293445 A1 | 10/2014 | Yoneyama et al. | |
| 2015/0077865 A1 | 3/2015 | Yoneyama et al. | |
| 2015/0077866 A1 | 3/2015 | Yoneyama et al. | |
| 2015/0362699 A1 | 12/2015 | Nakanuma | |
| 2016/0195716 A1 | 7/2016 | Nakanuma | |
| 2017/0131521 A1 | 5/2017 | Tang et al. | |
| 2017/0248771 A1 | 8/2017 | Tang et al. | |
| 2017/0248772 A1 | 8/2017 | Tang et al. | |
| 2017/0307857 A1* | 10/2017 | Ning | G02B 9/64 |
| 2019/0204569 A1* | 7/2019 | Jiang | G02B 13/06 |
| 2019/0235210 A1 | 8/2019 | Nakai et al. | |

FOREIGN PATENT DOCUMENTS

| | | |
|---|---|---|
| JP | H09-026542 A | 1/1997 |
| JP | 2006-513449 A | 4/2006 |
| JP | 2009-128654 A | 6/2009 |
| JP | 2010-217506 A | 9/2010 |
| JP | 2010-243711 | 10/2010 |
| JP | 2010-256627 | 11/2010 |
| JP | 2010-266577 A | 11/2010 |
| JP | 2011-013469 A | 1/2011 |
| JP | 2011-053663 A | 3/2011 |
| JP | 2012-220741 | 11/2012 |
| JP | 2014-197129 A | 10/2014 |
| JP | 2015-118152 | 6/2015 |
| JP | 2016-004088 | 1/2016 |
| JP | 2016-126230 | 7/2016 |
| JP | 2017-161685 A | 9/2017 |
| JP | 2018-077291 | 5/2018 |
| JP | 2019-020505 | 2/2019 |
| JP | 2019-132967 A | 8/2019 |

OTHER PUBLICATIONS

Office Action dated Jun. 22, 2022 in European Patent Application No. 20 206 982.9, 4 pages.

Extended European Search Report dated Apr. 9, 2021 in European Patent Application No. 20206982.9, 7 pages.

Japanese Office Action dated Sep. 5, 2023, in corresponding Japanese Application No. 2020-012657, 8pp.

Office Action issued Dec. 5, 2023 in Japanese Patent Application No. 2020-012657, 10 pages.

* cited by examiner

FIG. 2A

| SURFACE NUMBER | SURFACE TYPE | RADIUS OF CURVATURE | SURFACE DISTANCE | REFRAC-TIVE INDEX | ABBE NUMBER |
|---|---|---|---|---|---|
| OBJECT | | | INFINITY | | |
| 1 | SPHERE | 11.2960 | 0.800 | 1.835 | 42.72 |
| 2 | SPHERE | 3.8370 | 3.760 | | |
| 3 | SPHERE | −7.9430 | 1.000 | 1.764 | 48.49 |
| 4 | SPHERE | 5.8225 | 1.330 | | |
| 5 | SPHERE | 13.3056 | 3.500 | 1.959 | 17.47 |
| 6 | SPHERE | −13.3056 | 1.070 | | |
| STOP | SPHERE | INFINITY | 0.450 | | |
| 8 | SPHERE | 7.2966 | 3.240 | 1.678 | 55.34 |
| 9 | SPHERE | −3.6667 | 1.000 | 1.855 | 24.80 |
| 10 | SPHERE | 5.0910 | 3.720 | 1.569 | 56.36 |
| 11 | SPHERE | −5.0910 | 0.300 | | |
| 12 | ASPHERICAL SURFACE | 4.3426 | 2.310 | 1.750 | 45.37 |
| 13 | ASPHERICAL SURFACE | 8.7744 | 1.500 | | |
| 14 | SPHERE | INFINITY | 1.100 | 1.516 | 64.14 |
| 15 | SPHERE | INFINITY | 1.000 | | |
| 16 | SPHERE | INFINITY | 0.400 | 1.523 | 54.52 |
| 17 | SPHERE | INFINITY | 0.110 | | |
| IMAGE | SPHERE | INFINITY | 0.000 | | |

FIG. 2B

| | TWELFTH SURFACE | THIRTEENTH SURFACE |
|---|---|---|
| RADIUS OF CURVATURE R | 4.343 | 8.774 |
| CONIC CONSTANT | −0.981 | −12.680 |
| FOURTH-ORDER COEFFICIENT E4 | 5.69E−04 | 1.35E−03 |
| SIXTH-ORDER COEFFICIENT E6 | 3.48E−05 | −6.95E−05 |
| EIGHTH-ORDER COEFFICIENT E8 | 0 | 0 |
| TENTH-ORDER COEFFICIENT E10 | 0 | 0 |

FIG. 3A

|  | fd |
|---|---|
| L1 | −7.3 |
| L2 | −4.3 |
| L3 | 7.4 |
| L4 | 34.8 |
| L5 | −14.8 |
| L6 | 14.2 |
| L7 | 9.4 |
| FIRST GROUP | −2.0 |
| SECOND GROUP | 7.4 |
| THIRD GROUP | 10.5 |
| FOURTH GROUP | 9.4 |
| ENTIRE SYSTEM | 1.8 |

FIG. 3B

| | |
|---|---|
| (1) $-2.7 \leq f1/f \leq -0.7$ | −1.1 |
| (2) $2.2 \leq f2/f \leq 6.6$ | 4.1 |
| (3) $3.9 \leq f3/f \leq 14.3$ | 5.9 |
| (4) $2.8 \leq f4/f \leq 11.0$ | 5.2 |

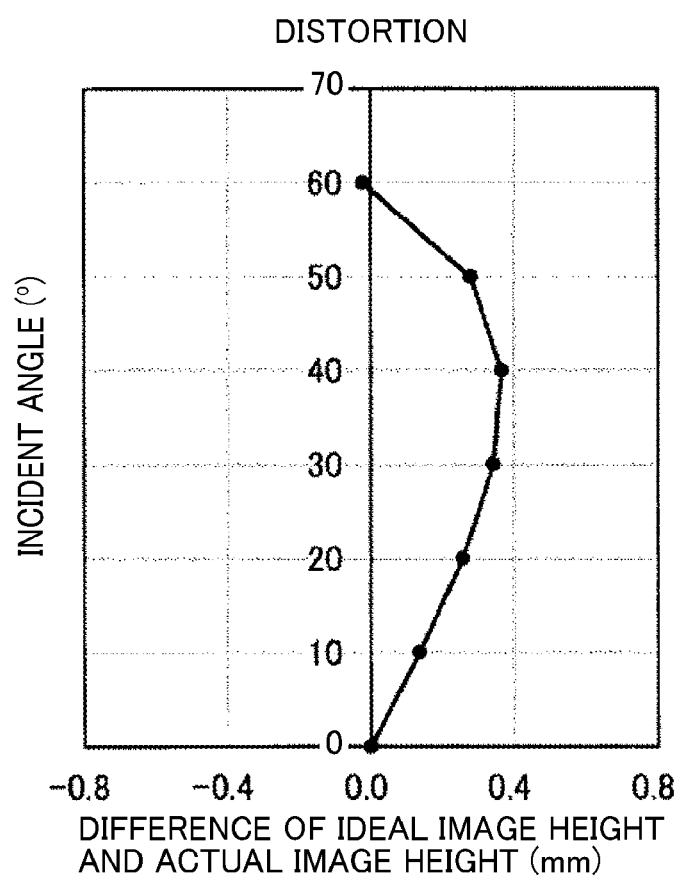

FIG. 7A

| SURFACE NUMBER | SURFACE TYPE | RADIUS OF CURVATURE | SURFACE DISTANCE | REFRACTIVE INDEX | ABBE NUMBER |
|---|---|---|---|---|---|
| OBJECT | | | INFINITY | | |
| 1 | SPHERE | −38.0000 | 1.000 | 1.729 | 54.68 |
| 2 | SPHERE | 3.1211 | 2.800 | | |
| 3 | SPHERE | −24.2110 | 2.309 | 1.959 | 17.47 |
| 4 | SPHERE | −6.0433 | 0.352 | | |
| 5 | SPHERE | −4.6936 | 2.922 | 1.834 | 37.16 |
| 6 | SPHERE | −40.0000 | 0.743 | | |
| 7 | SPHERE | −21.0018 | 1.000 | 1.540 | 59.46 |
| 8 | SPHERE | −4.5430 | 0.828 | | |
| STOP | SPHERE | INFINITY | 0.300 | | |
| 10 | SPHERE | 7.9423 | 2.616 | 1.729 | 54.68 |
| 11 | SPHERE | −3.2066 | 1.000 | 1.904 | 31.34 |
| 12 | SPHERE | 3.6969 | 4.000 | 1.762 | 40.10 |
| 13 | SPHERE | −6.0665 | 0.441 | | |
| 14 | ASPHERICAL SURFACE | 18.4247 | 2.339 | 1.516 | 64.06 |
| 15 | ASPHERICAL SURFACE | −14.5351 | 1.500 | | |
| 16 | SPHERE | INFINITY | 1.100 | 1.516 | 64.14 |
| 17 | SPHERE | INFINITY | 1.000 | | |
| 18 | SPHERE | INFINITY | 0.400 | 1.523 | 54.52 |
| 19 | SPHERE | INFINITY | 0.110 | | |
| IMAGE | SPHERE | INFINITY | 0.000 | | |

FIG. 7B

| | FOURTEENTH SURFACE | FIFTEENTH SURFACE |
|---|---|---|
| RADIUS OF CURVATURE R | 18.425 | −14.535 |
| CONIC CONSTANT | 34.385 | −125.486 |
| FOURTH-ORDER COEFFICIENT E4 | −1.15E−03 | −5.22E−03 |
| SIXTH-ORDER COEFFICIENT E6 | −5.67E−04 | −8.32E−05 |
| EIGHTH-ORDER COEFFICIENT E8 | 4.09E−05 | 6.37E−06 |
| TENTH-ORDER COEFFICIENT E10 | −2.65E−06 | 0 |

FIG. 8A

|  | fd |
|---|---|
| L1 | −3.9 |
| L2 | 7.9 |
| L3 | −6.6 |
| L4 | 10.5 |
| L5 | 42.4 |
| L6 | −18.8 |
| L7 | 10.2 |
| L8 | 16.1 |
| FIRST GROUP | −3.3 |
| SECOND GROUP | 10.5 |
| THIRD GROUP | 8.7 |
| FOURTH GROUP | 16.1 |
| ENTIRE SYSTEM | 2.0 |

FIG. 8B

| | |
|---|---|
| (1) $-2.7 \leq f1/f \leq -0.7$ | −1.6 |
| (2) $2.2 \leq f2/f \leq 6.6$ | 5.1 |
| (3) $3.9 \leq f3/f \leq 14.3$ | 4.3 |
| (4) $2.8 \leq f4/f \leq 11.0$ | 7.9 |

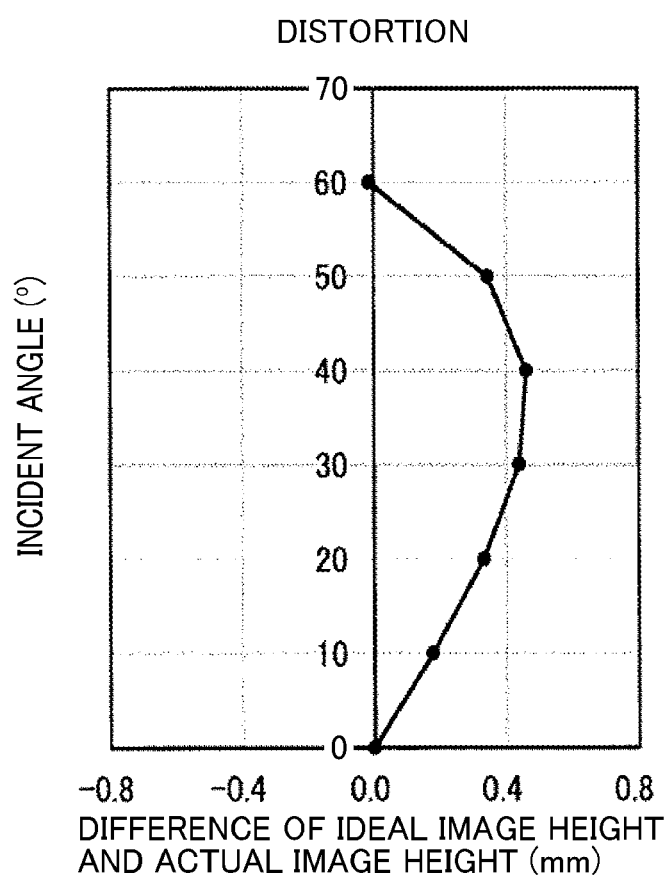

FIG. 12A

| SURFACE NUMBER | SURFACE TYPE | RADIUS OF CURVATURE | SURFACE DISTANCE | REFRACTIVE INDEX | ABBE NUMBER |
|---|---|---|---|---|---|
| OBJECT | | | INFINITY | | |
| 1 | SPHERE | 12.8800 | 1.000 | 2.001 | 29.14 |
| 2 | SPHERE | 3.3081 | 3.926 | | |
| 3 | SPHERE | −15.0000 | 1.670 | 1.959 | 17.47 |
| 4 | SPHERE | −8.5188 | 0.500 | | |
| 5 | SPHERE | −5.1614 | 2.029 | 1.762 | 40.10 |
| 6 | SPHERE | 10.6284 | 0.626 | | |
| 7 | SPHERE | 9.0187 | 3.500 | 1.778 | 23.91 |
| 8 | SPHERE | −8.7091 | 1.556 | | |
| STOP | SPHERE | INFINITY | 0.326 | | |
| 10 | SPHERE | 8.4784 | 2.374 | 1.729 | 54.68 |
| 11 | SPHERE | −4.8600 | 1.000 | 1.959 | 17.47 |
| 12 | SPHERE | −326.9517 | 0.300 | | |
| 13 | SPHERE | 5.5486 | 2.698 | 1.487 | 70.24 |
| 14 | SPHERE | 12.6073 | 0.300 | | |
| 15 | ASPHERICAL SURFACE | 4.8809 | 2.041 | 1.516 | 64.06 |
| 16 | ASPHERICAL SURFACE | 69.56509 | 0.484 | | |
| 17 | SPHERE | INFINITY | 1.100 | 1.516 | 64.14 |
| 18 | SPHERE | INFINITY | 1.000 | | |
| 19 | SPHERE | INFINITY | 0.400 | 1.523 | 54.52 |
| 20 | SPHERE | INFINITY | 0.110 | | |
| IMAGE | SPHERE | INFINITY | 0.000 | | |

FIG. 12B

| | FIFTEENTH SURFACE | SIXTEENTH SURFACE |
|---|---|---|
| RADIUS OF CURVATURE R | 4.881 | 69.537 |
| CONIC CONSTANT | −3.658 | −5.699 |
| FOURTH-ORDER COEFFICIENT E4 | 3.56E−03 | 3.95E−03 |
| SIXTH-ORDER COEFFICIENT E6 | −9.83E−05 | 0 |
| EIGHTH-ORDER COEFFICIENT E8 | 0 | 0 |
| TENTH-ORDER COEFFICIENT E10 | 0 | 0 |

FIG. 13A

|  | fd |
|---|---|
| L1 | −4.7 |
| L2 | 18.3 |
| L3 | −4.3 |
| L4 | 6.2 |
| L5 | 44.2 |
| L6 | −22.6 |
| L7 | 18.1 |
| L8 | 10.1 |
| FIRST GROUP | −1.7 |
| SECOND GROUP | 6.2 |
| THIRD GROUP | 10.3 |
| FOURTH GROUP | 10.1 |
| ENTIRE SYSTEM | 1.8 |

FIG. 13B

| (1) $-2.7 \leq f1/f \leq -0.7$ | −1.0 |
|---|---|
| (2) $2.2 \leq f2/f \leq 6.6$ | 3.5 |
| (3) $3.9 \leq f3/f \leq 14.3$ | 5.8 |
| (4) $2.8 \leq f4/f \leq 11.0$ | 5.7 |

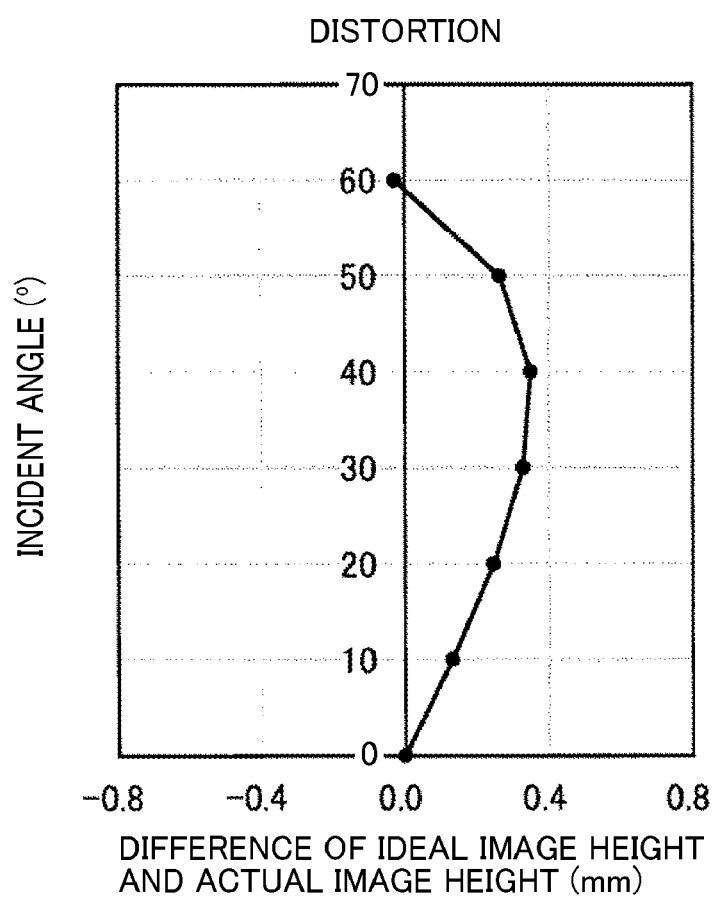

FIG. 17A

| SURFACE NUMBER | SURFACE TYPE | RADIUS OF CURVATURE | SURFACE DISTANCE | REFRACTIVE INDEX | ABBE NUMBER |
|---|---|---|---|---|---|
| OBJECT | | | INFINITY | | |
| 1 | SPHERE | 13.9337 | 1.000 | 2.001 | 29.14 |
| 2 | SPHERE | 3.3126 | 4.840 | | |
| 3 | SPHERE | −4.4305 | 1.000 | 1.487 | 70.24 |
| 4 | SPHERE | −7.8375 | 0.200 | | |
| 5 | SPHERE | −25.0000 | 3.000 | 1.959 | 17.47 |
| 6 | SPHERE | −8.4917 | 4.312 | | |
| STOP | SPHERE | INFINITY | 0.303 | | |
| 8 | SPHERE | −432.4111 | 2.849 | 1.959 | 17.47 |
| 9 | SPHERE | 7.3419 | 2.311 | 1.678 | 55.34 |
| 10 | SPHERE | −8.075203143 | 0.300 | | |
| 11 | SPHERE | 4.7062 | 2.606 | 1.487 | 70.24 |
| 12 | SPHERE | 13.1525 | 0.855 | | |
| 13 | ASPHERICAL SURFACE | 12.6007 | 3.000 | 1.516 | 64.06 |
| 14 | ASPHERICAL SURFACE | −13.8738 | 0.602 | | |
| 15 | SPHERE | INFINITY | 1.100 | 1.516 | 64.14 |
| 16 | SPHERE | INFINITY | 1.000 | | |
| 17 | SPHERE | INFINITY | 0.400 | 1.523 | 54.52 |
| 18 | SPHERE | INFINITY | 0.110 | | |
| IMAGE | SPHERE | INFINITY | 0.000 | | |

FIG. 17B

| | THIRTEENTH SURFACE | FOURTEENTH SURFACE |
|---|---|---|
| RADIUS OF CURVATURE R | 12.601 | −13.874 |
| CONIC CONSTANT | 10.000 | −90.000 |
| FOURTH-ORDER COEFFICIENT E4 | −2.79E−03 | −6.28E−03 |
| SIXTH-ORDER COEFFICIENT E6 | −1.47E−04 | 2.88E−04 |
| EIGHTH-ORDER COEFFICIENT E8 | 0 | 0 |
| TENTH-ORDER COEFFICIENT E10 | 0 | 0 |

FIG. 18A

|  | fd |
|---|---|
| L1 | −4.6 |
| L2 | −23.1 |
| L3 | 12.3 |
| L4 | −41.3 |
| L5 | 20.0 |
| L6 | 13.7 |
| L7 | 13.3 |
| FIRST GROUP | −3.4 |
| SECOND GROUP | 12.3 |
| THIRD GROUP | 7.8 |
| FOURTH GROUP | 13.3 |
| ENTIRE SYSTEM | 1.9 |

FIG. 18B

| | |
|---|---|
| (1) $-2.7 \leq f1/f \leq -0.7$ | −1.8 |
| (2) $2.2 \leq f2/f \leq 6.6$ | 6.5 |
| (3) $3.9 \leq f3/f \leq 14.3$ | 4.1 |
| (4) $2.8 \leq f4/f \leq 11.0$ | 7.0 |

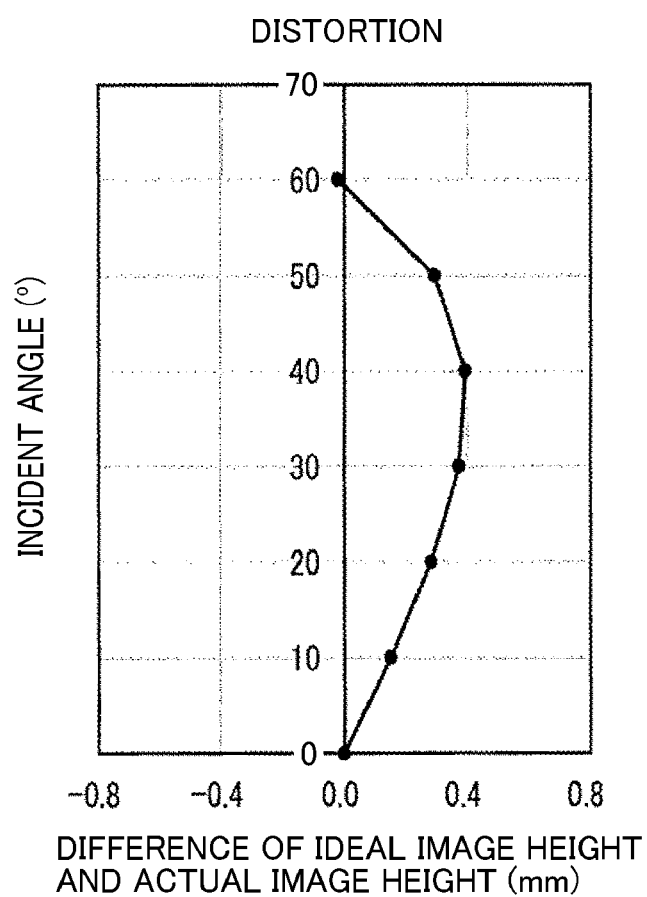

FIG. 22A

| SURFACE NUMBER | SURFACE TYPE | RADIUS OF CURVATURE | SURFACE DISTANCE | REFRAC-TIVE INDEX | ABBE NUMBER |
|---|---|---|---|---|---|
| OBJECT | | | INFINITY | | |
| 1 | SPHERE | 16.2750 | 1.000 | 1.678 | 55.34 |
| 2 | SPHERE | 3.3975 | 3.880 | | |
| 3 | SPHERE | -4.5098 | 3.000 | 2.001 | 29.14 |
| 4 | SPHERE | -7.3263 | 0.300 | | |
| 5 | SPHERE | 10.0411 | 3.384 | 1.959 | 17.47 |
| 6 | SPHERE | 45.1204 | 0.872 | | |
| STOP | SPHERE | INFINITY | 0.300 | | |
| 8 | SPHERE | 17.8503 | 2.370 | 1.800 | 42.22 |
| 9 | SPHERE | -2.9746 | 1.000 | 1.893 | 20.36 |
| 10 | SPHERE | 15.0000 | 2.933 | 1.786 | 44.20 |
| 11 | SPHERE | -9.2987 | 0.300 | | |
| 12 | ASPHERICAL SURFACE | 4.5355 | 2.606 | 1.743 | 49.29 |
| 13 | ASPHERICAL SURFACE | 29.9505 | 0.445 | | |
| 14 | SPHERE | INFINITY | 1.100 | 1.516 | 64.14 |
| 15 | SPHERE | INFINITY | 1.000 | | |
| 16 | SPHERE | INFINITY | 0.400 | 1.523 | 54.52 |
| 17 | SPHERE | INFINITY | 0.110 | | |
| IMAGE | SPHERE | INFINITY | 0.000 | | |

FIG. 22B

| | TWELFTH SURFACE | THIRTEENTH SURFACE |
|---|---|---|
| RADIUS OF CURVATURE R | 4.535 | 29.950 |
| CONIC CONSTANT | -0.079 | 1.708 |
| FOURTH-ORDER COEFFICIENT E4 | 5.60E-06 | 1.81E-04 |
| SIXTH-ORDER COEFFICIENT E6 | 0 | 0 |
| EIGHTH-ORDER COEFFICIENT E8 | 0 | 0 |
| TENTH-ORDER COEFFICIENT E10 | 0 | 0 |

FIG. 23A

|  | fd |
|---|---|
| L1 | −6.5 |
| L2 | −25.1 |
| L3 | 12.9 |
| L4 | 124.0 |
| L5 | −46.2 |
| L6 | 12.8 |
| L7 | 6.9 |
| FIRST GROUP | −5.4 |
| SECOND GROUP | 12.9 |
| THIRD GROUP | 11.6 |
| FOURTH GROUP | 6.9 |
| ENTIRE SYSTEM | 2.0 |

FIG. 23B

| | |
|---|---|
| (1) $-2.7 \leq f1/f \leq -0.7$ | −2.7 |
| (2) $2.2 \leq f2/f \leq 6.6$ | 6.5 |
| (3) $3.9 \leq f3/f \leq 14.3$ | 5.8 |
| (4) $2.8 \leq f4/f \leq 11.0$ | 3.5 |

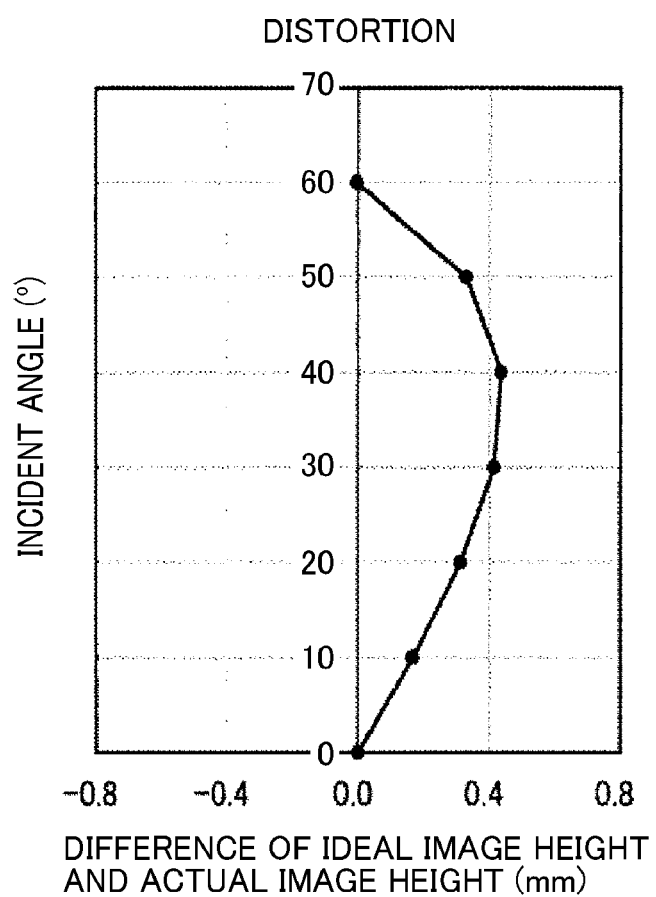

FIG. 27A

| SURFACE NUMBER | SURFACE TYPE | RADIUS OF CURVATURE | SURFACE DISTANCE | REFRACTIVE INDEX | ABBE NUMBER |
|---|---|---|---|---|---|
| OBJECT | | | INFINITY | | |
| 1 | SPHERE | 8.9271 | 1.075 | 2.001 | 29.14 |
| 2 | SPHERE | 3.1579 | 3.856 | | |
| 3 | SPHERE | −7.1036 | 1.000 | 1.954 | 32.32 |
| 4 | SPHERE | 4.3648 | 1.341 | | |
| 5 | SPHERE | 8.0441 | 2.294 | 1.859 | 22.73 |
| 6 | SPHERE | −6.2546 | 0.391 | | |
| STOP | SPHERE | INFINITY | 0.459 | | |
| 8 | SPHERE | 4.9531 | 3.592 | 1.567 | 42.82 |
| 9 | SPHERE | −2.9361 | 1.000 | 1.893 | 20.36 |
| 10 | SPHERE | 3.5637 | 3.349 | 1.729 | 54.68 |
| 11 | SPHERE | −12.3876 | 0.300 | | |
| 12 | ASPHERICAL SURFACE | 4.9727 | 3.000 | 1.743 | 49.29 |
| 13 | ASPHERICAL SURFACE | −17.3695 | 0.732 | | |
| 14 | SPHERE | INFINITY | 1.100 | 1.516 | 64.14 |
| 15 | SPHERE | INFINITY | 1.000 | | |
| 16 | SPHERE | INFINITY | 0.400 | 1.523 | 54.52 |
| 17 | SPHERE | INFINITY | 0.110 | | |
| IMAGE | SPHERE | INFINITY | 0.000 | | |

FIG. 27B

| | TWELFTH SURFACE | THIRTEENTH SURFACE |
|---|---|---|
| RADIUS OF CURVATURE R | 4.973 | −17.369 |
| CONIC CONSTANT | −0.727 | −90.000 |
| FOURTH-ORDER COEFFICIENT E4 | −3.09E−04 | −3.96E−04 |
| SIXTH-ORDER COEFFICIENT E6 | 0 | 0 |
| EIGHTH-ORDER COEFFICIENT E8 | 0 | 0 |
| TENTH-ORDER COEFFICIENT E10 | 0 | 0 |

FIG. 28A

|  | fd |
|---|---|
| L1 | −5.4 |
| L2 | −2.7 |
| L3 | 4.4 |
| L4 | 57.8 |
| L5 | −10.8 |
| L6 | 55.1 |
| L7 | 5.5 |
| FIRST GROUP | −1.2 |
| SECOND GROUP | 4.4 |
| THIRD GROUP | 23.7 |
| FOURTH GROUP | 5.5 |
| ENTIRE SYSTEM | 1.7 |

FIG. 28B

| (1) $-2.7 \leq f1/f \leq -0.7$ | −0.7 |
|---|---|
| (2) $2.2 \leq f2/f \leq 6.6$ | 2.7 |
| (3) $3.9 \leq f3/f \leq 14.3$ | 14.3 |
| (4) $2.8 \leq f4/f \leq 11.0$ | 3.3 |

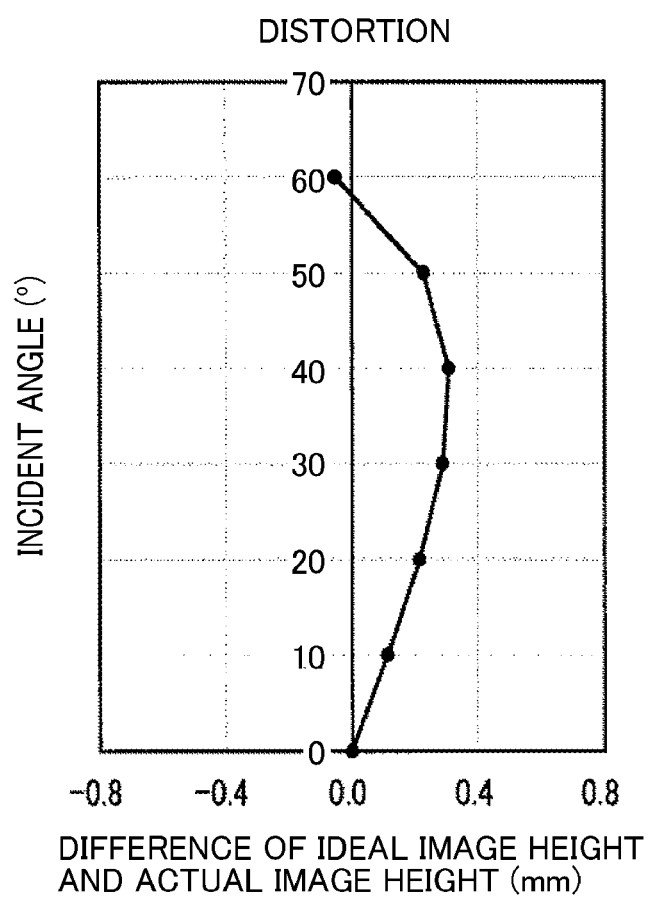

FIG. 32A

| SURFACE NUMBER | SURFACE TYPE | RADIUS OF CURVATURE | SURFACE DISTANCE | REFRACTIVE INDEX | ABBE NUMBER |
|---|---|---|---|---|---|
| OBJECT | | | INFINITY | | |
| 1 | SPHERE | 11.6391 | 1.734 | 1.892 | 37.13 |
| 2 | SPHERE | 2.7119 | 3.561 | | |
| 3 | SPHERE | -4.8843 | 1.000 | 1.729 | 54.68 |
| 4 | SPHERE | 5.5620 | 0.727 | | |
| 5 | SPHERE | 7.1137 | 1.707 | 2.003 | 28.27 |
| 6 | SPHERE | -7.6022 | 1.315 | | |
| STOP | SPHERE | INFINITY | 0.339 | | |
| 8 | SPHERE | 5.2902 | 2.624 | 1.603 | 60.64 |
| 9 | SPHERE | -2.6566 | 1.000 | 1.859 | 22.73 |
| 10 | SPHERE | 7.0000 | 2.846 | 1.729 | 54.68 |
| 11 | SPHERE | -19.1992 | 0.300 | | |
| 12 | ASPHERICAL SURFACE | 4.7119 | 2.793 | 1.743 | 49.29 |
| 13 | ASPHERICAL SURFACE | -12.9539 | 0.438 | | |
| 14 | SPHERE | INFINITY | 1.100 | 1.516 | 64.14 |
| 15 | SPHERE | INFINITY | 1.000 | | |
| 16 | SPHERE | INFINITY | 0.400 | 1.523 | 54.52 |
| 17 | SPHERE | INFINITY | 0.110 | | |
| IMAGE | SPHERE | INFINITY | 0.000 | | |

FIG. 32B

| | TWELFTH SURFACE | THIRTEENTH SURFACE |
|---|---|---|
| RADIUS OF CURVATURE R | 4.712 | -12.954 |
| CONIC CONSTANT | -1.356 | -30.312 |
| FOURTH-ORDER COEFFICIENT E4 | 1.40E-04 | -2.84E-04 |
| SIXTH-ORDER COEFFICIENT E6 | 0 | 0 |
| EIGHTH-ORDER COEFFICIENT E8 | 0 | 0 |
| TENTH-ORDER COEFFICIENT E10 | 0 | 0 |

FIG. 33A

|  | fd |
|---|---|
| L1 | −4.4 |
| L2 | −3.4 |
| L3 | 3.9 |
| L4 | 52.1 |
| L5 | −14.9 |
| L6 | 48.6 |
| L7 | 5.0 |
| FIRST GROUP | −1.3 |
| SECOND GROUP | 3.9 |
| THIRD GROUP | 20.1 |
| FOURTH GROUP | 5.0 |
| ENTIRE SYSTEM | 1.8 |

FIG. 33B

| | |
|---|---|
| (1) $-2.7 \leq f1/f \leq -0.7$ | −0.8 |
| (2) $2.2 \leq f2/f \leq 6.6$ | 2.2 |
| (3) $3.9 \leq f3/f \leq 14.3$ | 11.4 |
| (4) $2.8 \leq f4/f \leq 11.0$ | 2.8 |

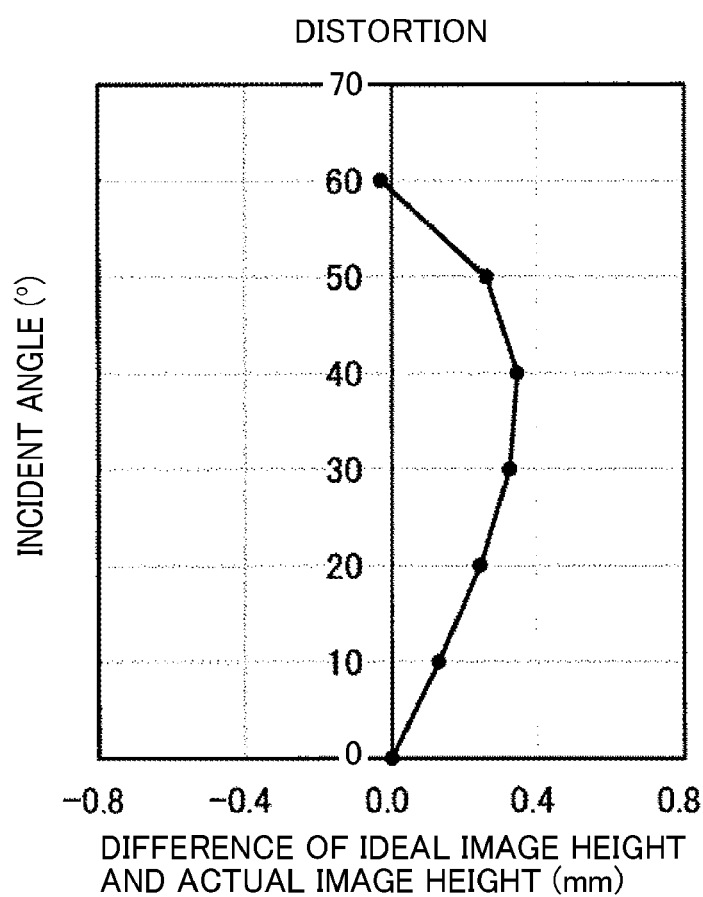

FIG. 37A

| SURFACE NUMBER | SURFACE TYPE | RADIUS OF CURVATURE | SURFACE DISTANCE | REFRACTIVE INDEX | ABBE NUMBER |
|---|---|---|---|---|---|
| OBJECT | | | INFINITY | | |
| 1 | SPHERE | 13.3121 | 1.000 | 1.800 | 42.22 |
| 2 | SPHERE | 3.1317 | 3.882 | | |
| 3 | SPHERE | -7.9139 | 1.000 | 1.487 | 70.24 |
| 4 | SPHERE | 6.4679 | 1.090 | | |
| 5 | SPHERE | -19.1396 | 2.454 | 1.959 | 17.47 |
| 6 | SPHERE | -7.4054 | 0.327 | | |
| STOP | SPHERE | INFINITY | 0.300 | | |
| 8 | SPHERE | 7.2966 | 4.000 | 1.762 | 40.10 |
| 9 | SPHERE | -13.5793 | 1.412 | 1.893 | 20.36 |
| 10 | SPHERE | 3.8331 | 3.674 | 1.729 | 54.68 |
| 11 | SPHERE | -6.8835 | 0.300 | | |
| 12 | ASPHERICAL SURFACE | 4.0510 | 2.548 | 1.516 | 64.06 |
| 13 | ASPHERICAL SURFACE | 15.8046 | 0.403 | | |
| 14 | SPHERE | INFINITY | 1.100 | 1.516 | 64.14 |
| 15 | SPHERE | INFINITY | 1.000 | | |
| 16 | SPHERE | INFINITY | 0.400 | 1.523 | 54.52 |
| 17 | SPHERE | INFINITY | 0.110 | | |
| IMAGE | SPHERE | INFINITY | 0.000 | | |

FIG. 37B

| | TWELFTH SURFACE | THIRTEENTH SURFACE |
|---|---|---|
| RADIUS OF CURVATURE R | 4.051 | 15.805 |
| CONIC CONSTANT | -2.990 | -1.139 |
| FOURTH-ORDER COEFFICIENT E4 | 3.79E-03 | -2.41E-03 |
| SIXTH-ORDER COEFFICIENT E6 | -9.34E-05 | 0 |
| EIGHTH-ORDER COEFFICIENT E8 | 0 | 0 |
| TENTH-ORDER COEFFICIENT E10 | 0 | 0 |

FIG. 38A

|  | fd |
|---|---|
| L1 | −5.4 |
| L2 | −7.1 |
| L3 | 11.4 |
| L4 | 19.5 |
| L5 | −32.8 |
| L6 | 13.7 |
| L7 | 9.8 |
| FIRST GROUP | −2.3 |
| SECOND GROUP | 11.4 |
| THIRD GROUP | 8.0 |
| FOURTH GROUP | 9.8 |
| ENTIRE SYSTEM | 1.7 |

FIG. 38B

| | |
|---|---|
| (1) $-2.7 \leq f1/f \leq -0.7$ | −1.3 |
| (2) $2.2 \leq f2/f \leq 6.6$ | 6.6 |
| (3) $3.9 \leq f3/f \leq 14.3$ | 4.6 |
| (4) $2.8 \leq f4/f \leq 11.0$ | 5.7 |

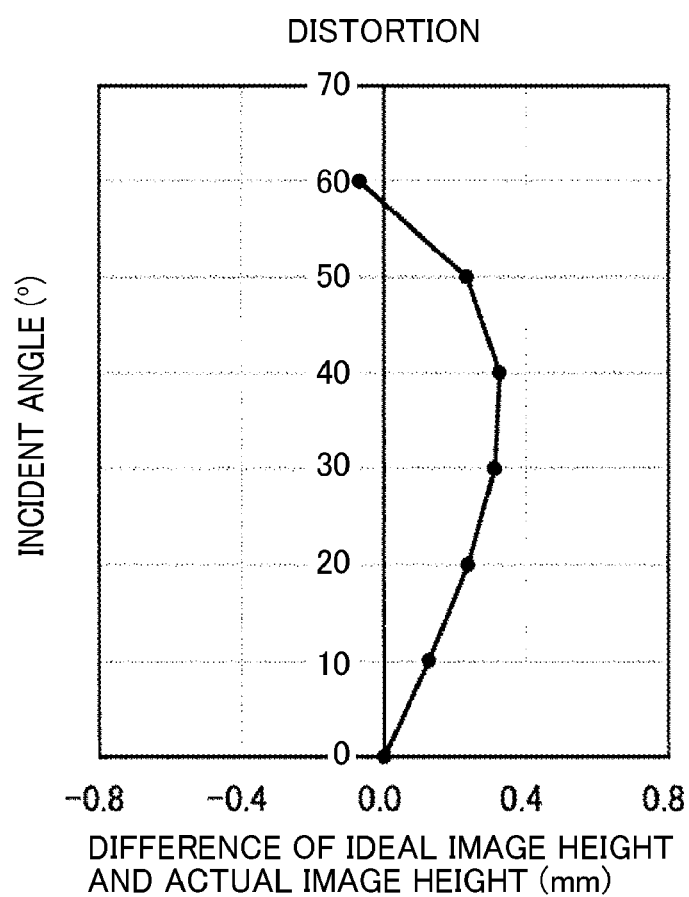

FIG. 42A

| SURFACE NUMBER | SURFACE TYPE | RADIUS OF CURVATURE | SURFACE DISTANCE | REFRACTIVE INDEX | ABBE NUMBER |
|---|---|---|---|---|---|
| OBJECT | | | INFINITY | | |
| 1 | SPHERE | 10.7927 | 1.000 | 2.001 | 29.14 |
| 2 | SPHERE | 3.3449 | 4.081 | | |
| 3 | SPHERE | −8.9467 | 1.000 | 1.729 | 54.68 |
| 4 | SPHERE | 5.7735 | 1.048 | | |
| 5 | SPHERE | 20.2645 | 1.625 | 1.959 | 17.47 |
| 6 | SPHERE | −8.1477 | 1.409 | | |
| STOP | SPHERE | INFINITY | 0.300 | | |
| 8 | SPHERE | 7.2966 | 2.059 | 1.743 | 49.34 |
| 9 | SPHERE | −15.0000 | 1.000 | 1.893 | 20.36 |
| 10 | SPHERE | 3.4034 | 3.523 | 1.729 | 54.68 |
| 11 | SPHERE | −5.5475 | 0.300 | | |
| 12 | ASPHERICAL SURFACE | 3.7909 | 1.862 | 1.516 | 64.06 |
| 13 | ASPHERICAL SURFACE | 5.2739 | 0.733 | | |
| 14 | SPHERE | INFINITY | 1.100 | 1.516 | 64.14 |
| 15 | SPHERE | INFINITY | 1.000 | | |
| 16 | SPHERE | INFINITY | 0.400 | 1.523 | 54.52 |
| 17 | SPHERE | INFINITY | 0.110 | | |
| IMAGE | SPHERE | INFINITY | 0.000 | | |

FIG. 42B

| | TWELFTH SURFACE | THIRTEENTH SURFACE |
|---|---|---|
| RADIUS OF CURVATURE R | 3.791 | 5.274 |
| CONIC CONSTANT | −1.000 | −1.003 |
| FOURTH-ORDER COEFFICIENT E4 | −8.41E−04 | −2.77E−03 |
| SIXTH-ORDER COEFFICIENT E6 | 0 | 0 |
| EIGHTH-ORDER COEFFICIENT E8 | 0 | 0 |
| TENTH-ORDER COEFFICIENT E10 | 0 | 0 |

FIG. 43A

|  | fd |
|---|---|
| L1 | −5.2 |
| L2 | −4.7 |
| L3 | 6.2 |
| L4 | 20.3 |
| L5 | −29.6 |
| L6 | 10.4 |
| L7 | 18.3 |
| FIRST GROUP | −1.7 |
| SECOND GROUP | 6.2 |
| THIRD GROUP | 6.8 |
| FOURTH GROUP | 18.3 |
| ENTIRE SYSTEM | 1.7 |

FIG. 43B

| | |
|---|---|
| (1) $-2.7 \leq f1/f \leq -0.7$ | −1.0 |
| (2) $2.2 \leq f2/f \leq 6.6$ | 3.6 |
| (3) $3.9 \leq f3/f \leq 14.3$ | 3.9 |
| (4) $2.8 \leq f4/f \leq 11.0$ | 10.7 |

FIG. 47A

| SURFACE NUMBER | SURFACE TYPE | RADIUS OF CURVATURE | SURFACE DISTANCE | REFRAC-TIVE INDEX | ABBE NUMBER |
|---|---|---|---|---|---|
| OBJECT | | | INFINITY | | |
| 1 | SPHERE | 10.7542 | 1.000 | 1.959 | 17.47 |
| 2 | SPHERE | 3.3203 | 4.034 | | |
| 3 | SPHERE | −8.9405 | 1.017 | 1.729 | 54.68 |
| 4 | SPHERE | 4.7300 | 1.136 | | |
| 5 | SPHERE | 14.1331 | 3.500 | 1.959 | 17.47 |
| 6 | SPHERE | −7.5148 | 1.839 | | |
| STOP | SPHERE | INFINITY | 0.300 | | |
| 8 | SPHERE | 7.4413 | 2.089 | 1.762 | 40.10 |
| 9 | SPHERE | −15.0000 | 1.000 | 1.959 | 17.47 |
| 10 | SPHERE | 3.5879 | 3.578 | 1.729 | 54.68 |
| 11 | SPHERE | −6.5001 | 0.300 | | |
| 12 | ASPHERICAL SURFACE | 4.4701 | 2.054 | 1.516 | 64.06 |
| 13 | ASPHERICAL SURFACE | 6.9561 | 0.543 | | |
| 14 | SPHERE | INFINITY | 1.100 | 1.516 | 64.14 |
| 15 | SPHERE | INFINITY | 1.000 | | |
| 16 | SPHERE | INFINITY | 0.400 | 1.523 | 54.52 |
| 17 | SPHERE | INFINITY | 0.110 | | |
| IMAGE | SPHERE | INFINITY | 0.000 | | |

FIG. 47B

| | TWELFTH SURFACE | THIRTEENTH SURFACE |
|---|---|---|
| RADIUS OF CURVATURE R | 4.470 | 6.956 |
| CONIC CONSTANT | −1.005 | 2.768 |
| FOURTH-ORDER COEFFICIENT E4 | −1.88E−03 | −7.33E−03 |
| SIXTH-ORDER COEFFICIENT E6 | 0 | 0 |
| EIGHTH-ORDER COEFFICIENT E8 | 0 | 0 |
| TENTH-ORDER COEFFICIENT E10 | 0 | 0 |

FIG. 48A

|  | fd |
|---|---|
| L1 | −5.4 |
| L2 | −4.1 |
| L3 | 5.6 |
| L4 | 21.6 |
| L5 | −22.3 |
| L6 | 15.9 |
| L7 | 18.9 |
| FIRST GROUP | −1.6 |
| SECOND GROUP | 5.6 |
| THIRD GROUP | 8.2 |
| FOURTH GROUP | 18.9 |
| ENTIRE SYSTEM | 1.7 |

FIG. 48B

| (1) $-2.7 \leq f1/f \leq -0.7$ | −0.9 |
|---|---|
| (2) $2.2 \leq f2/f \leq 6.6$ | 3.2 |
| (3) $3.9 \leq f3/f \leq 14.3$ | 4.8 |
| (4) $2.8 \leq f4/f \leq 11.0$ | 11.0 |

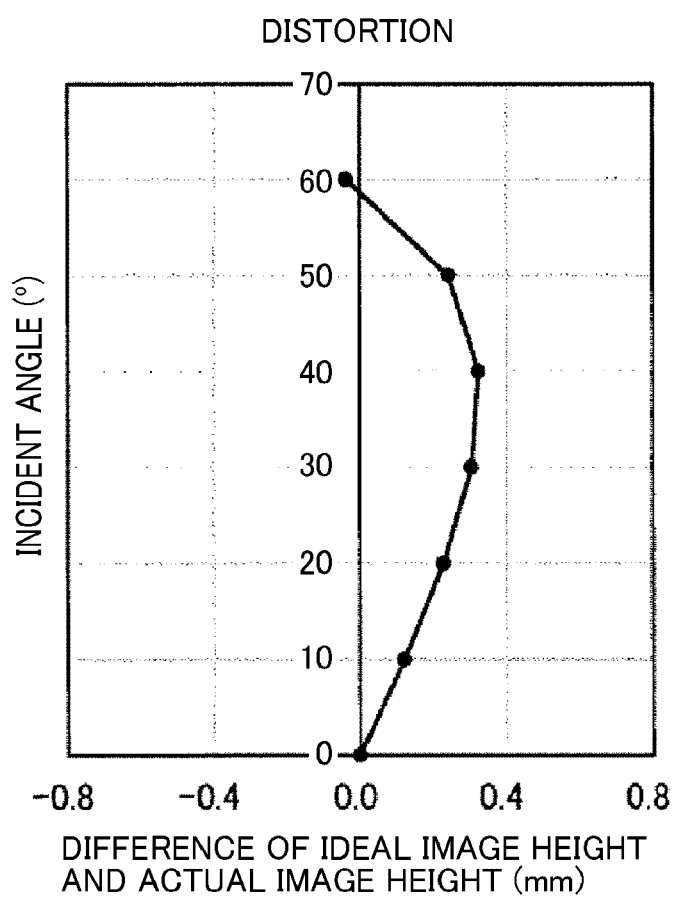

IMAGING LENS AND CAMERA APPARATUS AND MOBILE OBJECT

CROSS-REFERENCE TO RELATED APPLICATIONS

This patent application is based on and claims priority pursuant to 35 U.S.C. § 119(a) to Japanese Patent Application No. 2020-012657, filed on Jan. 29, 2020, in the Japan Patent Office, the entire disclosure of which is hereby incorporated by reference herein.

BACKGROUND

Technical Field

Embodiments of the present disclosure relate to an imaging lens, a camera apparatus incorporating the imaging lens, and a mobile object incorporating the camera apparatus.

Related Art

In recent years, in addition to image-capturing cameras, various other types of camera apparatuses incorporating an imaging lens, such as vehicle-mounted cameras, stereo cameras, inspection cameras, and surveillance cameras have been commercialized.

Imaging lenses mounted on such various types of camera apparatuses are typically to have higher resolution, a larger diameter, a smaller F-number, a wider angle of view, and a smaller size.

SUMMARY

In one aspect of this disclosure, there is described an imaging lens including: a first group having negative refractive power; a second group having positive refractive power; an aperture stop; a third group having positive refractive power; and a fourth group having positive refractive power. The first group, the second group, the third group, and the fourth group are arranged in that order from an object side toward an image side. The first group includes at least two negative lenses (L1, L2). The second group includes one positive lens. The third group includes three lenses of two positive lenses and one negative lens. At least two of the three lenses of the third group are joined together to form a compound lens. The fourth group includes one positive lens having an aspherical shape. The imaging lens has a fixed focal length and an angle of view of 120 degrees or more. Conditional expressions (1), (2), (3), and (4) below are satisfied, $$-2.7 \leq f1/f \leq -0.7 \quad (1)$$

$$2.2 \leq f2/f \leq 6.6 \quad (2)$$

$$3.9 \leq f3/f \leq 14.3 \quad (3)$$

$$2.8 \leq f4/f \leq 11.0 \quad (4)$$

where
fi denotes focal length of i-th group with respect to a d-line,
i denotes one of 1 to 4, and
f denotes focal length of an entirety of the imaging lens with respect to the d-line.

In another aspect of this disclosure, there is disclosed a camera apparatus including the imaging lens.

In even another aspect of this disclosure, there is disclosed a mobile object including the camera apparatus.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIGS. 2A and 2B are diagrams illustrating the lens data and aspherical data of the imaging lens according to Example 1;

FIGS. 3A and 3B are diagrams illustrating the values of the focal lengths and the parameters of conditional expressions for the imaging lens according to Example 1;

FIGS. 4A, 4B, 4C are longitudinal aberration diagrams of the imaging lens according to Example 1;

FIGS. 7A and 7B are diagrams illustrating the lens data and aspherical data of the imaging lens according to Example 2;

FIGS. 8A and 8B are diagrams illustrating the values of the focal lengths and the parameters of conditional expressions for the imaging lens according to Example 2;

FIGS. 9A, 9B and 9C are aberration diagrams of spherical aberration, astigmatism, and distortion, respectively of the imaging lens according to Example 2;

FIGS. 12A and 12B are diagrams illustrating the lens data and aspherical data of the imaging lens according to Example 3;

FIGS. 13A and 13B are diagrams illustrating the values of the focal lengths and the parameters of conditional expressions for the imaging lens according to Example 3;

FIGS. 14A, 14B and 14C are aberration diagrams of spherical aberration, astigmatism, and distortion, respectively of the imaging lens according to Example 3;

FIGS. 17A, and 17B are diagrams illustrating the lens data and aspherical data of the imaging lens according to Example 4;

FIGS. 18A and 18B are diagrams illustrating the values of the focal lengths and the parameters of conditional expressions for the imaging lens according to Example 4;

FIGS. 19A, 19B and 19C are aberration diagrams of spherical aberration, astigmatism, and distortion, respectively of the imaging lens according to Example 4;

FIGS. 22A and 22B are diagrams illustrating the lens data and aspherical data of the imaging lens according to Example 5;

FIGS. 23A and 23B are diagrams illustrating the values of the focal lengths and the parameters of conditional expressions for the imaging lens according to Example 5;

FIGS. 24A, 24B and 24C are aberration diagrams of spherical aberration, astigmatism, and distortion, respectively of the imaging lens according to Example 5;

FIGS. 27A and 27B are diagrams illustrating the lens data and aspherical data of the imaging lens according to Example 6;

FIGS. 28A and 28B are diagrams illustrating the values of the focal lengths and the parameters of conditional expressions for the imaging lens according to Example 6;

FIGS. 29A, 29B and 29C are aberration diagrams of spherical aberration, astigmatism, and distortion, respectively of the imaging lens according to Example 6;

FIGS. 32A and 32B are diagrams illustrating the lens data and aspherical data of the imaging lens according to Example 7;

FIGS. 33A and 33B are diagrams illustrating the values of the focal lengths and the parameters of conditional expressions for the imaging lens according to Example 7;

FIGS. 34A, 34B and 34C are aberration diagrams of spherical aberration, astigmatism, and distortion, respectively of the imaging lens according to Example 7;

FIGS. 37A and 37B are diagrams illustrating the lens data and aspherical data of the imaging lens according to Example 8;

FIGS. 38A and 38B are diagrams illustrating the values of the focal lengths and the parameters of conditional expressions for the imaging lens according to Example 8;

FIGS. 39A, 39B and 39C are aberration diagrams of spherical aberration, astigmatism, and distortion, respectively of the imaging lens according to Example 8;

FIGS. 42A and 42B are diagrams illustrating the lens data and aspherical data of the imaging lens according to Example 9;

FIGS. 43A and 43B are diagrams illustrating the values of the focal lengths and the parameters of conditional expressions for the imaging lens according to Example 9;

FIGS. 47A and 47B are diagrams illustrating the lens data and aspherical data of the imaging lens according to Example 10;

FIGS. 48A and 48B are diagrams illustrating the values of the focal lengths and the parameters of conditional expressions for the imaging lens according to Example 10;

FIGS. 49A, 49B and 49C are aberration diagrams of spherical aberration, astigmatism, and distortion, respectively of the imaging lens according to Example 10;

Figure 1:
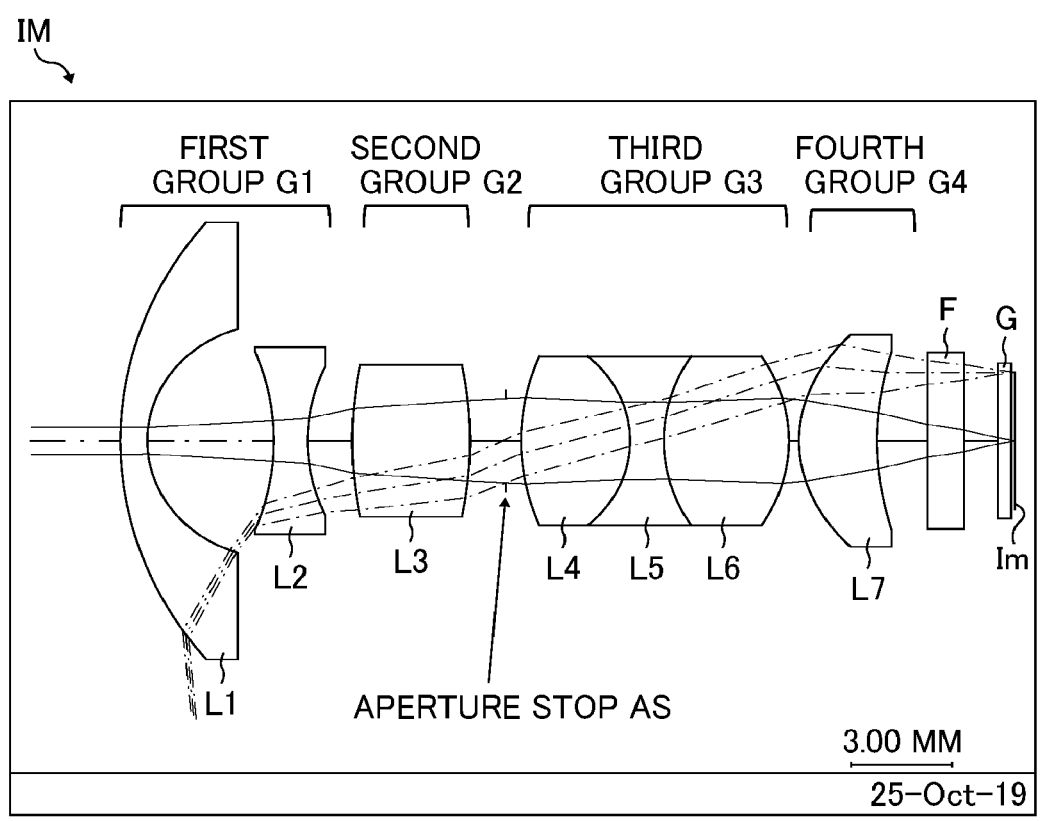
FIG. 1 is an illustration of an imaging lens according to Example 1 of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

The embodiments of the present disclosure provide a novel compact retrofocus imaging lens with a wider angle of view of 120 degrees or more, which is suitable to be mounted on various types of camera apparatuses such as photographic cameras, vehicle-mounted cameras, stereo cameras, inspection cameras, and surveillance cameras.

Some examples and embodiments of the present disclosure are described below with reference to the accompanying drawings.

FIG. 1 is an illustration of an imaging lens IM according to an embodiment of the present disclosure.

The example in FIG. 1 corresponds to an imaging lens IM according to Example 1 to be described later. In the figure, the left side is the object side and the right side is the image side.

The imaging lens IM in FIG. 1 includes a first group G1, a second group G2, an aperture stop AS, a third group G3, and a fourth group G4 sequentially arranged in that order from the object side to the image side.

In the following, reference signs are assigned to the lenses constituting the imaging lens IM in accordance with a rule that the reference signs are L1, L2, Lj, and Lj denotes the j-th lens counted from a lens closest to the object.

The first group G1 includes a lens L1 and a lens L2 arranged from the object side, and the second group G2 includes one lens L3. The third group G3 adjacent to the aperture stop AS and at the image side relative to the aperture stop AS includes three lenses: a lens L4, a lens L5, and a lens L6. The fourth group G4 is one lens L7.

The following describes the lenses constituting the i-th group (i=1 to 4).

The first group G1 includes at least two negative lenses.

The second group G2 includes one positive lens.

The third group G3 includes two positive lenses and one negative lens, and at least two of the three lenses are joined to each other.

The fourth group G4 includes one positive lens having an aspherical shape.

The second group G2 and the fourth group G4 each include one positive lens, and the third group G3 includes two positive lenses and one negative lens.

The first group G1 may include three lenses or four or more lenses to have at least two negative lenses in total. When the first group G1 includes three or more lenses, the lenses other than the two negative lenses may be negative lenses or positive lenses. In this case, the first group G1 including positive lenses still has negative refractive power.

In some embodiments of the present disclosure, the first group G1 is designed to include two or three lenses in total so as to achieve downsizing of the imaging lens. When the first group G1 includes two lenses, both of the two lenses are negative lenses. When the first group G1 includes three lenses, the three lenses are two negative lenses and one positive lens.

When the first group G1 includes two negative lenses and one positive lens, a negative lens, a positive lens, and a negative lens are sequentially arranged in that order from the object side to the image side within the first group G1 The arrangement order is not limited to this order.

When a negative lens is disposed closest to the object within the first group G1, the object-side surface of the negative lens may be convex or concave.

The third group G3 includes three lenses: two positive lenses and one negative lens as described above, and at least two of the three lenses are cemented to each other.

In other words, the third group G3 is an integrated compound lens of three lenses. Alternatively, the third group G3 includes a compound lens (i.e., a compound lens formed by joining two lenses together) and one separate lens.

The two positive lenses and one negative lens of the third group G3 may have one of the following three arrangement configuration of "positive, positive, and negative", "positive, negative, and positive", and "negative, positive, and positive" sequentially arranged in that order from the object side toward the image side. Among these arrangement configurations, it is desired that the third group G3 include the arrangement of "positive, negative, and positive" or "negative, positive, and positive". In particular, it is desired that the third group G3 including a compound lens of three lenses include the arrangement of "positive, negative, and positive".

When the third group G3 includes three lenses: a compound lens (i.e., a compound lens formed by joining two lenses together) and one separate lens, the two lenses of the compound lens may have one of the following three arrangement configurations of "positive and positive", "positive and negative", and "negative and positive" arranged in that order from the object side to the image side. Among these arrangement configurations, the arrangement of "positive and negative" or "negative and positive" is preferred.

In this case, either one of the compound lens and the one separate lens may be disposed closer to the object than the other lens within the third group G3. However, it is desired that the compound lens having the arrangement of "positive and negative" or "negative and positive" is disposed at the object side and a negative lens is disposed at the image side relative to the compound lens.

The imaging lens IM according to the embodiments of the present disclosure satisfies conditional expressions listed below when fi denotes focal length of the i-th group (i is one of 1 to 4) with respect to the d-line, and f is focal length of an entirety of the imaging lens IM with respect to the d-line:

$$-2.7 \leq f1/f \leq -0.7 \quad (1)$$

$$2.2 \leq f2/f \leq 6.6 \quad (2)$$

$$3.9 \leq f3/f \leq 14.3 \quad (3)$$

$$2.8 \leq f4/f \leq 11.0 \quad (4)$$

These conditional expressions restrict the range of refractive power of the first group G1 to the fourth group G4.

In other words, the negative refractive power of the first group G1 and the positive refractive power of the second group G2 to the fourth group G4 are restricted by conditional expressions (1) to (4) so as to balance the negative refractive power of the first group G1 with the positive refractive power of the second group G2 to the fourth group G4. This provides a retrofocus imaging lens with a wide angle of view of 120 degrees or more and higher performance.

The conditional expression (1) restricts the negative refractive power of the first group G1.

When the parameter falls below the lower limit of the conditional expression (1), the negative refractive power of the first group G1 becomes small in the absolute value. As a result, it is difficult to take advantage of the retrofocus imaging lens.

When the parameter exceeds the upper limit of the conditional expression (1), the negative refractive power of the first group G1 increases, which is advantageous for widening the angle of view, but makes it difficult to correct various aberrations, particularly spherical aberration.

The conditional expression (2) restricts the positive refractive power of the second group G2.

When the parameter falls below the lower limit of the conditional expression (2), the positive refractive power of the second group G2 excessively increases. When the parameter exceeds the upper limit of the conditional expression (2), the positive refractive power of the second group G2 excessively decreases. Both cases might hamper the balance between the positive refractive power of the second group G2 and the negative refractive power of the first group G1 satisfying the conditional expression (1), thus making it difficult to correct various aberrations, particularly spherical aberration.

The conditional expression (3) restricts the positive refractive power of the third group G3.

When the parameter falls below the lower limit of the conditional expression (3), the positive refractive power of the third group G3 excessively increases. When the parameter exceeds the upper limit of the conditional expression (3), the positive refractive power of the third group G3 excessively decreases. Both cases might hamper the balance between the positive refractive power of the third group G3, the negative refractive power of the first group G1 satisfying the conditional expression (1), and the positive refractive power of the second group G2 satisfying the conditional expression (2), thus making it difficult to correct various aberrations, particularly coma aberration.

The conditional expression (4) restricts the positive refractive power of the fourth group G4.

When the parameter falls below the lower limit of the conditional expression (4), the positive refractive power of the fourth group G4 excessively increases. When the parameter exceeds the upper limit of the conditional expression (4), the positive refractive power of the fourth group G4 excessively decreases. Both cases might hamper the balance between the positive refractive power of the fourth group G4, the negative refractive power of the first group G1 satisfying the conditional expression (1), the positive refractive power of the second group G2 satisfying the conditional expression (2), and the positive refractive power of the third group G3 satisfying the conditional expression (3), thus making it difficult to correct various aberrations, particularly distortion aberration.

The focal length (f) of the entirety of the imaging lens IM according to the embodiments of the present disclosure is appropriately set according to the specification of the imaging lens IM. In view of incorporating the imaging lens IM into a vehicle-mounted camera, a stereo camera, an inspection camera, and a surveillance camera, an excessively long focal length adversely increases the lens diameter of the first group G1 with a decrease in F-number, thus resulting in upsizing of the imaging lens IM and the camera apparatus CA in the end. Further, an excessively short focal length contributes to downsizing of the imaging lens but makes it difficult to correct various aberrations.

In view of this, it is desired that the focal distance f of the entirety of the imaging system IM with respect to the d-line satisfy a conditional expression below: 1.5 mm≤f<22 mm Each lens constituting the imaging lens IM according to the embodiments of the present disclosure is a spherical lens. Alternatively, one or more lenses of the imaging lens 1M may be an aspherical lens.

In this case, in view of the aberration correcting function of an aspherical surface, the positive lens closest to the image within the fourth group G4 is suitable for the aspherical lens having at least one aspherical surface. The aspherical surface included in the fourth group G4 successfully corrects various aberrations that occur in the first group G1 to the third group G3.

In particular, the positive lens whose both sides are aspherical within the fourth group G4 achieves successful aberration correction.

Referring to FIG. 1, the first group G1 of the imaging lens IM includes a negative lens L1 and a negative lens L2 arranged in that order from the object side to the image side. The negative lens L1 is a negative meniscus lens with a convex surface facing the object side, and the negative lens L2 is a biconcave lens.

The second group G2 includes one positive lens L3, and the positive lens L3 is a thick biconvex lens.

The third group G3 includes an integrated compound lens of a positive lens L4, a negative lens L5, and a positive lens L6, which are sequentially arranged from the object side toward the image side. The positive lens L4 is a thick biconvex lens, the negative lens L5 is a biconcave lens, and the positive lens L6 is a thick biconvex lens.

The fourth group G4 includes one positive lens L7, and the positive lens L7 has a shape of a positive meniscus lens with a convex surface facing the object side and aspherical surface at each side.

FIG. 1 indicates one transparent parallel plate F optically equivalent to various kinds of filter such as an infrared cutoff filter or a low pass filter.

Further, the imaging lens IM in FIG. 1 is assumed to form an image on a photo-sensing surface of an image sensor (e.g., area sensor), and an image plane Im on which the image is formed corresponds to the photo-sensing surface of the image sensor. FIG. 1 also indicates a cover glass G that protects photo-sensing surface of the image sensor.

The following describes ten examples (Example 1 to Example 10) of the imaging lens IM.

In the following Examples 1 to 10, it is assumed that an image sensor reads an image of an object, and the distortion aberration is corrected by electronic calculation.

EXAMPLES

Example 1

FIG. 1 is an illustration of an imaging lens according to Example 1 with the above-described lens configuration.

FIGS. 2A and 2B are tables of data according to Example 1. In FIG. 2A, the "SURFACE NUMBER" refers to the ordinal number of a surface counted from a surface closest to an object, and the ordinal number (i.e., a surface number of 7) of an aperture stop AS is also included in the table. The "SURFACE TYPE" refers to a surface type of each surface number, and the term "SPHERE" refers to a spherical surface, which means that the surface includes a plane with an infinite radius of curvature. The term "ASPHERICAL SURFACE" is defined by the following expression when Z is an aspherical amount, R is a paraxial curvature radius, h is a distance from the optical axis, K is a conic constant, and $E_4$, $E_6$, $E_8$, and $E_{10}$ are the aspherical surface coefficients of the fourth order, sixth order, eighth order, and tenth order, respectively:

$$Z=(h^2/R)/[1+\sqrt{(1-(1+K)(h/R)^2}]+E4 \cdot h^4+E6 \cdot h^6+E8 \cdot h^8+E^{10} \cdot h^{10}$$

FIG. 2B is a table of the aspherical data (i.e., data on both sides of the lens L7 of the fourth group G4). In the table, "5.69E-04" refers to "5.69λ10⁻⁴".

FIG. 3A is a table of data on the focal lengths (fd), with respect to the d-line, of all the lenses L1 to L7, the first group G1 to the fourth group G4, and an entirety of the optical system (i.e., an entire system) according to Example 1.

FIG. 3B is a table of data on the parameters of conditional expressions (1) to (4) according to Example 1.

Figure 4A:
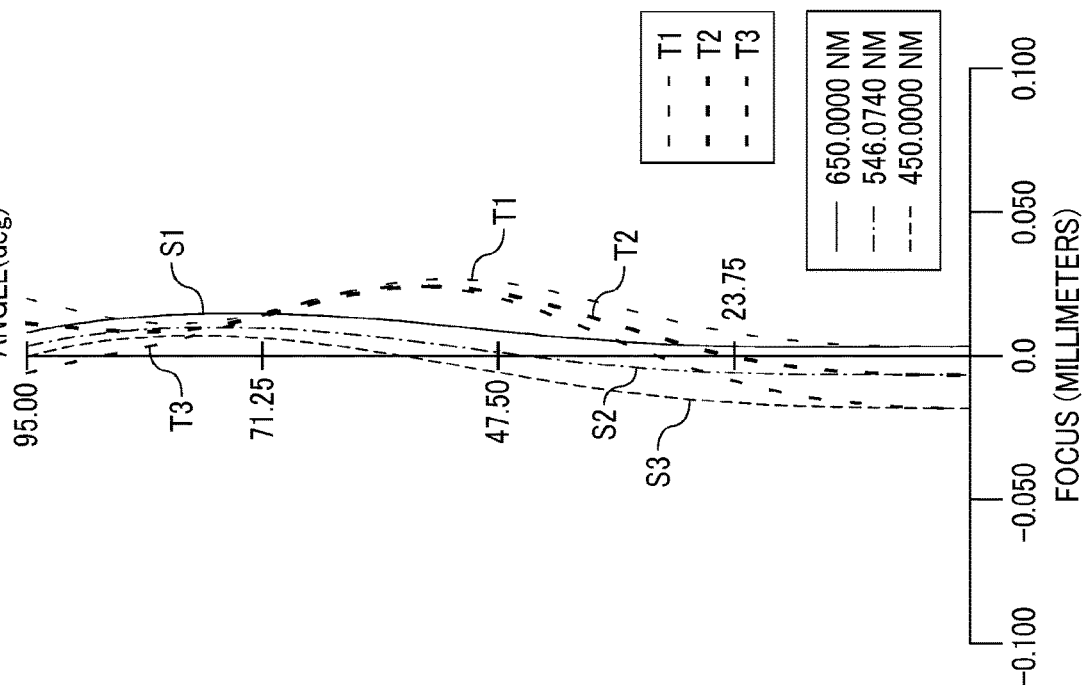
Figure 4B:
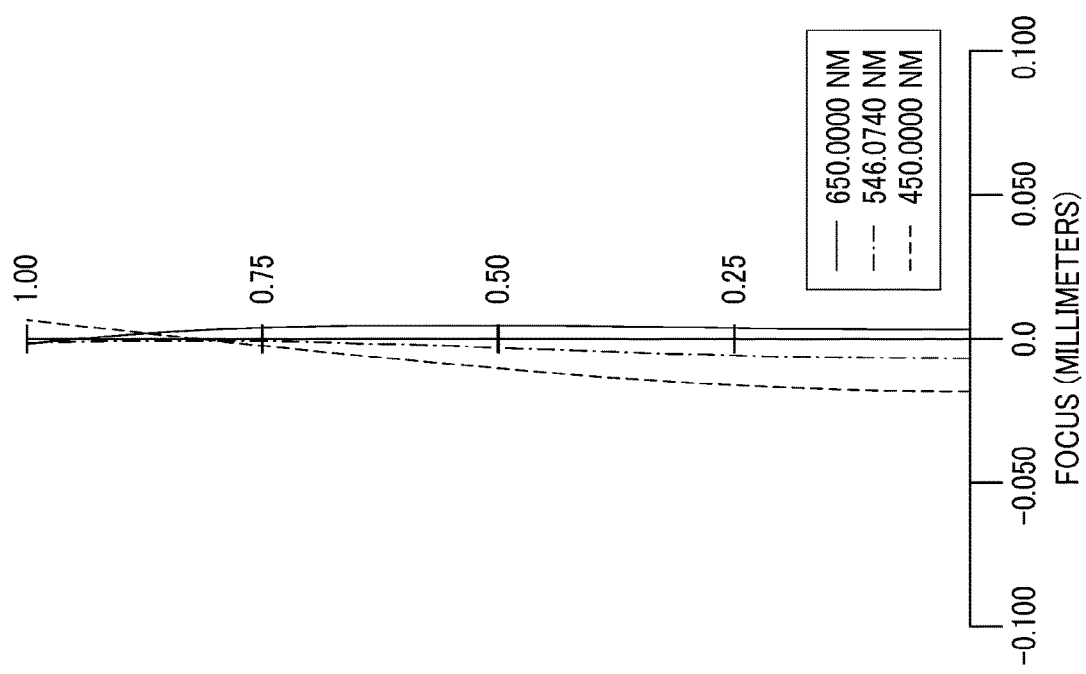

FIGS. 4A, 4B, and 4C are longitudinal aberration diagrams of the imaging lens IM according to Example 1. FIG. 4A is a spherical aberration diagram, FIG. 4B is an astigmatism diagram, and FIG. 4C is a distortion diagram.

The diagrams indicate that spherical aberration and astigmatism are corrected very well, and distortion is slightly large but is electronically correctable.

Figure 5:
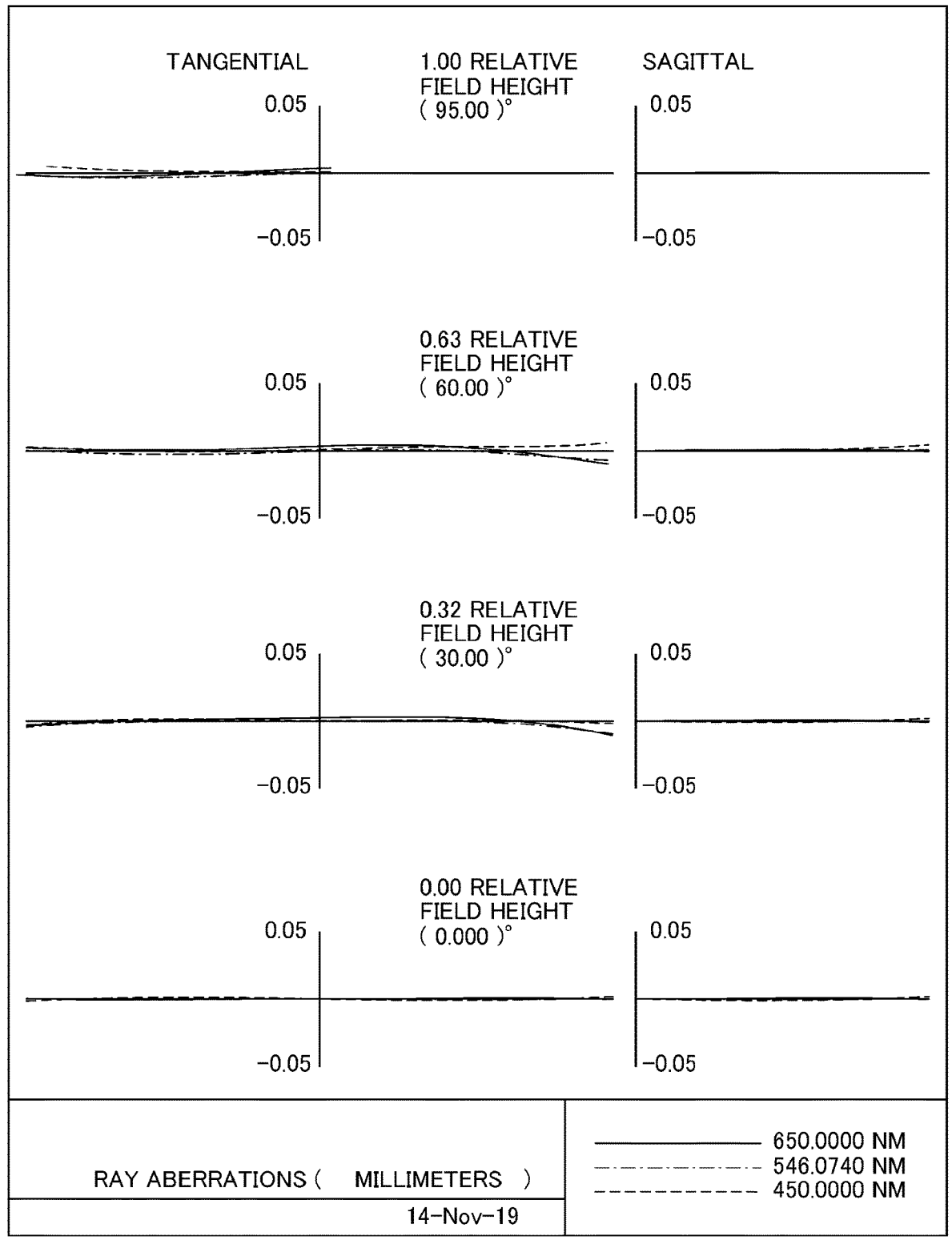
FIG. 5 is a collection of lateral aberration diagrams of the imaging lens according to Example 1.

FIG. 5 is a collection of lateral aberration diagrams of the imaging lens IM according to Example 1. FIG. 5 indicates that the lateral aberrations are also extremely successfully corrected.

Example 2

Figure 6:
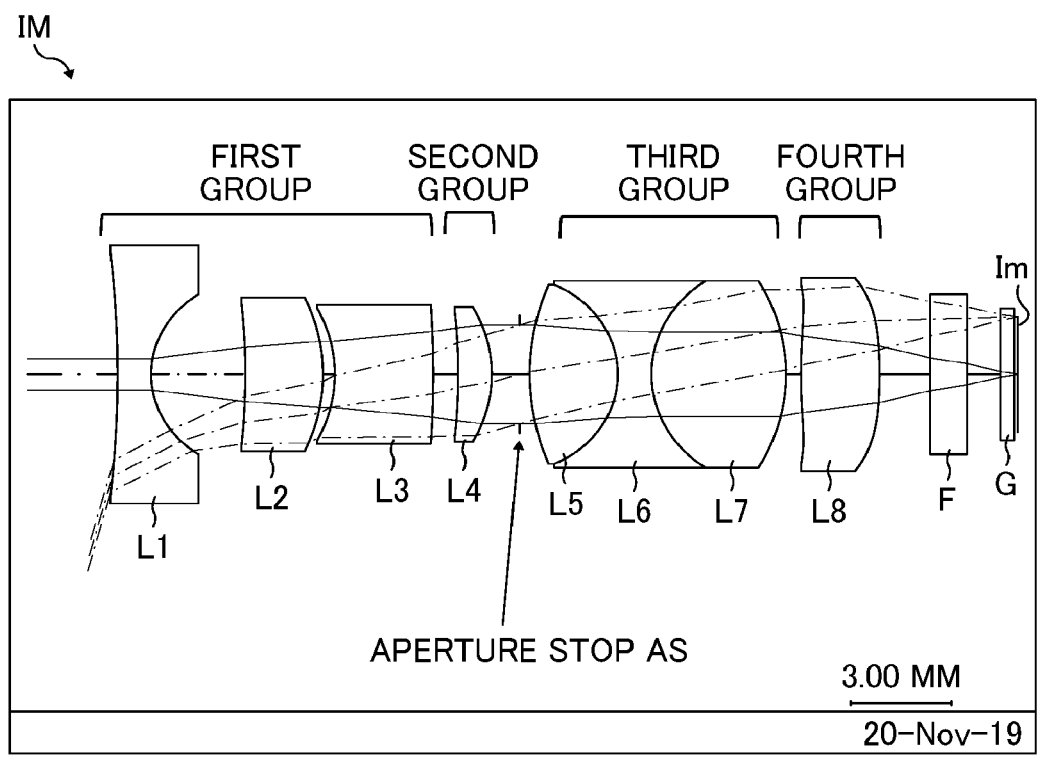
FIG. 6 is an illustration of an imaging lens according to Example 2 of the present disclosure.

FIG. 6 is a diagram illustrating a configuration of an imaging lens IM according to Example 2. For purposes of simplification, like reference signs are given to elements similar to those illustrated in FIG. 1 as long as no confusion is expected. Regarding the lenses, the j-th lens counted from the lens closest to the object is indicated by Lj in accordance with the above-described rule.

The first group G1 includes three lenses of a negative lens L1, a positive lens L2, and a negative lens L3.

The negative lens L1 is a biconcave lens. In other words, an object-side surface of the negative lens L1 is also concave. The positive lens L2 is a positive meniscus lens with a convex surface facing the image side, and the negative lens L3 is a thick negative meniscus lens with a concave surface facing the object side.

The second group G2 includes one positive meniscus lens (i.e., a positive lens) L4 with a convex surface facing the image side.

The third group G3 on the image side relative to the aperture stop AS is an integrated compound lens of three lenses: a biconvex lens (i.e., a positive lens) L5, a biconcave lens (i.e., a negative lens) L6, and a thick biconvex lens L7, which are sequentially arranged from the object side toward the image side.

The fourth group G4 is a positive lens L8 whose both sides are aspherical.

FIGS. 7A and 7B are tables of the lens data and the aspherical data according to Example 2 of the present disclosure, respectively, in a similar manner to FIGS. 2A and 2B.

FIG. 8A is a table of data on the focal lengths, with respect to the d-line, of all the lenses L1 to L8, the first group G1 to the fourth group G4, and an entirety of the optical system (i.e., an entire system) according to Example 2. FIG. 8B is a table of data on the parameters of conditional expressions (1) to (4) according to Example 2.

Figure 9A:
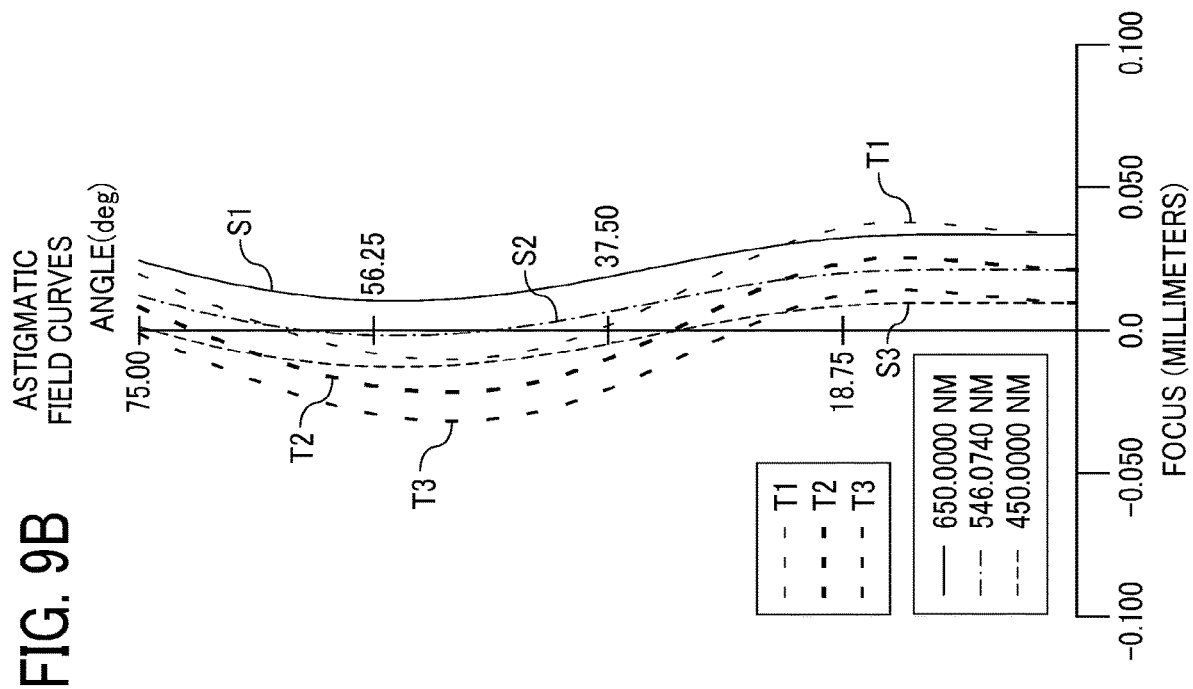
Figure 9B:
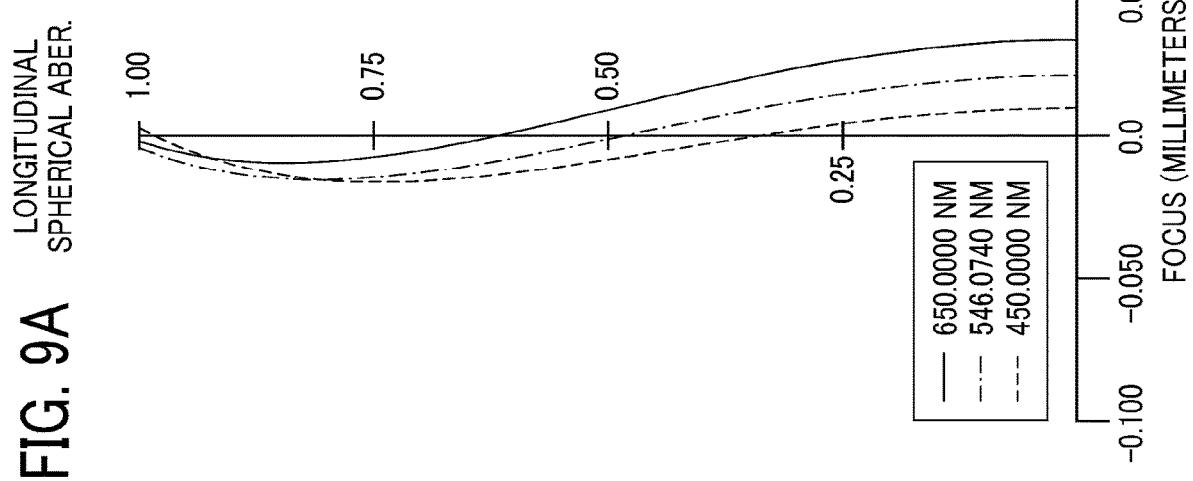

FIGS. 9A, 9B, and 9C are longitudinal aberration diagrams of the imaging lens IM according to Example 2, in a similar manner to FIGS. 4A, 4B, and 4C.

The diagrams indicate that spherical aberration and astigmatism are corrected very well, and distortion is a little large but is electronically correctable.

Figure 10:
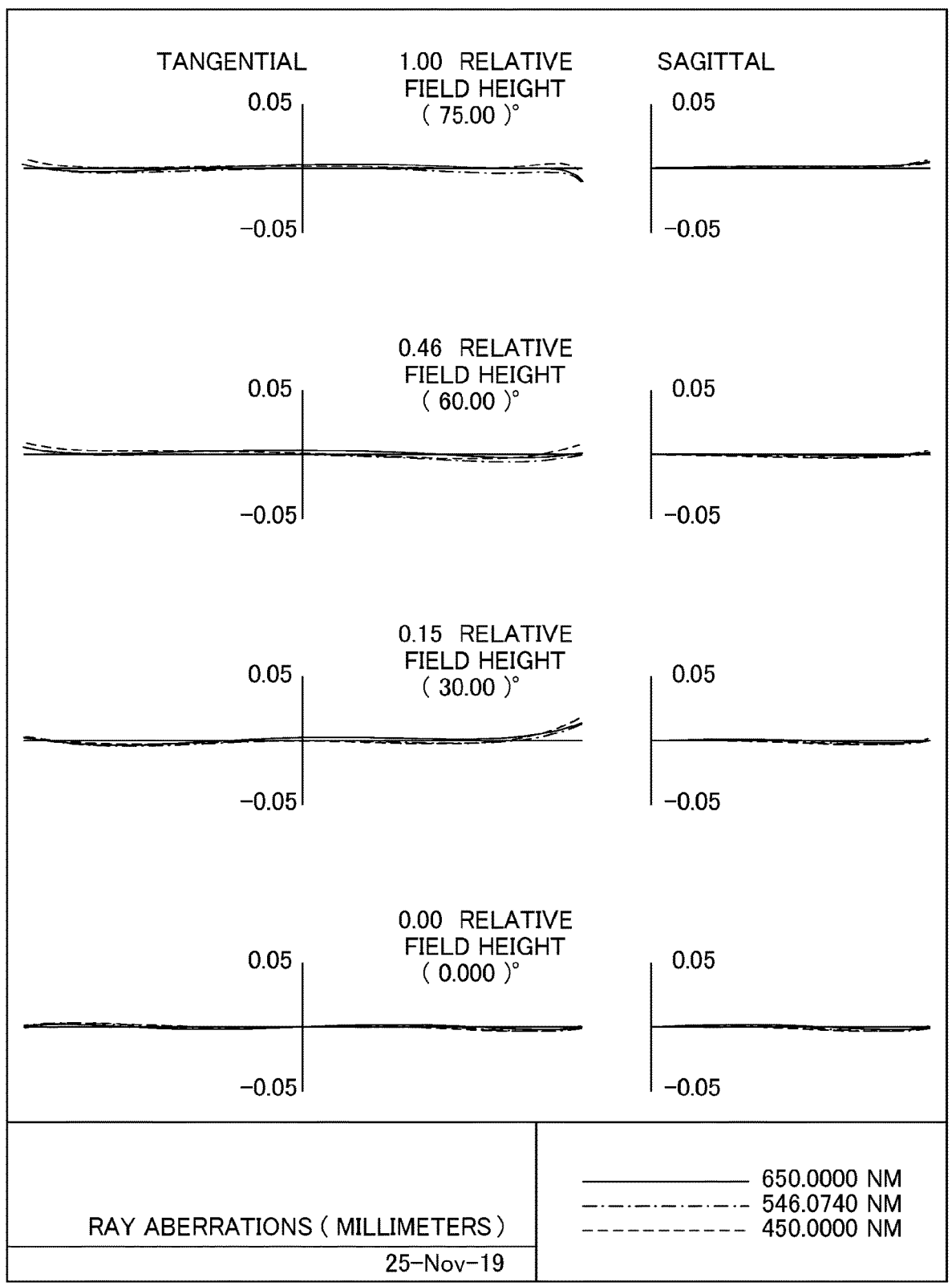
FIG. 10 is a collection of lateral aberration diagrams of the imaging lens according to Example 2.

FIG. 10 is a collection of lateral aberration diagrams of the imaging lens IM according to Example 2. FIG. 10 indicates that the lateral aberrations are also extremely successfully corrected.

Example 3

Figure 11:
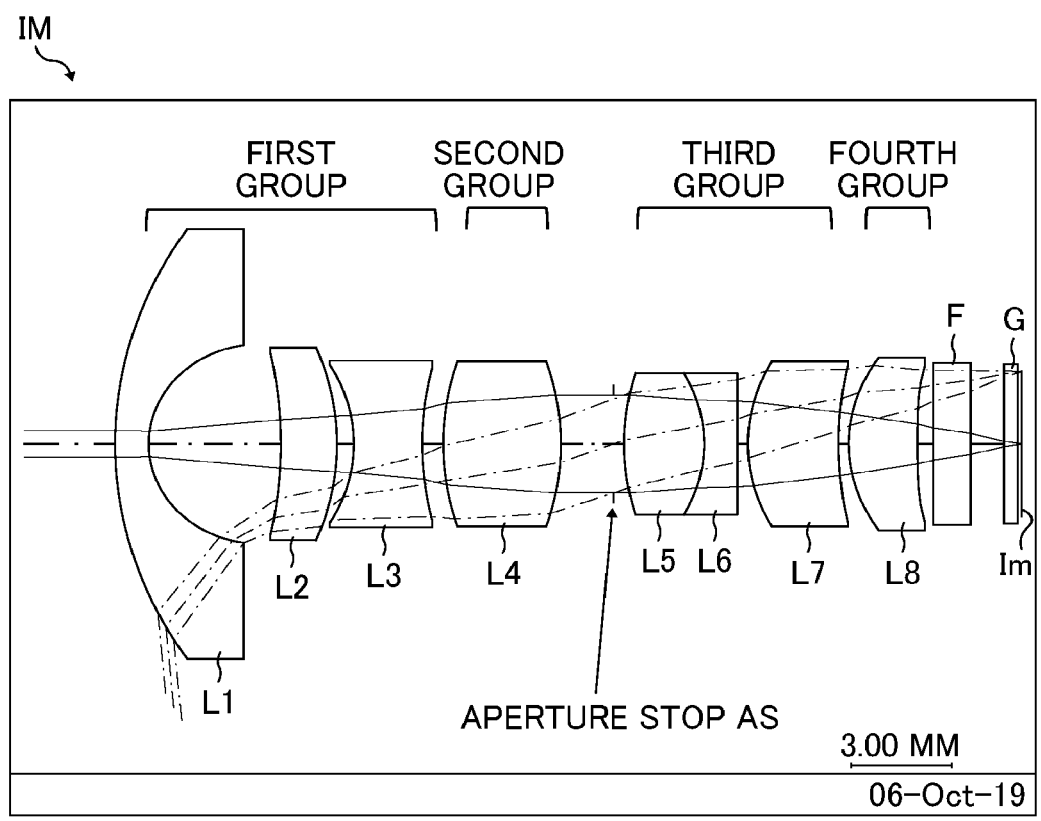
FIG. 11 is an illustration of an imaging lens according to Example 3 of the present disclosure.

FIG. 11 is a diagram illustrating a configuration of an imaging lens IM according to Example 3. For purposes of simplification, like reference signs are given to elements similar to those illustrated in FIG. 1 as long as no confusion is expected. Regarding the lenses, the j-th lens counted from the lens closest to the object is indicated by Lj in accordance with the above-described rule.

The first group G1 includes three lenses of a negative lens L1, a positive lens L2, and a negative lens L3.

The negative lens L1 is a negative meniscus lens with a convex surface facing the object side, and the positive lens L2 is a positive meniscus lens with a convex surface facing the image side, and the negative lens L3 is a thick biconcave lens.

The second group G2 includes a thick biconvex lens (i.e., a positive lens) L4.

The third group G3 on the image side relative to the aperture stop AS includes three lenses: a compound lens of two lenses and a lens L7 that is separate from the compound lens and disposed at the image side relative to the compound lens. The compound lens is formed by joining a biconvex lens (i.e., a positive lens) L5 and a concave meniscus lens L6 together. The biconvex lens L5, the concave meniscus lens L6, and the lens L7 are sequentially arranged from the object side toward the image side. The lens L7 is a thick positive meniscus lens with a convex surface facing the object side.

The fourth group G4 is a positive lens L8 whose both sides are aspherical.

FIGS. 12A and 12B are tables of the lens data and the aspherical data according to Example 3 of the present disclosure, respectively, in a similar manner to FIGS. 2A and 2B.

FIG. 13A is a table of data on the focal lengths, with respect to the d-line, of all the lenses L1 to L8, the first group G1 to the fourth group G4, and an entirety of the optical system (i.e., an entire system) according to Example 3. FIG. 13B is a table of data on the parameters of conditional expressions (1) to (4) according to Example 3.

Figure 14A:
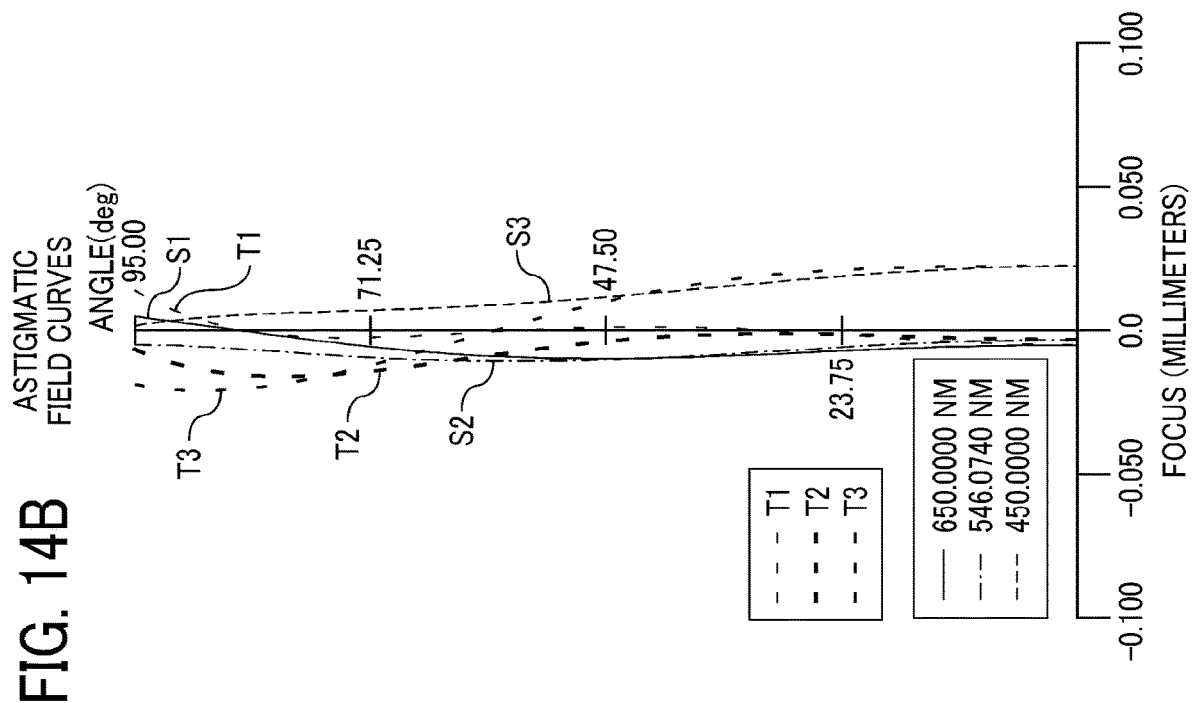
Figure 14B:
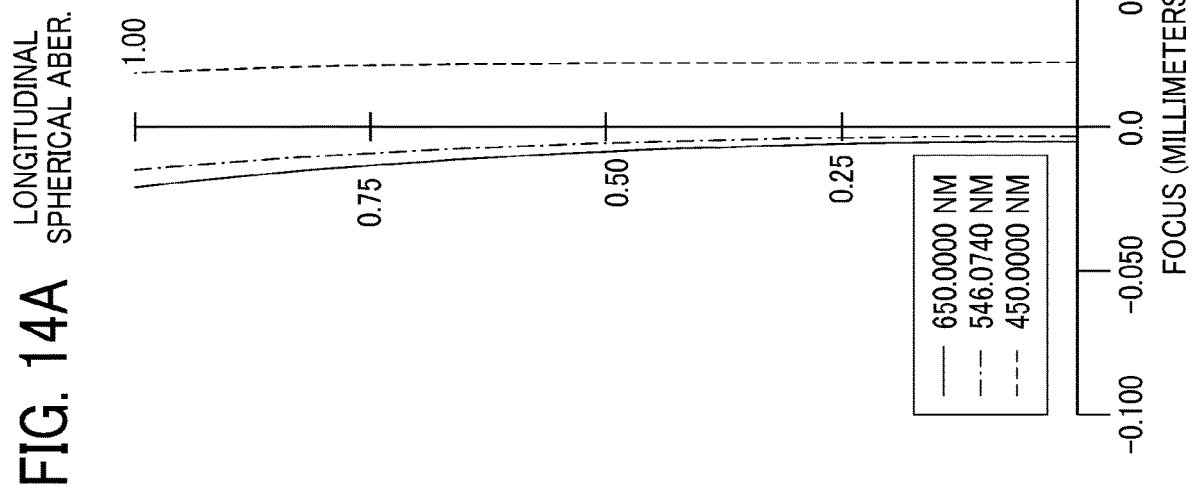

FIGS. 14A, 14B, and 14C are longitudinal aberration diagrams of the imaging lens IM according to Example 3, in a similar manner to FIGS. 4A, 4B, and 4C.

The diagrams indicate that spherical aberration and astigmatism are corrected very well, and distortion is a little large but is electronically correctable.

Figure 15:
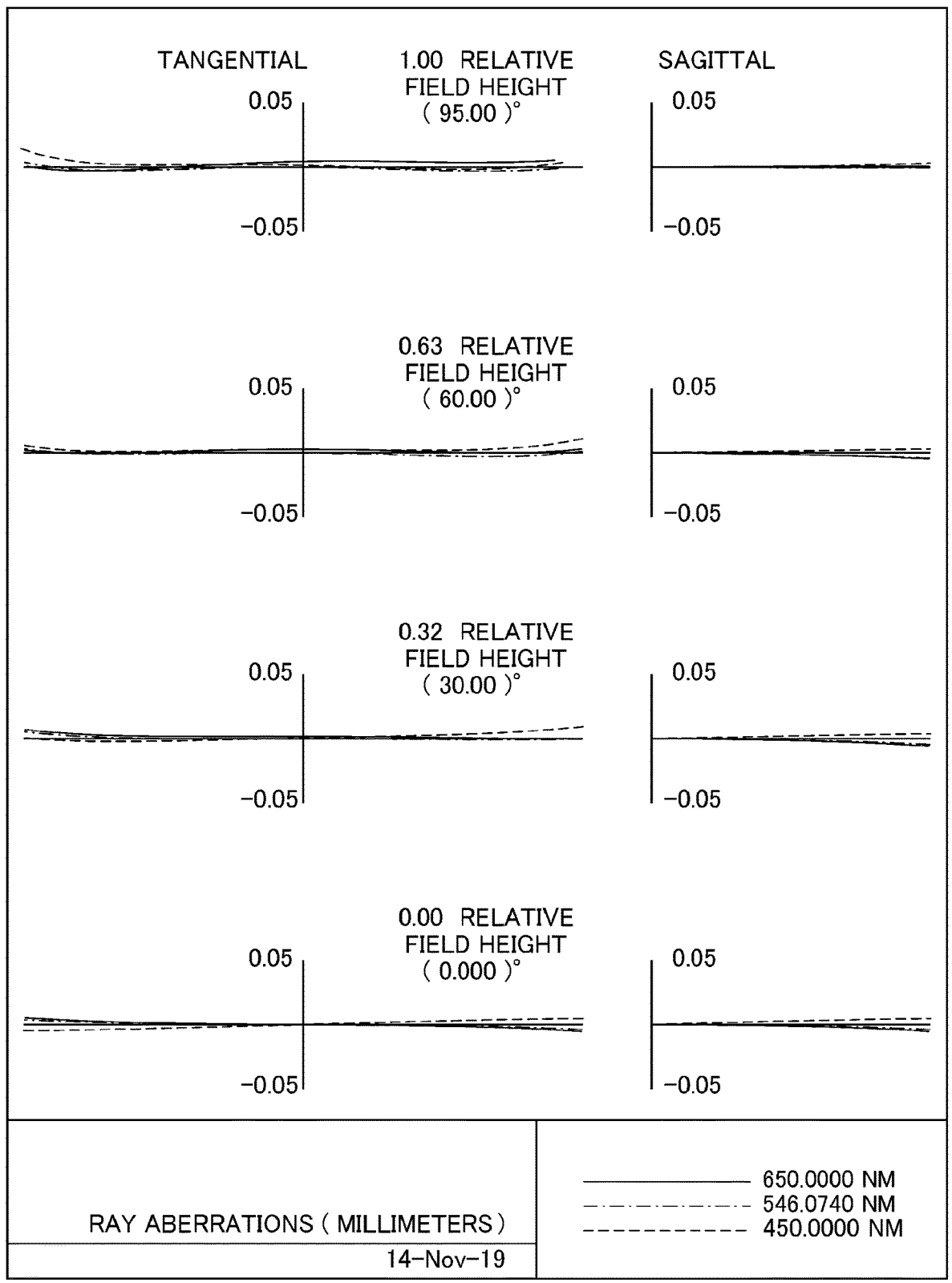
FIG. 15 is a collection of lateral aberration diagrams of the imaging lens according to Example 3.

FIG. 15 is a collection of lateral aberration diagrams of the imaging lens IM according to Example 3. FIG. 15 indicates that the lateral aberrations are also extremely successfully corrected.

Example 4

Figure 16:
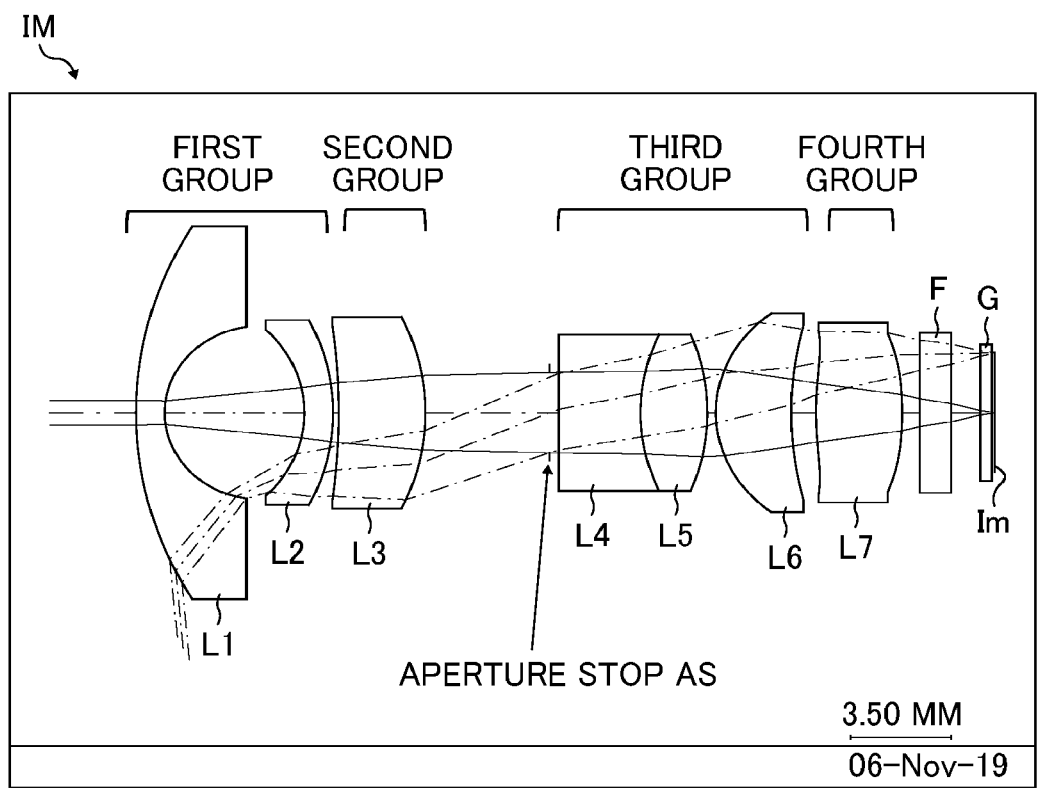
FIG. 16 is an illustration of an imaging lens according to Example 4 of the present disclosure.

FIG. 16 is a diagram illustrating a configuration of an imaging lens IM according to Example 4. For purposes of simplification, like reference signs are given to elements similar to those illustrated in FIG. 1 as long as no confusion is expected. Regarding the lenses, the j-th lens counted from the lens closest to the object is indicated by Lj in accordance with the above-described rule.

The first group G1 includes two lenses: a negative lens L1 and a negative lens L2.

The negative lens L1 is a negative meniscus lens with a convex surface facing the object side, and the negative lens L2 is a negative meniscus lens with a convex surface facing the image side.

The second group G2 includes one positive lens L3, and the positive lens L3 is a thick positive meniscus lens with a convex surface facing the image side.

The third group G3 on the image side relative to the aperture stop AS includes three lenses: a compound lens of two lenses and a positive lens L6 that is separate from the compound lens and disposed at the image side relative to the compound lens. The compound lens is formed by joining a thick biconcave lens L4 and biconvex lens L5 together. The biconcave lens L4, the biconvex lens L5, and the positive lens L6 are sequentially arranged from the object side toward the image side. The lens L6 is a positive meniscus lens with a convex surface facing the object side.

The fourth group G4 is one positive lens L7, and the positive lens L7 whose both sides are aspherical.

FIGS. 17A and 17B are tables of the lens data and the aspherical data according to Example 4 of the present disclosure, respectively, in a similar manner to FIGS. 2A and 2B.

FIG. 18A is a table of data on the focal lengths, with respect to the d-line, of all the lenses L1 to L7, the first group G1 to the fourth group G4, and an entirety of the optical system (i.e., an entire system) according to Example 4. FIG.

18B is a table of data on the parameters of conditional expressions (1) to (4) according to Example 4.

Figure 19B:
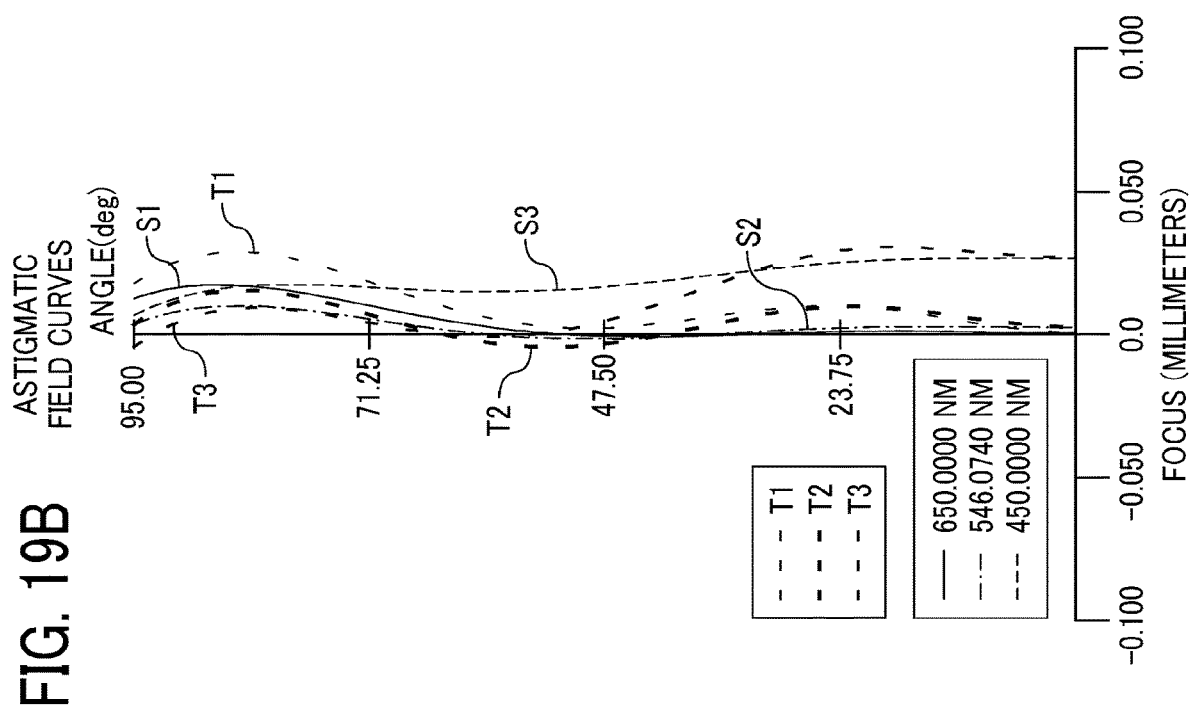
Figure 19A:
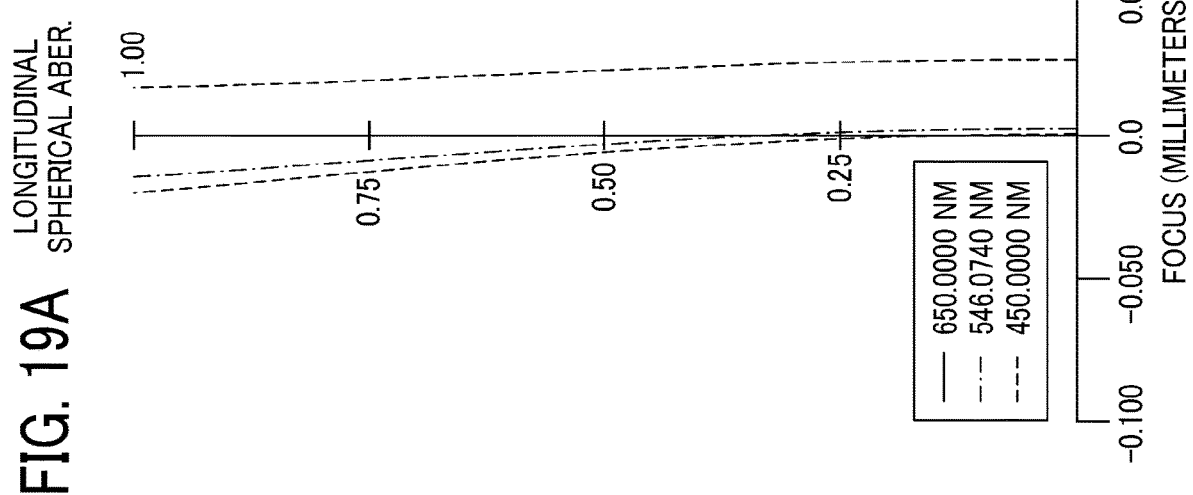

FIGS. 19A, 19B, and 19C are longitudinal aberration diagrams of the imaging lens IM according to Example 4, in a similar manner to FIGS. 4A, 4B, and 4C.

The diagrams indicate that spherical aberration and astigmatism are corrected very well, and distortion is a little large but is electronically correctable.

Figure 20:
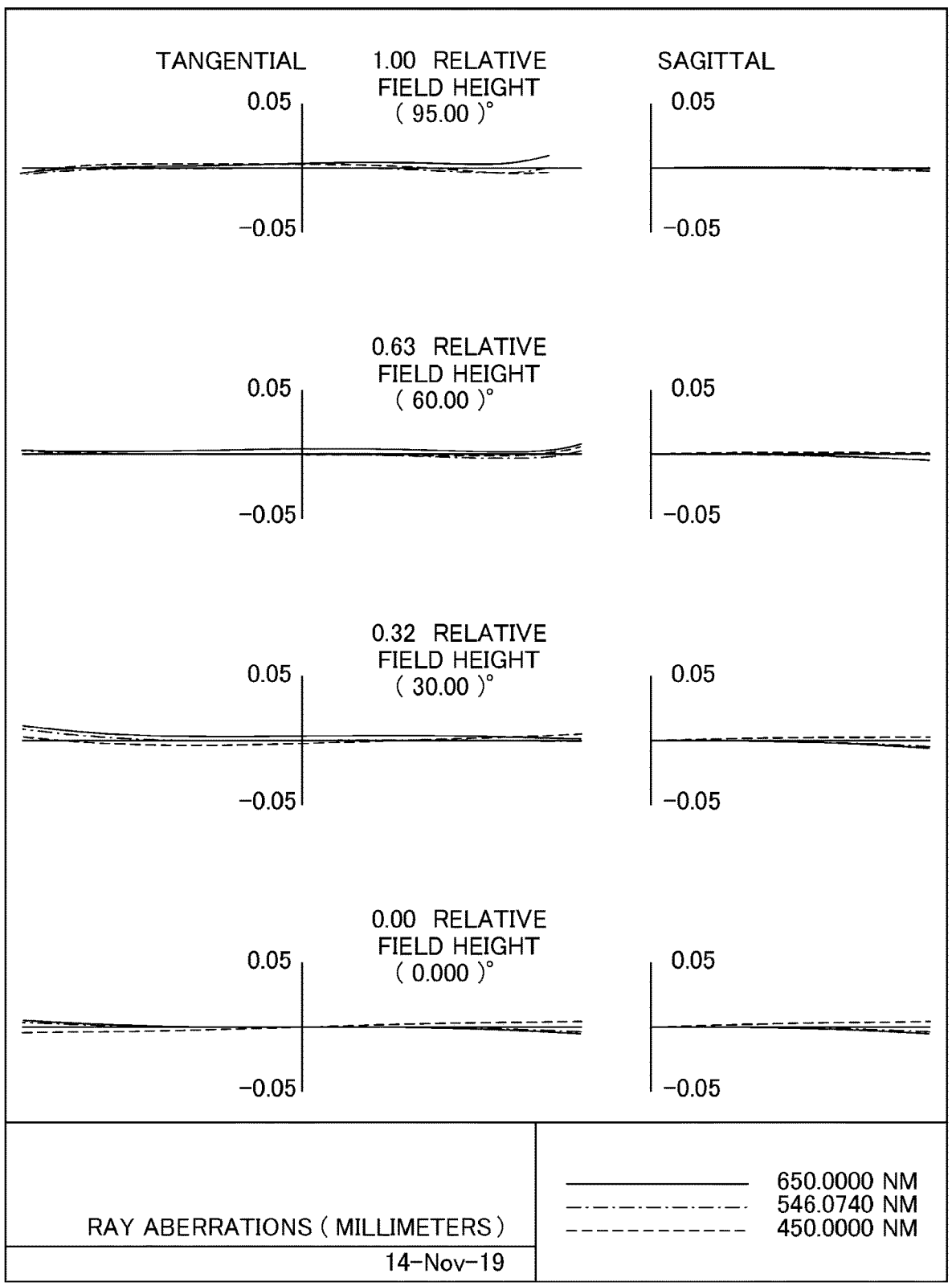
FIG. 20 is a collection of lateral aberration diagrams of the imaging lens according to Example 4.

FIG. 20 is a collection of lateral aberration diagrams of the imaging lens IM according to Example 4. FIG. 20 indicates that the lateral aberrations are also extremely successfully corrected.

Example 5

Figure 21:
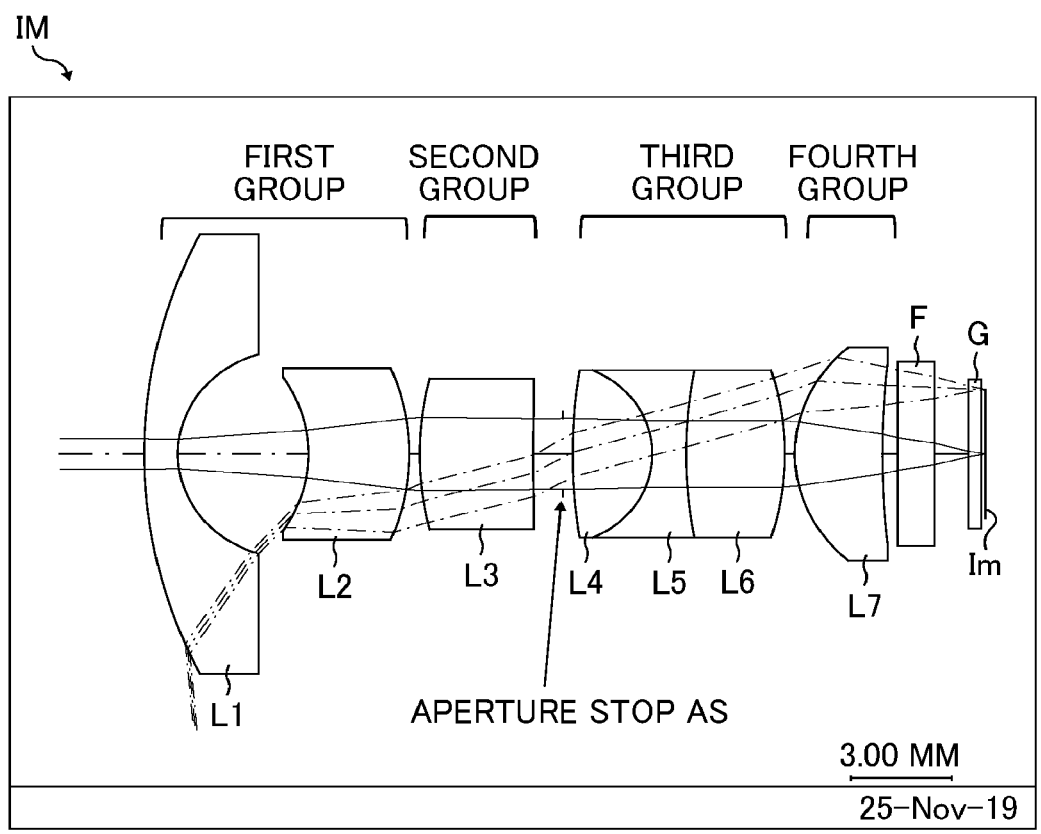
FIG. 21 is an illustration of an imaging lens according to Example 5 of the present disclosure.

FIG. 21 is a diagram illustrating a configuration of an imaging lens IM according to Example 5. For purposes of simplification, like reference signs are given to elements similar to those illustrated in FIG. 1 as long as no confusion is expected. Regarding the lenses, the j-th lens counted from the lens closest to the object is indicated by Lj in accordance with the above-described rule.

The first group G1 includes two lenses: a negative lens L1 and a negative lens L2.

The negative lens L1 is a negative meniscus lens with a convex surface facing the object side, and the negative lens L2 is a thick negative meniscus lens with a convex surface facing the image side.

The second group G2 includes one positive lens L3, and the positive lens L3 is a thick positive meniscus lens with a convex surface facing the object side.

The third group G3 on the image side relative to the aperture stop AS is a compound lens formed by joining three lenses: a thick biconvex lens L4, a biconcave lens L5, and a thick biconvex lens L6 together, which are sequentially arranged from the object side toward the image side.

The fourth group G4 includes one positive lens L7, and the positive lens L7 whose both sides are aspherical.

FIGS. 22A and 22B are tables of the lens data and the aspherical data according to Example 5 of the present disclosure, respectively, in a similar manner to FIGS. 2A and 2B.

FIG. 23A is a table of data on the focal lengths, with respect to the d-line, of all the lenses L1 to L7, the first group G1 to the fourth group G4, and an entirety of the optical system (i.e., an entire system) according to Example 5.

FIG. 32B is a table of data on the parameters of conditional expressions (1) to (4) according to Example 5.

Figure 24A:
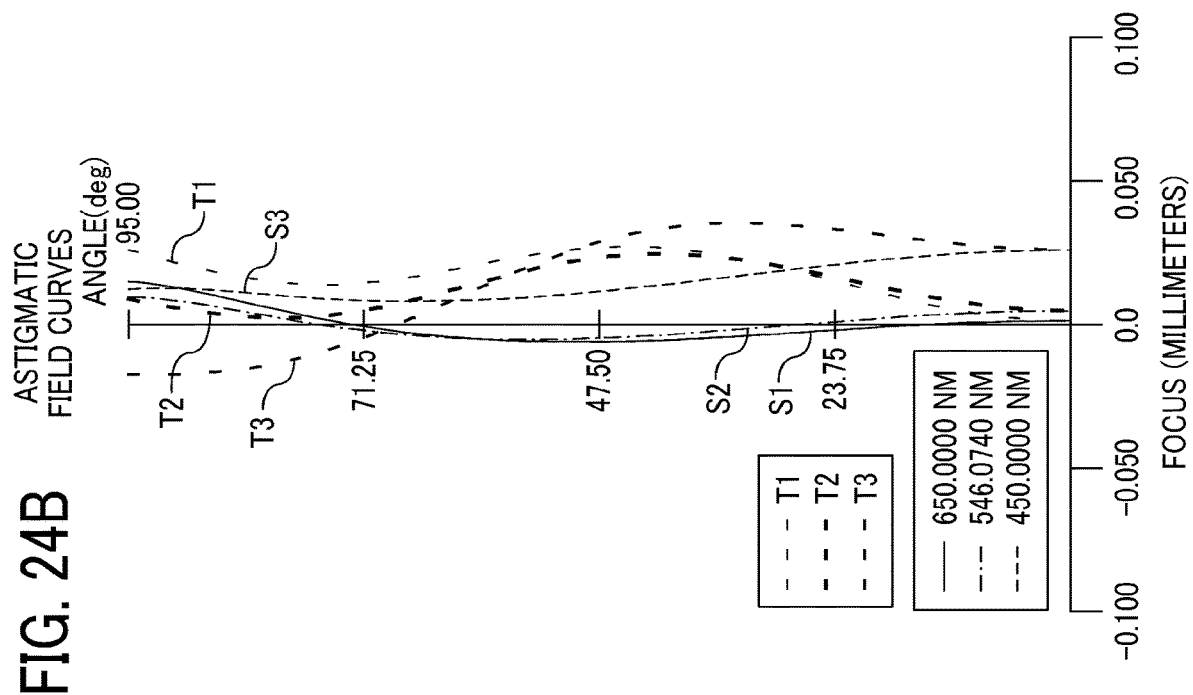
Figure 24B:
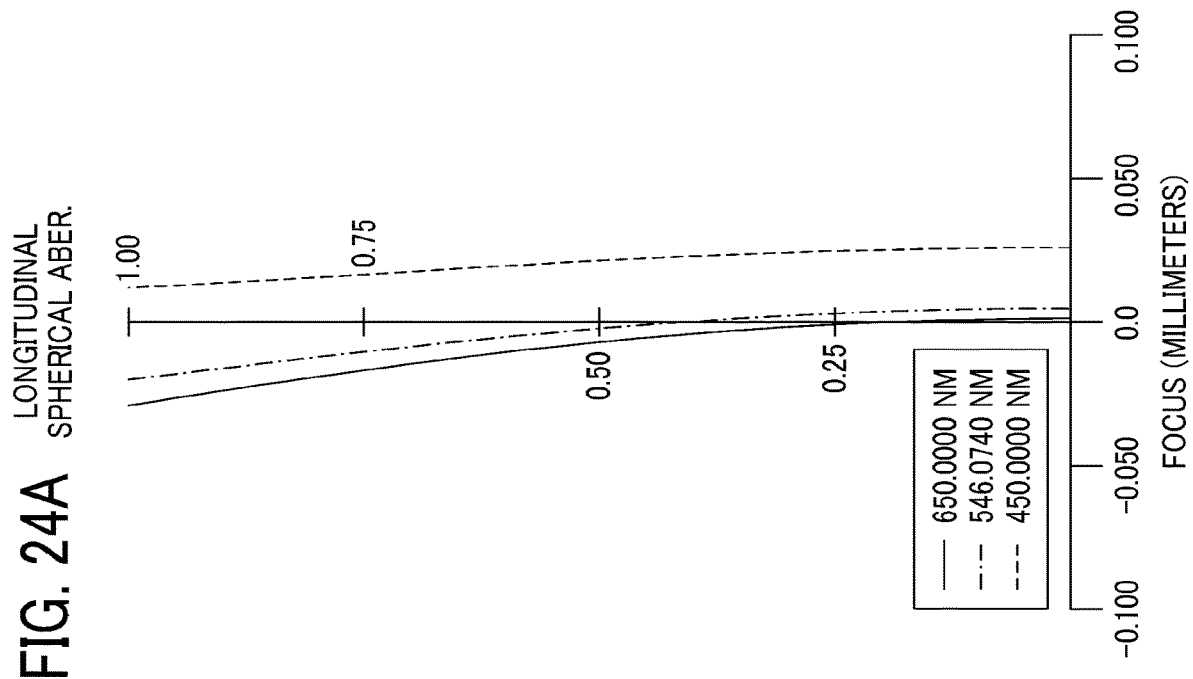

FIGS. 24A, 24B, and 24C are longitudinal aberration diagrams of the imaging lens IM according to Example 5, in a similar manner to FIGS. 4A, 4B, and 4C.

The diagrams indicate that spherical aberration and astigmatism are corrected very well, and distortion is a little large but is electronically correctable.

Figure 25:
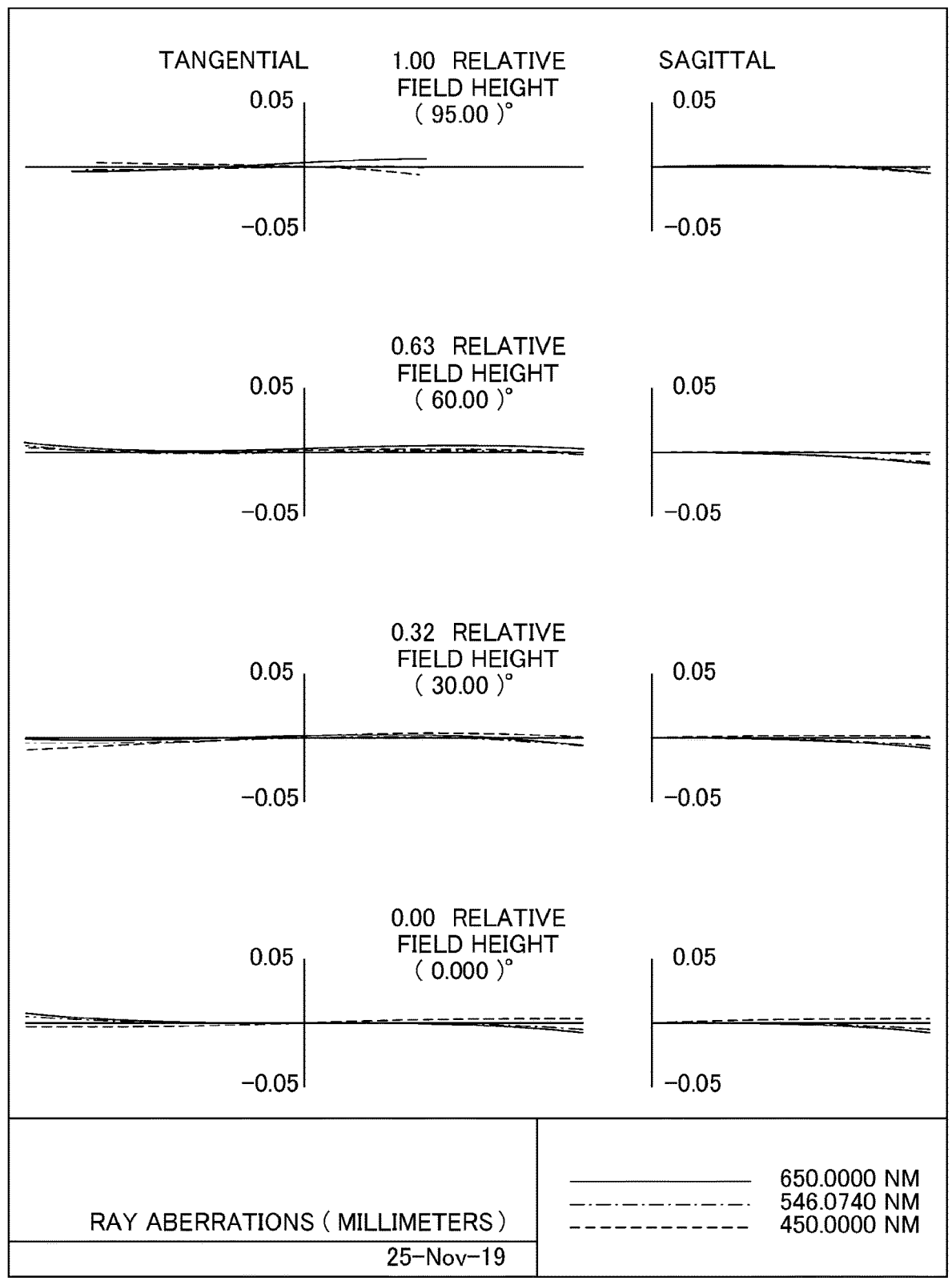
FIG. 25 is a collection of lateral aberration diagrams of the imaging lens according to Example 5.

FIG. 25 is a collection of lateral aberration diagrams of the imaging lens IM according to Example 5. FIG. 25 indicates that the lateral aberrations are also extremely successfully corrected.

Example 6

Figure 26:
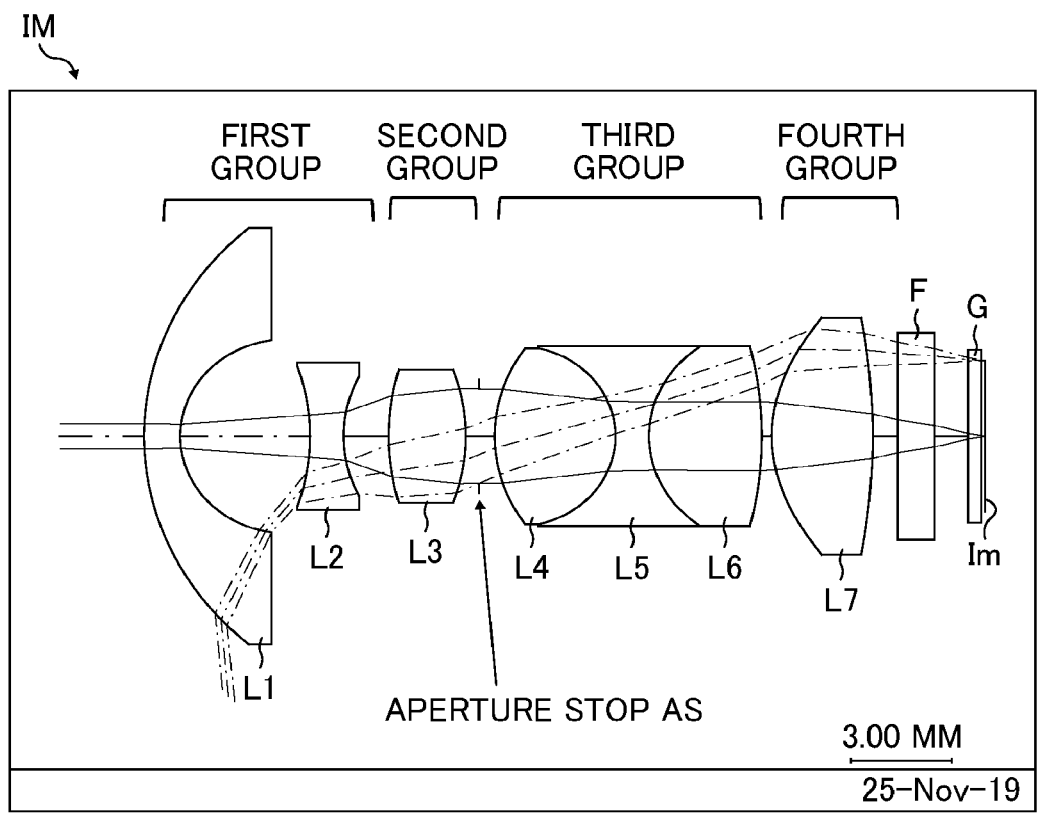
FIG. 26 is an illustration of an imaging lens according to Example 6 of the present disclosure.

FIG. 26 is a diagram illustrating a configuration of an imaging lens IM according to Example 6. For purposes of simplification, like reference signs are given to elements similar to those illustrated in FIG. 1 as long as no confusion is expected. Regarding the lenses, the j-th lens counted from the lens closest to the object is indicated by Lj in accordance with the above-described rule.

The first group G1 includes two lenses: a negative lens L1 and a negative lens L2.

The negative lens L1 is a negative meniscus lens with a convex surface facing the object side, and the negative lens L2 is a biconcave lens.

The second group G2 includes one positive lens L3, and the positive lens L3 is a thick biconvex lens.

The third group G3 on the image side relative to the aperture stop AS is a compound lens formed by joining three lenses: a thick biconvex lens L4, a biconcave lens L5, and a thick biconvex lens L6 together, which are sequentially arranged from the object side toward the image side.

The fourth group G4 includes one positive lens L7, and the positive lens L7 whose both sides are aspherical.

FIGS. 27A and 27B are tables of the lens data and the aspherical data according to Example 6 of the present disclosure, respectively, in a similar manner to FIGS. 2A and 2B.

FIG. 28A is a table of data on the focal lengths, with respect to the d-line, of all the lenses L1 to L7, the first group G1 to the fourth group G4, and an entirety of the optical system (i.e., an entire system) according to Example 6.

FIG. 28B is a table of data on the parameters of conditional expressions (1) to (4) according to Example 6.

Figure 29B:
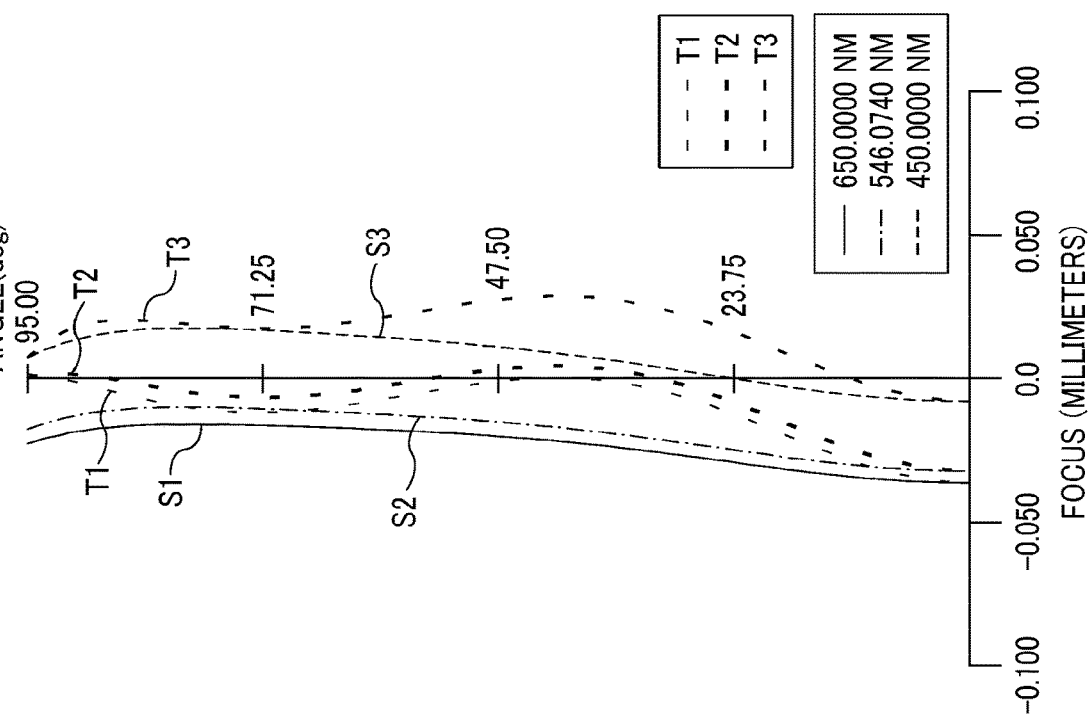
Figure 29A:
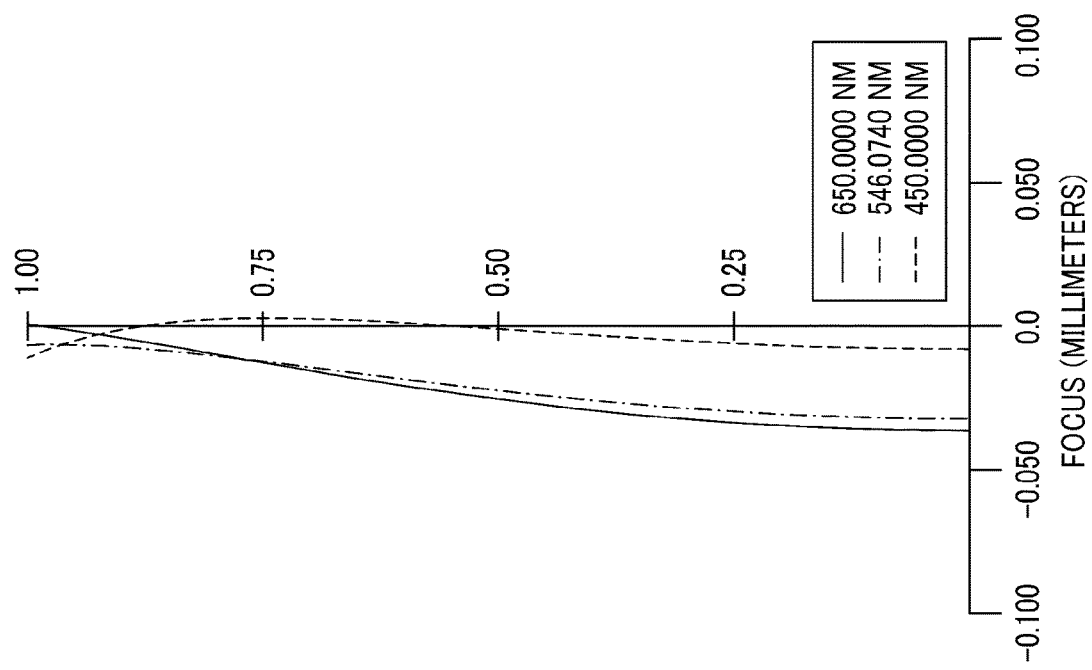

FIGS. 29A, 29B, and 29C are longitudinal aberration diagrams of the imaging lens IM according to Example 6, in a similar manner to FIGS. 4A, 4B, and 4C.

The diagrams indicate that spherical aberration and astigmatism are corrected very well, and distortion is a little large but is electronically correctable.

Figure 30:
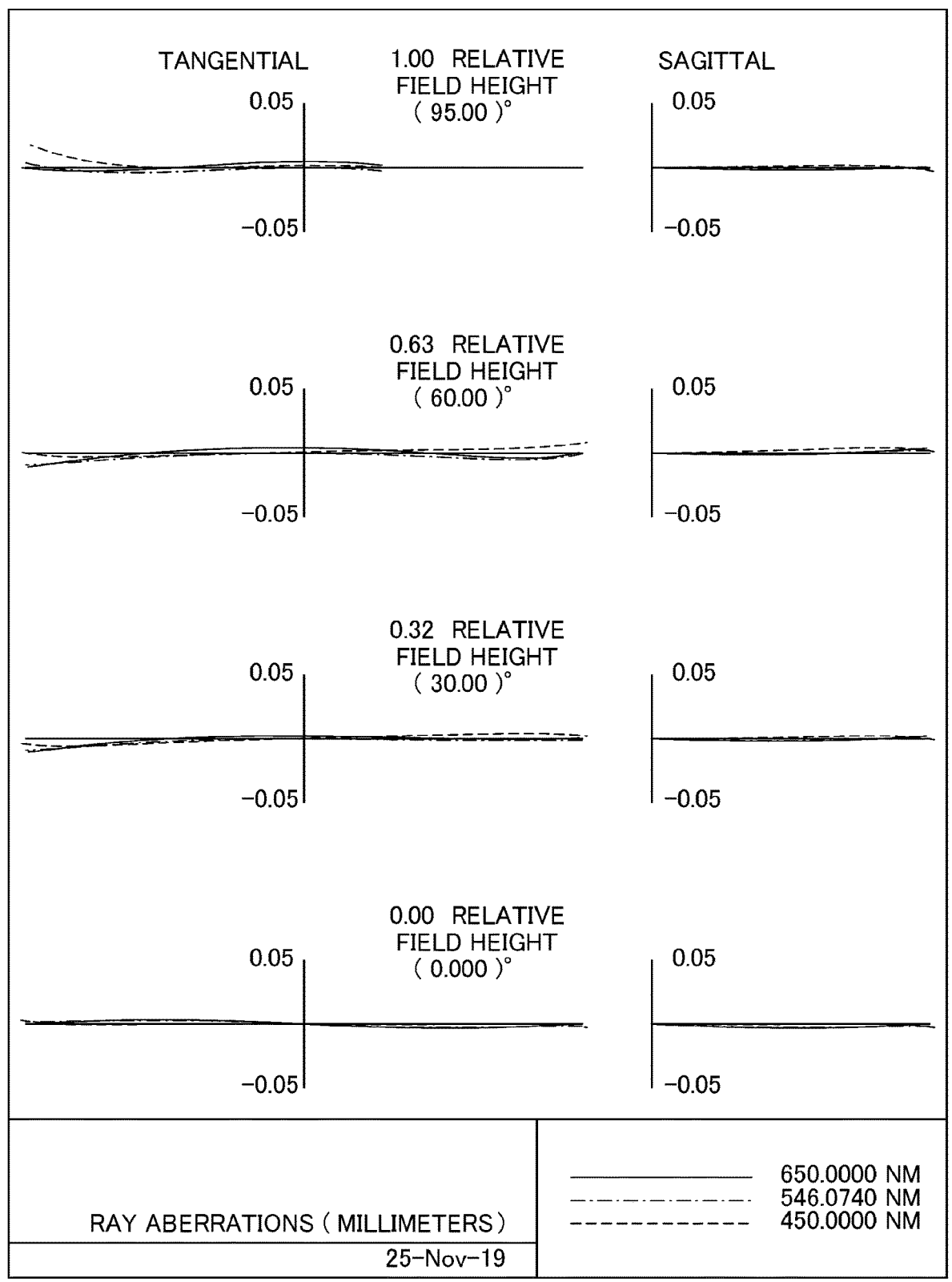
FIG. 30 is a collection of lateral aberration diagrams of the imaging lens according to Example 6.

FIG. 30 is a collection of lateral aberration diagrams of the imaging lens IM according to Example 6. FIG. 30 indicates that the lateral aberrations are also extremely successfully corrected.

Example 7

Figure 31:
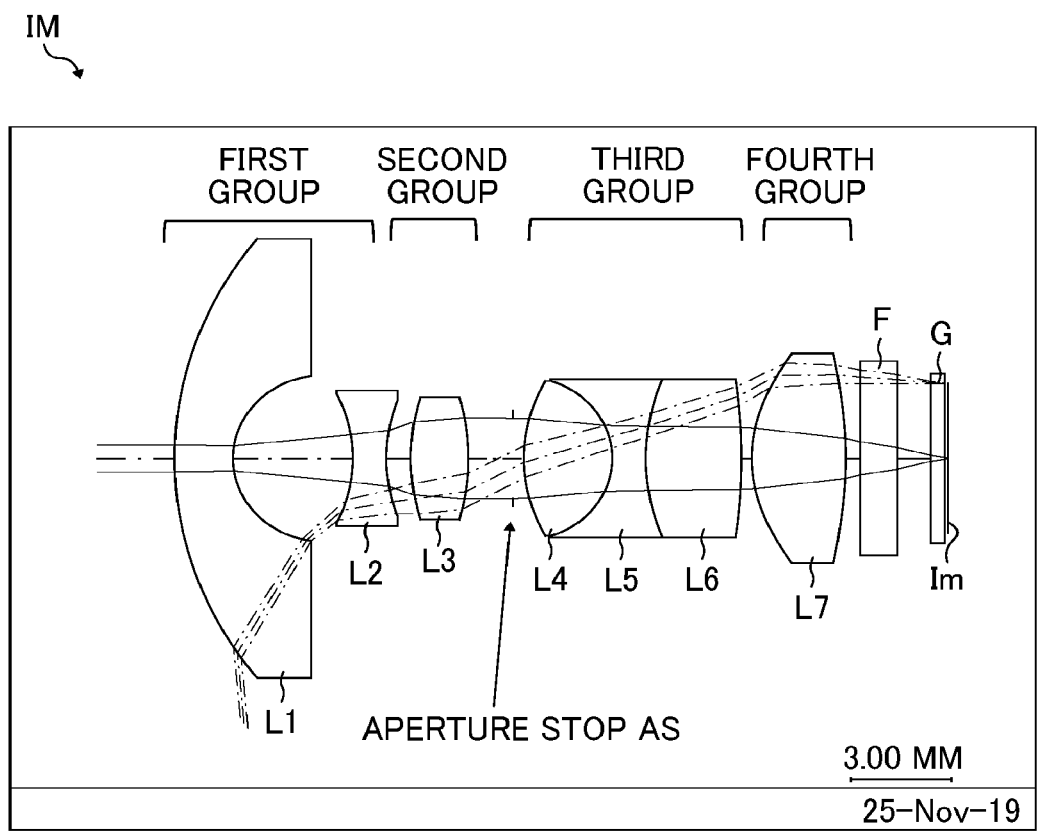
FIG. 31 is an illustration of an imaging lens according to Example 7 of the present disclosure.

FIG. 31 is a diagram illustrating a configuration of an imaging lens IM according to Example 7. For purposes of simplification, like reference signs are given to elements similar to those illustrated in FIG. 1 as long as no confusion is expected. Regarding the lenses, the j-th lens counted from the lens closest to the object is indicated by Lj in accordance with the above-described rule.

The first group G1 includes two lenses: a negative lens L1 and a negative lens L2.

The negative lens L1 is a negative meniscus lens with a convex surface facing the object side, and the negative lens L2 is a biconcave lens.

The second group G2 includes one positive lens L3, and the positive lens L3 is a biconvex lens.

The third group G3 on the image side relative to the aperture stop AS is a compound lens formed by joining three lenses: a thick biconvex lens L4, a biconcave lens L5, and a thick biconvex lens L6 together, which are sequentially arranged from the object side toward the image side.

The fourth group G4 includes one positive lens L7, and the positive lens L7 is a biconvex lens, whose both sides are aspherical.

FIGS. 32A and 32B are tables of the lens data and the aspherical data according to Example 7 of the present disclosure, respectively, in a similar manner to FIGS. 2A and 2B.

FIG. 33A is a table of data on the focal lengths, with respect to the d-line, of all the lenses L1 to L7, the first group G1 to the fourth group G4, and an entirety of the optical system (i.e., an entire system) according to Example 7.

FIG. 33B is a table of data on the parameters of conditional expressions (1) to (4) according to Example 7.

Figure 34B:
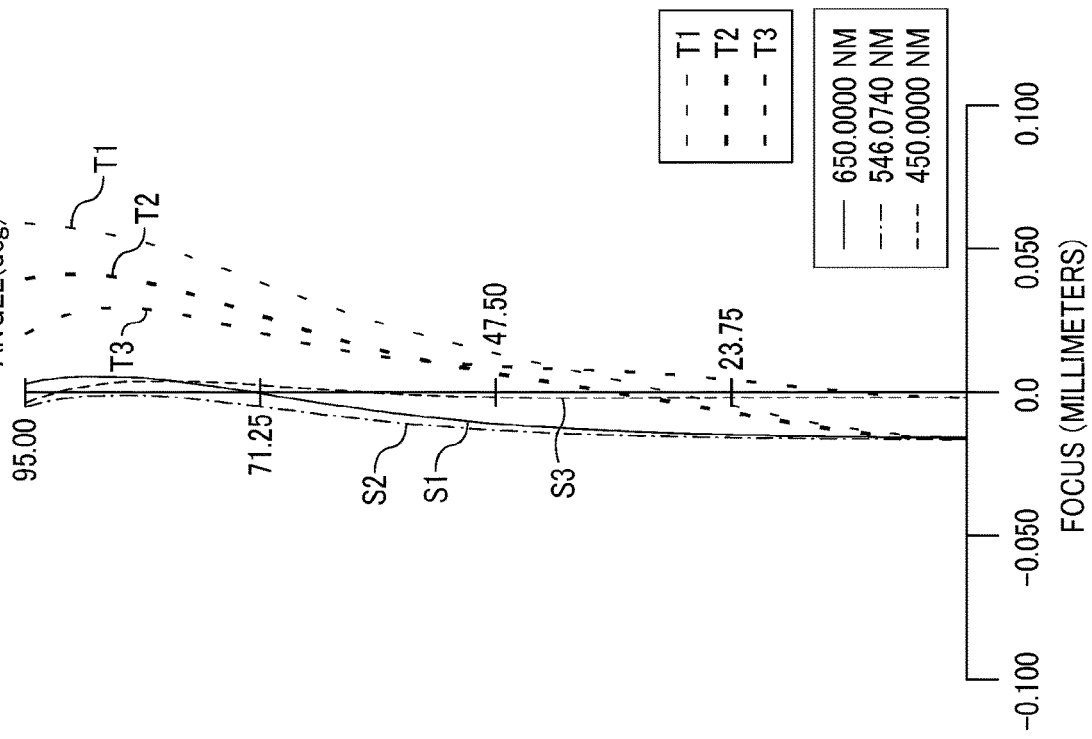
Figure 34A:
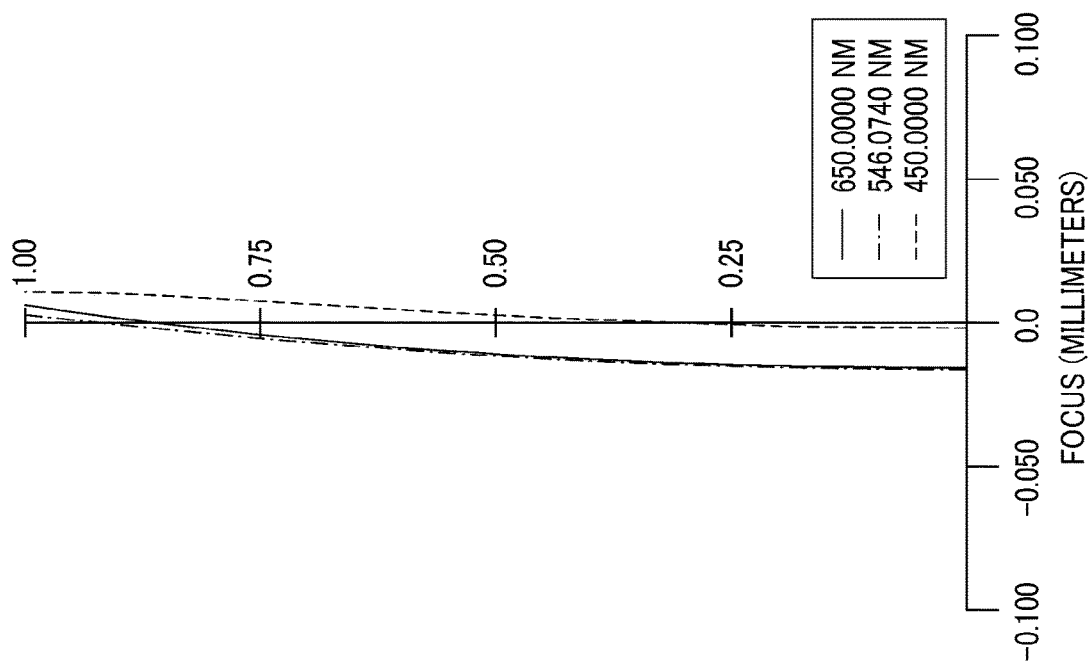

FIGS. 34A, 34B, and 34C are longitudinal aberration diagrams of the imaging lens IM according to Example 7, in a similar manner to FIGS. 4A, 4B, and 4C.

The diagrams indicate that spherical aberration and astigmatism are corrected very well, and distortion is a little large but is electronically correctable.

Figure 35:
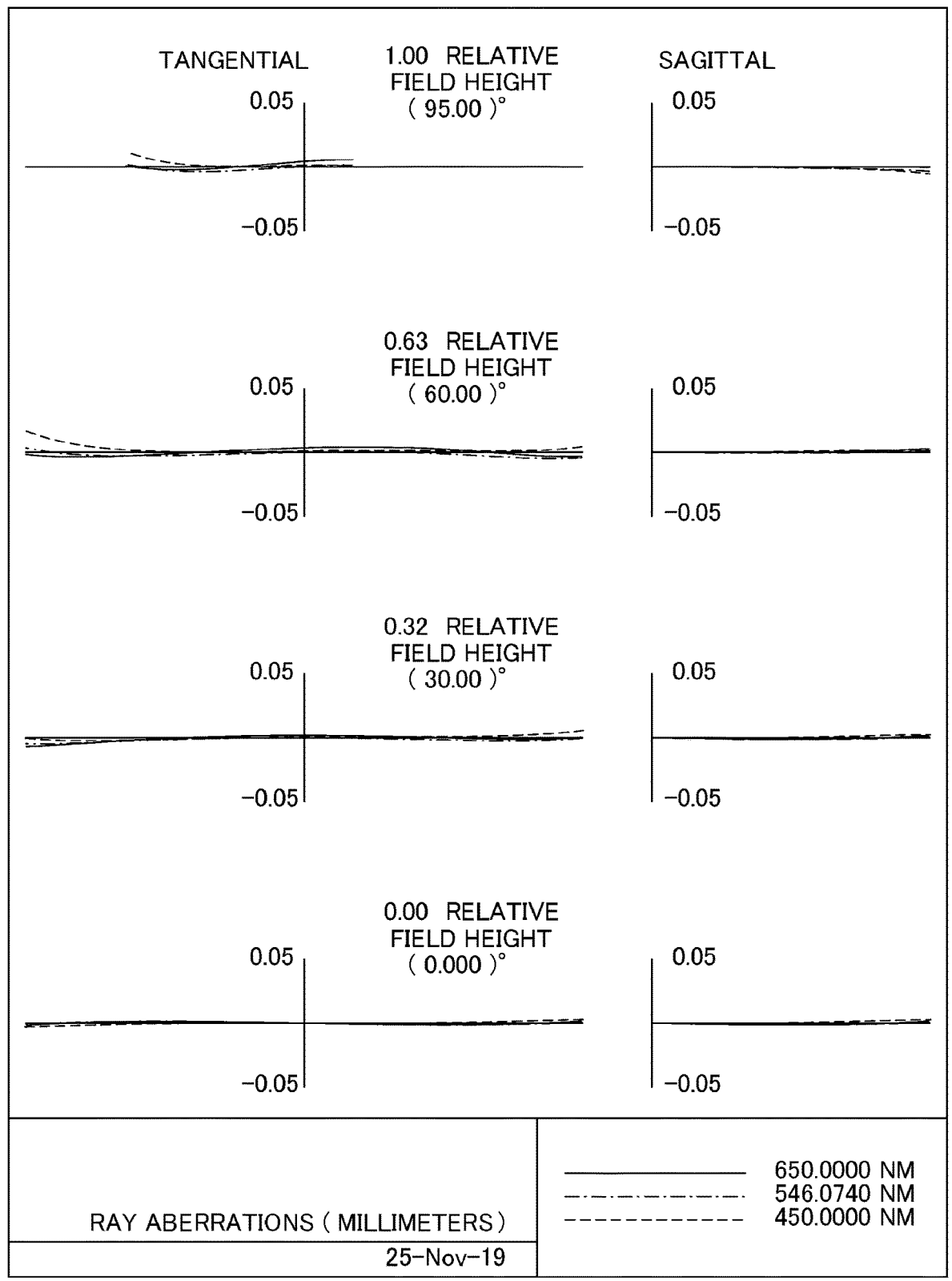
FIG. 35 is a collection of lateral aberration diagrams of the imaging lens according to Example 7.

FIG. 35 is a collection of lateral aberration diagrams of the imaging lens IM according to Example 7.

FIG. 35 indicates that the lateral aberrations are also extremely successfully corrected.

Example 8

Figure 36:
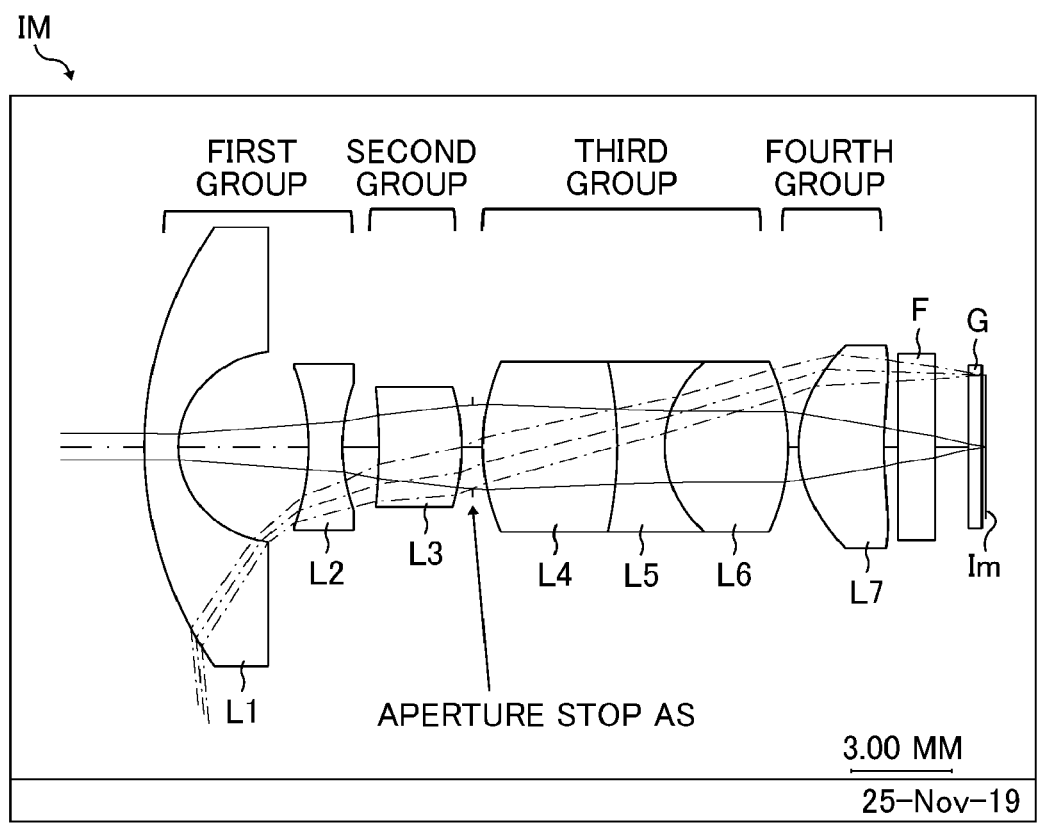
FIG. 36 is an illustration of an imaging lens according to Example 8 of the present disclosure.

FIG. 36 is a diagram illustrating a configuration of an imaging lens IM according to Example 8. For purposes of simplification, like reference signs are given to elements similar to those illustrated in FIG. 1 as long as no confusion is expected. Regarding the lenses, the j-th lens counted from the lens closest to the object is indicated by Lj in accordance with the above-described rule.

The first group G1 includes two lenses: a negative lens L1 and a negative lens L2.

The negative lens L1 is a negative meniscus lens with a convex surface facing the object side, and the negative lens L2 is a biconcave lens.

The second group G2 includes one positive lens L3, and the positive lens L3 is a thick positive meniscus lens with a convex surface facing the image side.

The third group G3 on the image side relative to the aperture stop AS is a compound lens formed by joining three lenses: a thick biconvex lens L4, a biconcave lens L5, and a thick biconvex lens L6 together, which are sequentially arranged from the object side toward the image side.

The fourth group G4 is one positive lens L7, and the positive lens L7 whose both sides are aspherical.

FIGS. 37A and 37B are tables of the lens data and the aspherical data according to Example 8 of the present disclosure, respectively, in a similar manner to FIGS. 2A and 2B.

FIG. 38A is a table of data on the focal lengths, with respect to the d-line, of all the lenses L1 to L7, the first group G1 to the fourth group G4, and an entirety of the optical system (i.e., an entire system) according to Example 8.

FIG. 38B is a table of data on the parameters of conditional expressions (1) to (4) according to Example 8.

Figure 39A:
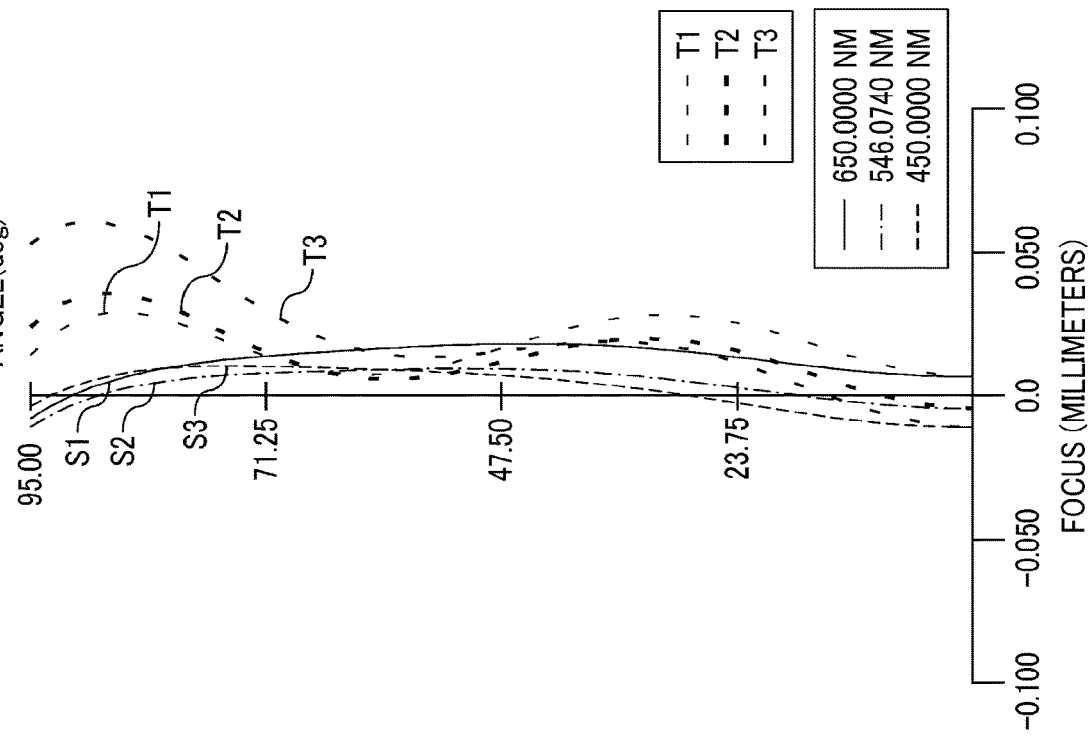
Figure 39B:
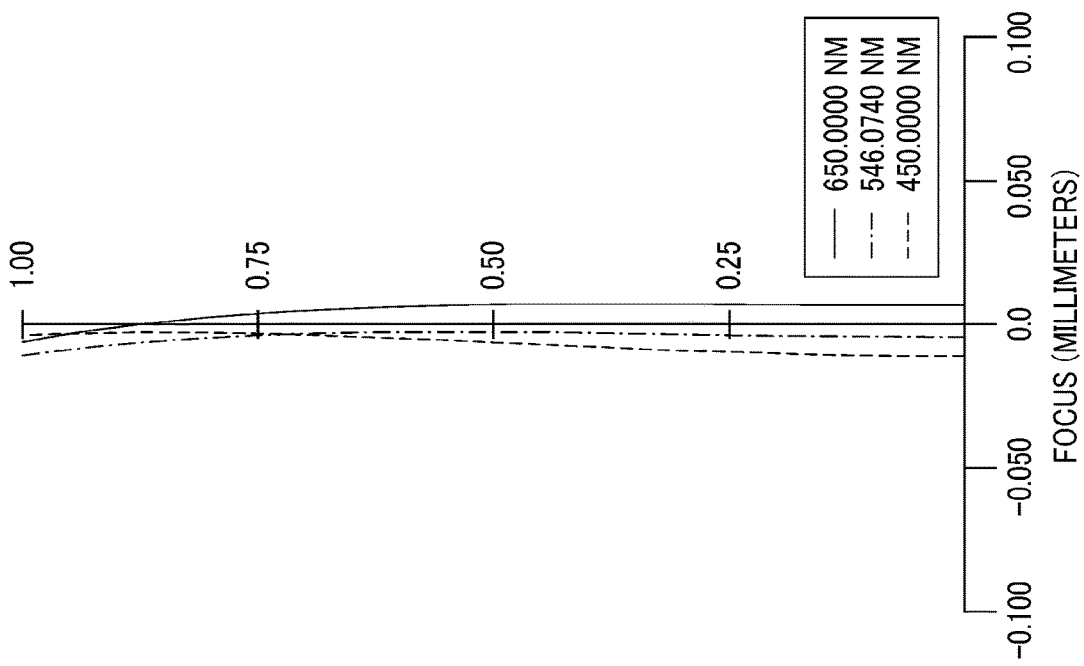

FIGS. 39A, 39B, and 39C are longitudinal aberration diagrams of the imaging lens IM according to Example 8, in a similar manner to FIGS. 4A, 4B, and 4C.

The diagrams indicate that spherical aberration and astigmatism are corrected very well, and distortion is a little large but is electronically correctable.

Figure 40:
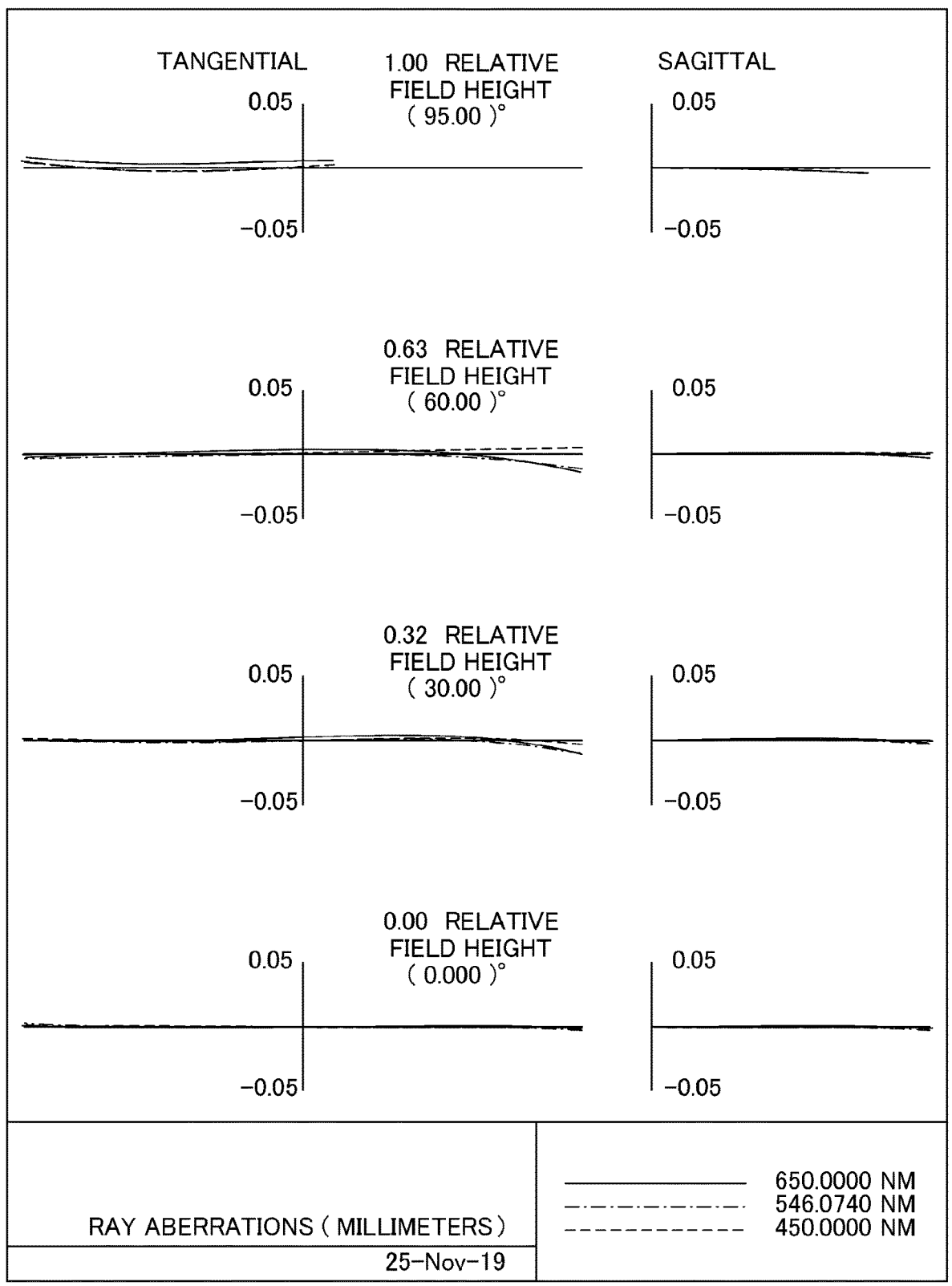
FIG. 40 is a collection of lateral aberration diagrams of the imaging lens according to Example 8.

FIG. 40 is a collection of lateral aberration diagrams of the imaging lens IM according to Example 8.

FIG. 40 indicates that the lateral aberrations are also extremely successfully corrected.

Example 9

Figure 41:
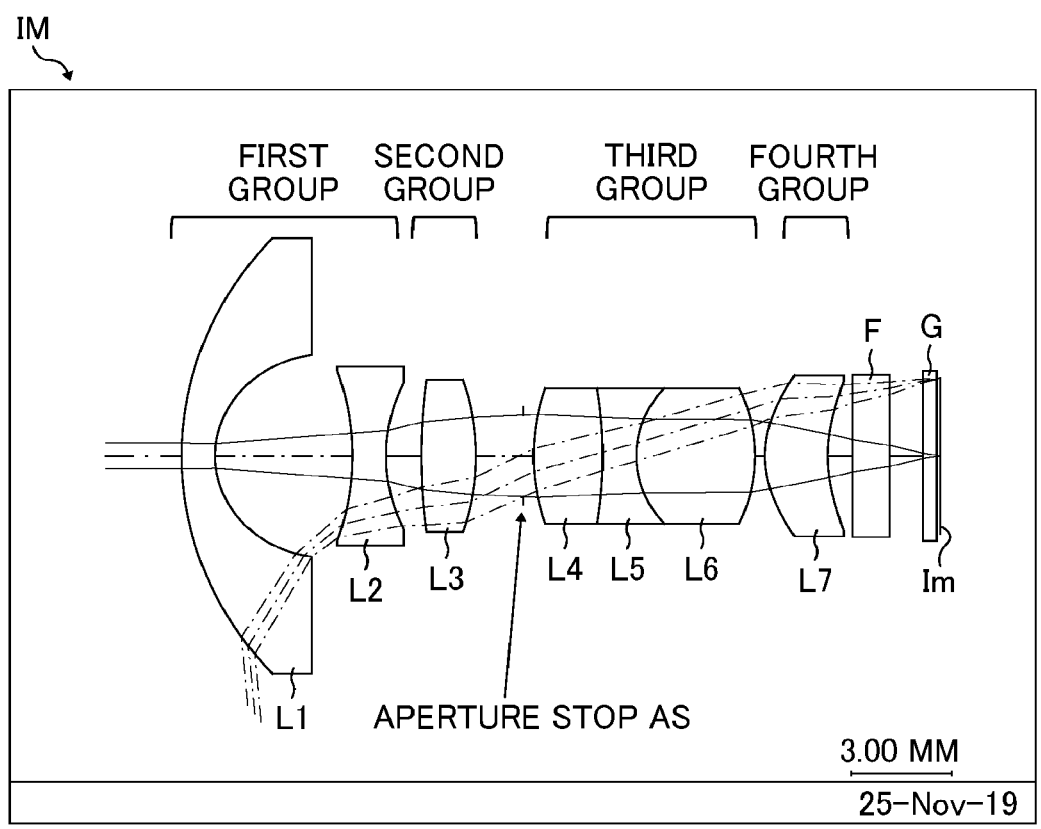
FIG. 41 is an illustration of an imaging lens according to Example 9 of the present disclosure.

FIG. 41 is a diagram illustrating a configuration of an imaging lens IM according to Example 9. For purposes of simplification, like reference signs are given to elements similar to those illustrated in FIG. 1 as long as no confusion is expected. Regarding the lenses, the j-th lens counted from the lens closest to the object is indicated by Lj in accordance with the above-described rule.

The first group G1 includes two lenses: a negative lens L1 and a negative lens L2.

The negative lens L1 is a negative meniscus lens with a convex surface facing the object side, and the negative lens L2 is a biconcave lens.

The second group G2 includes one positive lens L3, and the positive lens L3 is a biconvex lens.

The third group G3 on the image side relative to the aperture stop AS is a compound lens formed by joining three lenses: a biconvex lens L4, a biconcave lens L5, and a thick biconvex lens L6 together, which are sequentially arranged from the object side toward the image side.

The fourth group G4 includes one positive lens L7, and the positive lens L7 whose both sides are aspherical.

FIGS. 42A and 42B are tables of the lens data and the aspherical data according to Example 9 of the present disclosure, respectively, in a similar manner to FIGS. 2A and 2B.

FIG. 43A is a table of data on the focal lengths, with respect to the d-line, of all the lenses L1 to L7, the first group G1 to the fourth group G4, and an entirety of the optical system (i.e., an entire system) according to Example 9. FIG. 43B is a table of data on the parameters of conditional expressions (1) to (4) according to Example 9.

Figures 44A, 44B:
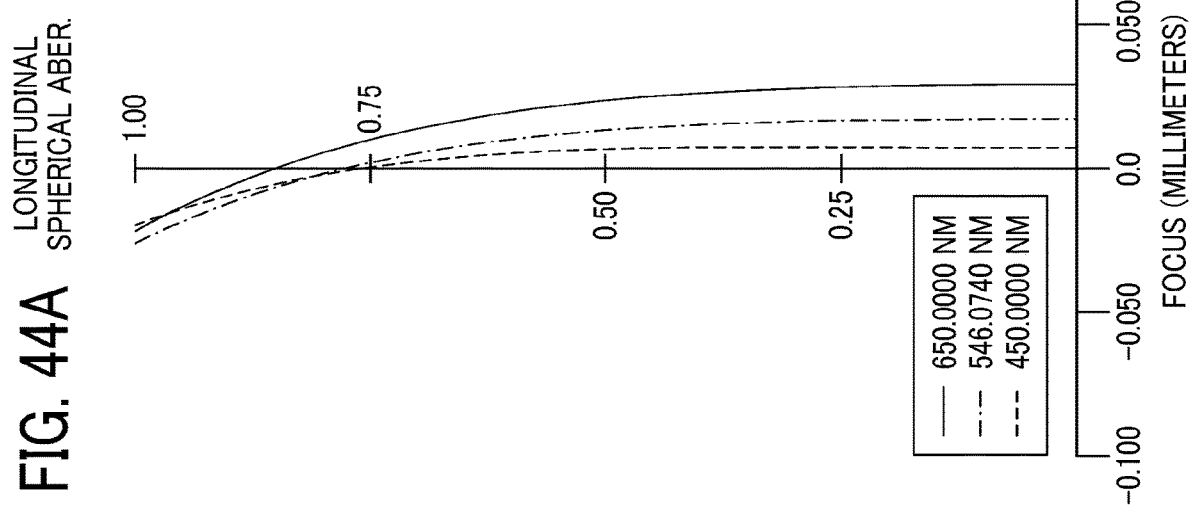
FIGS. 44A, 44B and 44C are aberration diagrams of spherical aberration, astigmatism, and distortion, respectively of the imaging lens according to Example 9.
Figure 44C:
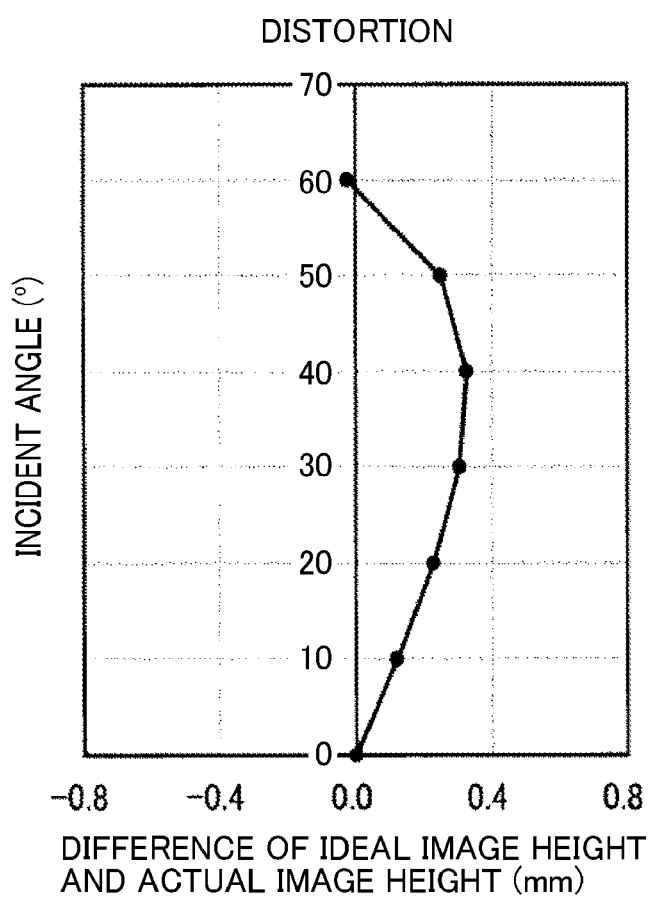

FIGS. 44A, 44B, and 44C are longitudinal aberration diagrams of the imaging lens IM according to Example 9, in a similar manner to FIGS. 4A, 4B, and 4C.

The diagrams indicate that spherical aberration and astigmatism are corrected very well, and distortion is a little large but is electronically correctable.

Figure 45:
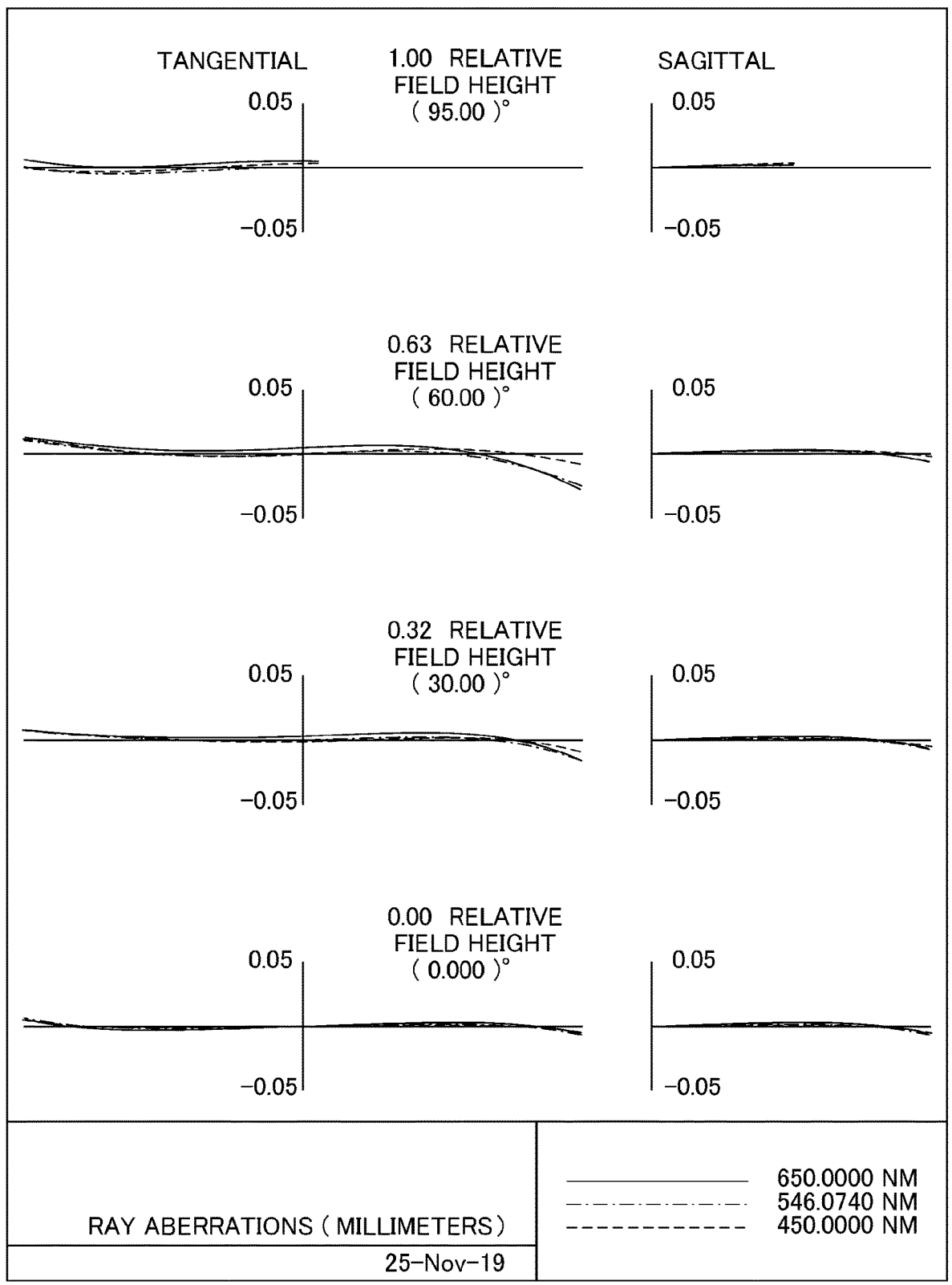
FIG. 45 is a collection of lateral aberration diagrams of the imaging lens according to Example 9.

FIG. 45 is a collection of lateral aberration diagrams of the imaging lens IM according to Example 9.

FIG. 45 indicates that the lateral aberrations are also extremely successfully corrected.

Example 10

Figure 46:
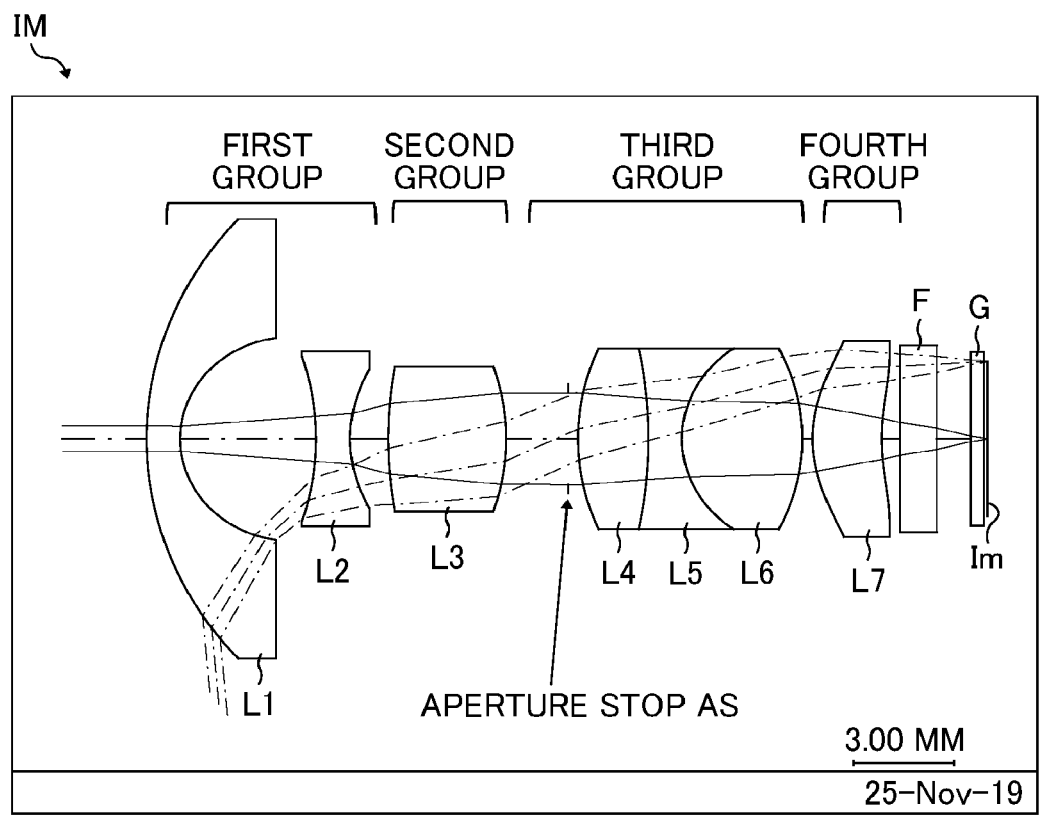
FIG. 46 is an illustration of an imaging lens according to Example 10 of the present disclosure.

FIG. 46 is a diagram illustrating a configuration of an imaging lens IM according to Example 10. For purposes of simplification, like reference signs are given to elements similar to those illustrated in FIG. 1 as long as no confusion is expected. Regarding the lenses, the j-th lens counted from the lens closest to the object is indicated by Lj in accordance with the above-described rule.

The first group G1 includes two lenses: a negative lens L1 and a negative lens L2.

The negative lens L1 is a negative meniscus lens with a convex surface facing the object side, and the negative lens L2 is a biconcave lens.

The second group G2 includes one positive lens L3, and the positive lens L3 is a thick biconvex lens.

The third group G3 on the image side relative to the aperture stop AS is a compound lens formed by joining three lenses: a biconvex lens L4, a biconcave lens L5, and a thick biconvex lens L6 together, which are sequentially arranged from the object side toward the image side.

The fourth group G4 includes one positive lens L7, and the positive lens L7 whose both sides are aspherical.

FIGS. 47A and 47B are tables of the lens data and the aspherical data according to Example 10 of the present disclosure, respectively, in a similar manner to FIGS. 2A and 2B.

FIG. 48A is a table of data on the focal lengths, with respect to the d-line, of all the lenses L1 to L7, the first group G1 to the fourth group G4, and an entirety of the optical system (i.e., an entire system) according to Example 10. FIG. 48B is a table of data on the parameters of conditional expressions (1) to (4) according to Example 10.

Figure 49A:
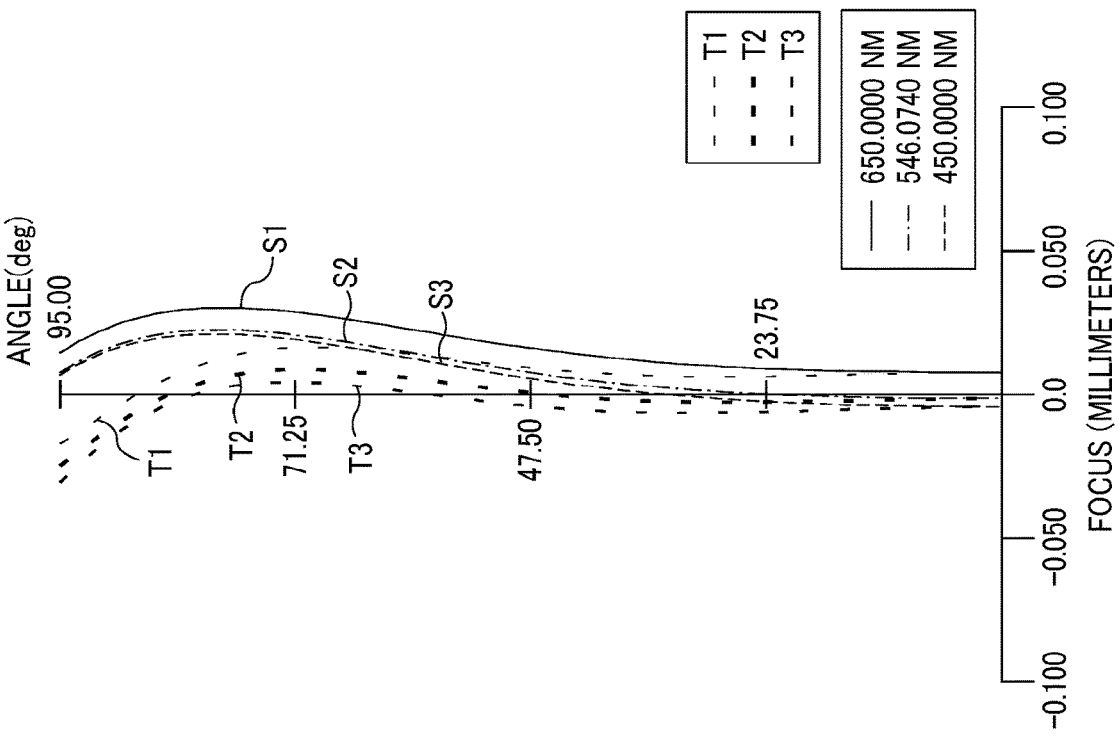
Figure 49B:
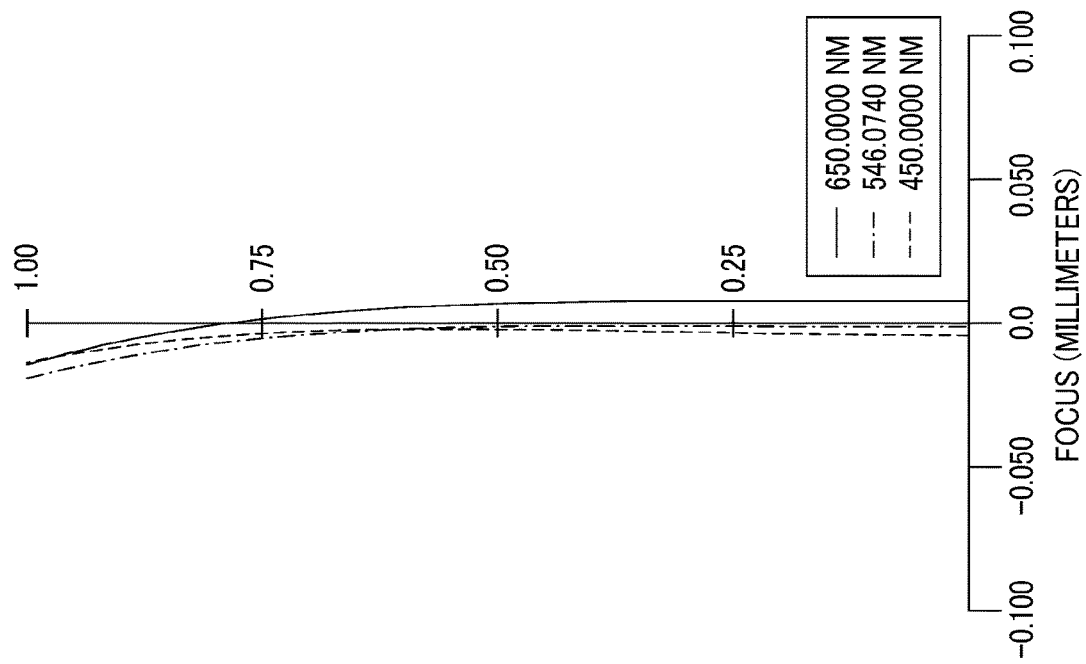

FIGS. 49A, 49B, and 49C are longitudinal aberration diagrams of the imaging lens IM according to Example 10, in a similar manner to FIGS. 4A, 4B, and 4C.

The diagrams indicate that spherical aberration and astigmatism are corrected very well, and distortion is a little large but is electronically correctable.

Figure 50:
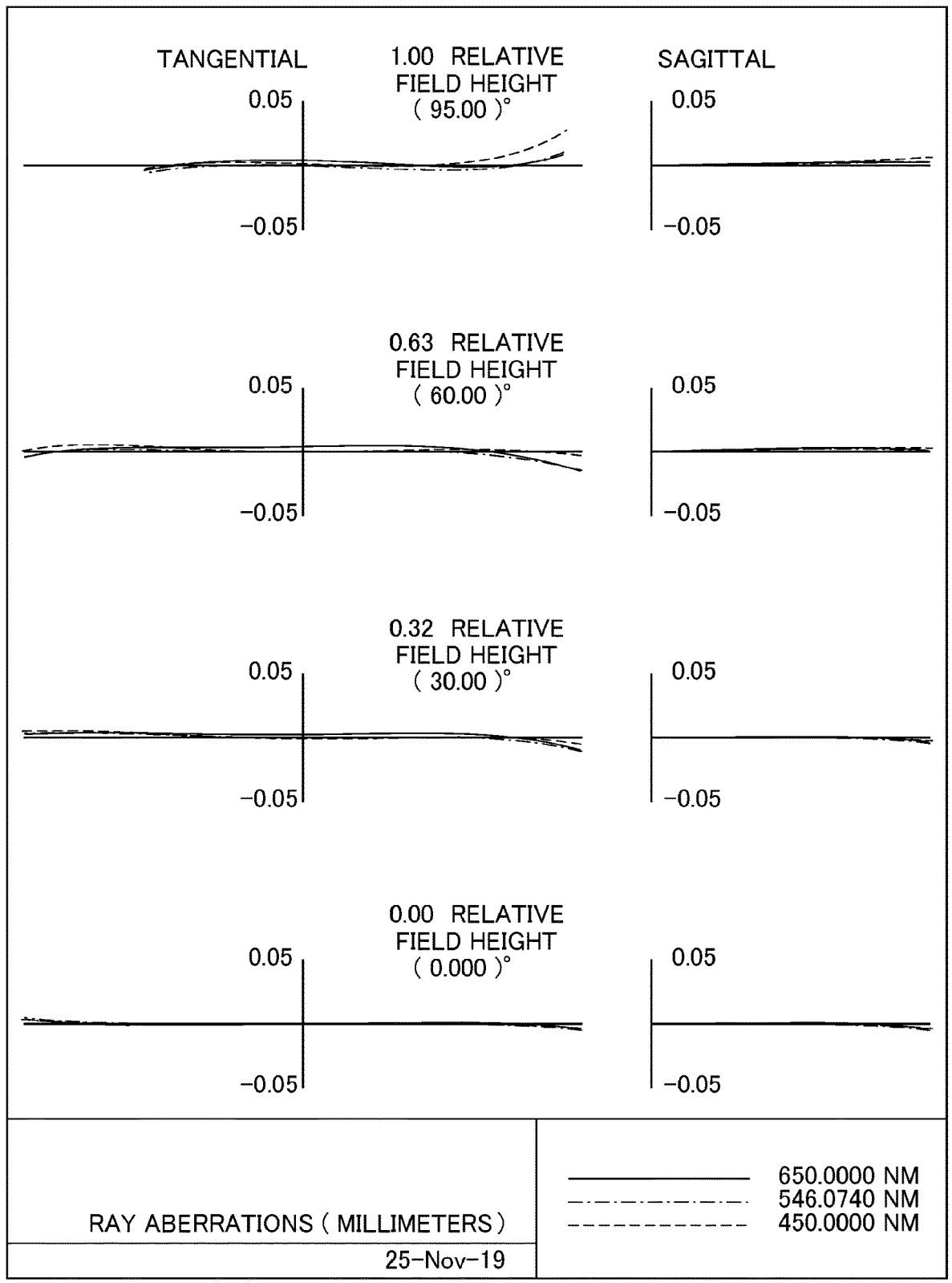
FIG. 50 is a collection of lateral aberration diagrams of the imaging lens according to Example 10.

FIG. 50 is a collection of lateral aberration diagrams of the imaging lens IM according to Example 10. FIG. 50 indicates that the lateral aberrations are also extremely successfully corrected.

In the above description, ten specific examples of the imaging lens IM are described.

In the above-described Examples 1 to 10, it is assumed that an image sensor reads an image of an object, and the distortion aberration is corrected by electronic calculation. The spherical aberration, astigmatism and lateral aberration are all corrected sufficiently to achieve intended performance, and the distortion is within the electronically correctable range. As the spherical aberration, astigmatism, and lateral aberration are corrected sufficiently to achieve intended performance, the image sensor can read an image with high resolution, and an image-capturing device with one mega-pixel resolution can also read an image with high resolution.

The imaging lens IM according to any of Example 1 to Example 10 has a F-number (FNo.) of 2.0 that is small sufficient to obtain desired brightness and enable a high-speed image readout. Further, the imaging lens IM according to any of Example 1 to Example 10 has a wide angle of view of 120 degrees or more. Specifically, the imaging lens IM according to Example 2 has an angle of view of 150 degrees, and the imaging lenses IM according to the other Examples have an extremely wide angle of view of 190 degrees.

The imaging lens IM according to Example 2 has a smaller angle of view (i.e., 150 degrees) than the imaging lenses IM according to the other Examples (i.e., 190 degrees) because the lens L1 of the first group G1 of the imaging lens IM according to Example 2 has a concave surface facing the object side. The lens L1 of the first group G1 is designed to have a convex surface facing the object side so as to increase an angle of view. The imaging lens IM according to Example 2, however, achieves a wide angle of view of 150 degrees although the lens L1 of the first group G1 has a concave surface facing the object side. In other words, it is obvious that the configuration in which the lens L1 has a concave surface facing the object side also achieves an angle of view of 120 degrees or more.

A camera apparatus CA according to embodiments of the present disclosure includes the imaging lens IM according to an embodiment of the present disclosure as described above. Examples of the application of the camera apparatus CA include a typical image-capturing camera, an inspection camera, a stereo camera, a vehicle-mounted camera, and a surveillance camera.

The following describes example embodiments of the camera apparatus, such as an inspection camera apparatus, a stereo camera apparatus, and a vehicle-mounted camera apparatus.

An inspection camera according to an embodiment of the present disclosure is described with reference to FIGS. 51A and 51B.

An inspection device to be described below inspects a product.

There are various types of inspections and inspection items in the product inspection. The following describes cases where a product to be manufactured in large numbers is inspected for the presence or absence of a scratch or other sorts of damage.

Figure 51A:
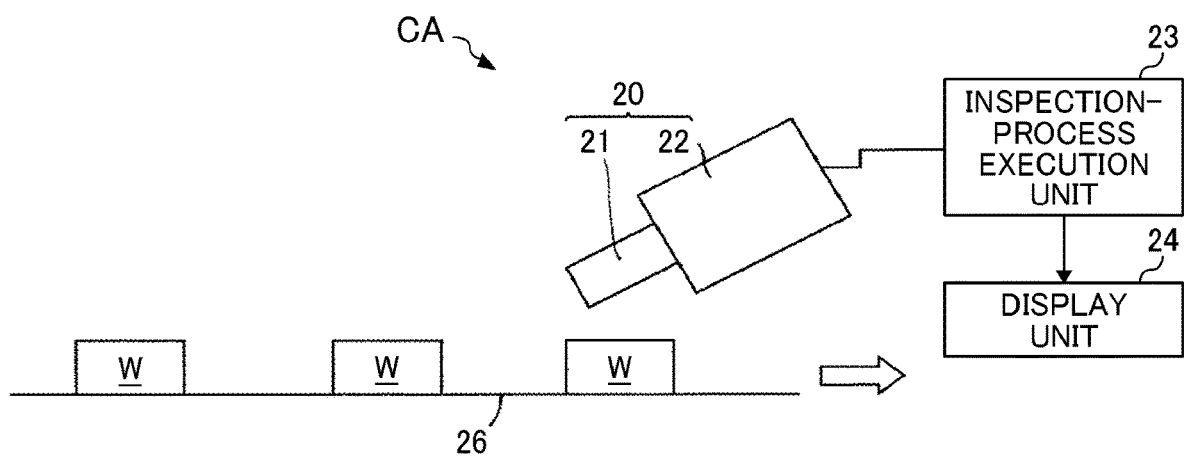
FIGS. 51A and 51B are illustrations of an inspection device as an example of a camera apparatus, according to an embodiment of the present disclosure.

In FIG. 51A, an imaging device 20, an inspection-process execution unit 23, and a display unit 24 are illustrated. Moreover, a plurality of products W and a product conveyance belt 26 are illustrated.

The imaging device 20 includes an imaging optical system 21 and an image processing unit 22.

The products W to be inspected are placed at equal intervals on the conveyance belt 26, and conveyed by the conveyance belt 26 in the direction indicated by arrow (to the right in FIG. 51A) at a constant velocity.

The imaging optical system 21 forms an image of the products W to be inspected, and the imaging lens IM according to an embodiment of the present disclosure is incorporated into the imaging optical system 21. The imaging optical system 21 be any one of the imaging optical systems according to Example 1 to Example 10 of the present disclosure as described above. The imaging optical system 21 is also referred to as an imaging lens.

Figure 51B:
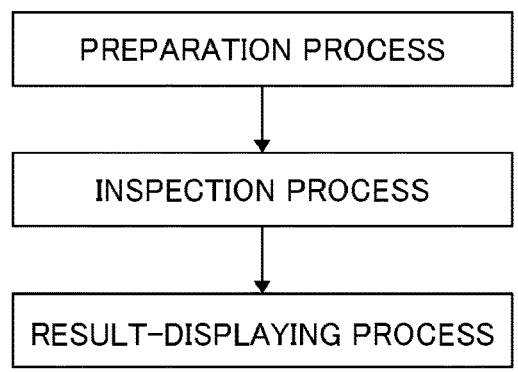

FIG. 51B is a flowchart of product inspection including steps of a preparation step, an inspection step, and a result-displaying step, according to the present embodiment. In these steps, the inspection step and the result-displaying step correspond to the inspection processes.

In the preparation step, the conditions for the inspection are determined.

In other words, the capturing position at which the imaging lens (i.e., the imaging optical system 21) captures an image and the capturing orientation of the imaging lens (the orientation of an imaging lens or the distance to an object to be captured) are determined based on, for example, the size or shape of the products W conveyed by the conveyance belt 26, and the site or portion where the presence or absence of scratch or other sorts of damage is inspected.

Then, focusing of the imaging lens (i.e., the imaging optical system 21) is obtained according to the position or size of scratch or other sorts of damage whose presence or absence is to be detected. The imaging lens is capable of focusing, and changes the focus with the object distance appropriately set, according to the inspection item (the presence or absence of a scratch in this example).

A model product confirmed to be free of any scratch or other sorts of damage is placed at the inspection position on the conveyance belt 26, and is captured by the imaging lens.

Such capturing is performed by an image sensor, such as a CCD, provided for the image processing unit 22, and image processing is performed on the captured images to obtain digitized image data.

The obtained digitized data is sent to the inspection-process execution unit 23, and the inspection-process execution unit 23 stores the digital data as model data.

In the inspection step, the products W are placed on the conveyance belt 26 in the same orientation or posture as the model product, and are sequentially conveyed by the conveyance belt 26. When each one of the products W is conveyed and passes the inspection position, the imaging lens (i.e., the imaging optical system 21) captures an image of the products W. The image processing unit 22 digitizes the captured images and sends the digitized image data to the inspection-process execution unit 23.

The inspection-process execution unit 23 is configured by a computer or a central processing unit (CPU) to control the image processing unit 22 to adjust the capturing operation or focusing operation of the imaging lens.

Once the image data of the products W digitized by the image processing unit 22 are received, the inspection-process execution unit 23 determines whether the received image data matches the stored model data.

When scratch or other sorts of damage is present on the captured product W, the image data of the product W does not match the model data. In such a case, the product W is determined to be a defective product.

When scratch or other sorts of damage is not present on the captured product W, the image data of the product W matches the model data. In such a case, the product W is determined to be a quality product.

In the result-displaying step, the inspection-process execution unit 23 displays on the display unit 24 the result of determination as to whether each product is a quality product or defective product.

In the configuration of the inspection device, the inspection-process execution unit 23 and the display unit 24 together configure an inspection-process execution unit.

A stereo camera according to an embodiment of the present disclosure is described below with reference to FIG. 52.

The stereo camera is known to be used for distance measurement, and is schematically described below.

Figure 52:
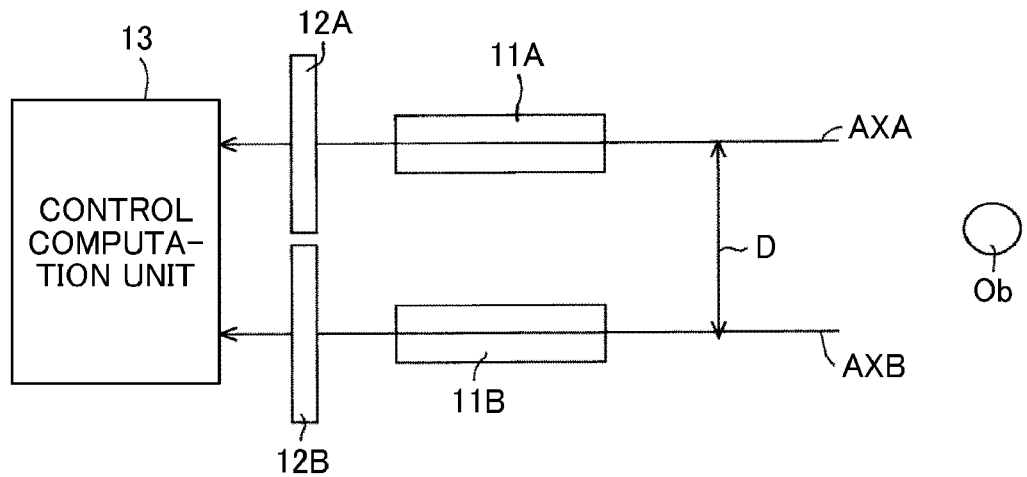
FIG. 52 is an illustration of a stereo camera as an example of the camera apparatus, according to an embodiment of the present disclosure.

In FIG. 52, a pair of imaging optical systems 11A and 11B are identical in specifications.

The imaging lens according to any one of claims 1 to 10 (the imaging lens according to any one of Examples 1-10) is used as the imaging optical systems 11A and 11B. The imaging optical systems 11A and 11B are referred to also as an imaging lens.

For example, a CCD sensor or a complementary metal oxide semiconductor (CMOS) sensor may be used for the image sensors 12A and 12B.

An optical axis A×A and an optical axis A×B of the pair of imaging optical systems 11A and 11B are arranged so as to be parallel to each other, and the pair of imaging optical systems 11A and 11B are arranged at a predetermined distance D away. Such a predetermined distance D may be referred to as a base-line length in the following description.

The imaging optical system 11A forms an image of an object Ob on the photo-sensing surface of the image sensor 12A.

In a similar manner, the imaging optical system 11B forms an image of an object Ob on the photo-sensing surface of the image sensor 12B.

The image sensors 12A and 12B input the images that are formed by the pair of imaging optical systems 11A and 11B to a control computation unit 13 as the data of captured images.

The control computation unit 13 that is configured by at least one computer or CPU digitizes the image data input from the image sensors 12A and 12B.

Then, the distance to the object Ob is computed and obtained based on the digitized image data.

The control computation unit 13 computes the distance D+Δ between a pair of the positions of the images, based on the positions of the images of the object Ob, which are formed on the pair of image sensors 12A and 12B.

The distance d to the object Ob is calculated and obtained from the distance "D+Δ" using a following equation where f denotes focal length of the imaging lens and D denotes the base-line length: d=f {1+(D/Δ)} The distance measurement is performed by a stereo camera as described above.

Figure 53:
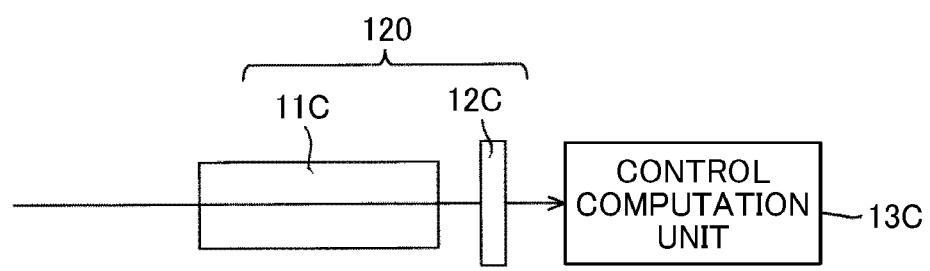
FIG. 53 is an illustration of a vehicle-mounted camera as an example of the camera apparatus, according to an embodiment of the present disclosure.

FIG. 53 is a schematic view of a vehicle-mounted camera according to an embodiment of the present disclosure.

In FIG. 53, an imaging system 120 and a control computation unit 13C are illustrated.

The imaging system 120 includes an imaging optical systems 11C and an image sensor 12C.

The imaging system 120 and the control computation unit 13C together configure a vehicle-mounted camera. The vehicle-mounted camera that is mounted on a vehicle obtains the image data of an image outside the vehicle and digitizes the obtained image data. Such digitized image data is used as auxiliary information for a driving operation, such as an automatic brake.

The imaging lens according to any one of claims 1 to 10 (in particular, the imaging lens according to any one of Examples 1-10) is used as the imaging optical system 11C.

The imaging system 120 and the control computation unit 13C in FIG. 53 may be replaced with the stereo camera in FIG. 52.

In other words, the stereo camera in FIG. 52 may be provided for a vehicle as a vehicle-mounted camera.

Figure 54:
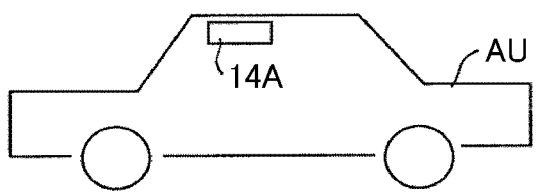
FIG. 54 an illustration of an automobile as an example of a mobile object mounted with the vehicle-mounted camera, according to an embodiment of the present disclosure.

FIG. 54 is an illustration of a vehicle-mounted camera 14A that has been described with reference to FIG. 53. In FIG. 54, an automobile AU on which the vehicle-mounted camera 14A is mounted is illustrated as a mobile object.

The mobile object on which a camera apparatus incorporating an image-capturing device is not limited to automobiles, and may be vehicles such as airplanes or trains, or flying objects such as drones.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:
1. An imaging lens, comprising:
a first group having negative refractive power;
a second group having positive refractive power;
an aperture stop;
a third group having positive refractive power; and
a fourth group having positive refractive power, wherein
the first group, the second group, the aperture stop, the third group, and the fourth group are arranged in that order from an object side toward an image side,
the second group follows the first group without any lenses in between the first group and the second group,
the first group consists of two negative lenses,
the second group consists of one positive lens,
the third group consists of three lenses, the three lenses being two positive lenses and one negative lens,
in the third group, one of the two positive lenses and the one negative lens are joined together to form a compound lens, and the other one of the two positive lenses is separate from the compound lens and on the image side of the compound lens,
the compound lens is immediately adjacent to the image side of the aperture stop,
both sides of each lens in the first group, the second group and the third group are spherical surfaces,
the fourth group includes one positive lens in which both sides are aspherical surfaces, the imaging lens has a fixed focal length and an angle of view of 120 degrees or more, and
conditional expressions (1), (2), (3), and (4) below are satisfied:

$$-2.7 \leq f1/f \leq -0.7 \quad (1)$$

$$2.2 \leq f2/f \leq 6.6 \quad (2)$$

$$3.9 \leq f3/f \leq 14.3 \quad (3)$$

$$2.8 \leq f4/f \leq 11.0 \quad (4)$$

where fi denotes focal length of i-th group with respect to a d-line, i denotes one of 1 to 4, and f denotes focal length of an entirety of the imaging lens with respect to the d-line.

2. The imaging lens according to claim 1, wherein in the first group, the negative lens closest to an object has a convex surface facing the object side.

3. The imaging lens according to claim 1, wherein in the third group, one of the two positive lenses, the negative lens, and the other one of the two positive lenses are arranged in that order from the object side toward the image side.

4. The imaging lens according to claim 1, wherein a conditional expression below is satisfied:

$$5 \text{ mm} \leq f < 22 \text{ mm}$$

where f denotes focal length of the entirety of the imaging lens with respect to the d-line.

5. A camera apparatus, comprising:
the imaging lens according to claim 1; and
an image sensor.

6. The camera apparatus according to claim 5, wherein the camera apparatus is capable of being used in any one of an image-capturing camera, an inspection camera, a stereo camera, a vehicle-mounted camera, and a surveillance camera.

7. A mobile object, comprising:
a vehicle; and
the camera apparatus according to claim 5 mounted on the vehicle.

8. An imaging lens, comprising:
a first group having negative refractive power:
a second group having positive refractive power;
an aperture stop;
a third group having positive refractive power; and
a fourth group having positive refractive power, wherein
the first group, the second group, the aperture stop, the third group, and the fourth group are arranged in that order from an object side toward an image side,
the first group consists of three lenses, the three lenses including two negative lenses and one positive lens, the two negative lenses including one negative lens at the object side and another negative lens at the image side,
in the first group, the one negative lens, the one positive lens, and the another negative lens are arranged in that order from the object side toward the image side,
the second group includes one positive lens,
the third group consists of three lenses, the three lenses including two positive lenses and one negative lens,
in the third group, at least two of the three lenses at the object side are joined together to form a compound lens,
the compound lens is immediately adjacent to the image side of the aperture stop of,
both sides of each lens in the first group, the second group and the third group are spherical surfaces,
the fourth group includes one positive lens in which both sides are aspherical surfaces,
the imaging lens has a fixed focal length and an angle of view of 120 degrees or more, and
conditional expressions (1), (2), (3), and (4) below are satisfied:

$$-2.7 \leq f1/f \leq -0.7 \quad (1)$$

$$2.2 \leq f2/f \leq 6.6 \quad (2)$$

$$3.9 \leq f3/f \leq 14.3 \quad (3)$$

$$2.8 \leq f4/f \leq 11.0 \quad (4)$$

where fi denotes focal length of i-th group with respect to a d-line, i denotes one of 1 to 4, and f denotes focal length of an entirety of the imaging lens with respect to the d-line.

9. The imaging lens according to claim 8, wherein in the first group, the negative lens closest to an object has a concave surface facing the object side.

10. The imaging lens according to claim 8, wherein in the third group, one of the two positive lenses, the negative lens, and the other one of the two positive lenses are arranged in that order from the object side toward the image side and joined together to form the compound lens.

11. The imaging lens according to claim 8, wherein in the third group, one of the two positive lenses and the one negative lens are joined together to form the compound lens, and the other one of the two positive lenses is separate from the compound lens and on the image side of the compound lens.

12. The imaging lens according to claim 8, wherein a conditional expression below is satisfied:

$$5 \text{ mm} \leq f < 22 \text{ mm}$$

where f denotes focal length of the entirety of the imaging lens with respect to the d-line.

13. A camera apparatus, comprising:
the imaging lens according to claim 8; and
an image sensor.

* * * * *